US012325251B2

(12) United States Patent
Zlotnick et al.

(10) Patent No.: US 12,325,251 B2
(45) Date of Patent: Jun. 10, 2025

(54) SUBSTRATE OF OFFSET PRINTING UTILIZING IMAGE MOVEMENT

(71) Applicant: The Government of the United States of America, as represented by the Secretary of Homeland Security, Washington, DC (US)

(72) Inventors: Joel Zlotnick, Arlington, VA (US); Jordan Brough, Leesburg, VA (US); Troy Eberhardt, Centreville, VA (US); Tyra McConnell, Knoxville, MD (US); Elizabeth Gil, Bristow, VA (US); Traci Moran, Rockville, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/431,727

(22) Filed: Feb. 2, 2024

(65) Prior Publication Data

US 2024/0174018 A1 May 30, 2024

Related U.S. Application Data

(60) Division of application No. 17/963,746, filed on Oct. 11, 2022, now Pat. No. 11,890,888, which is a (Continued)

(51) Int. Cl.

*B42D 25/29* (2014.01)
*B41F 1/16* (2006.01)

(Continued)

(52) U.S. Cl.

CPC ................ *B42D 25/29* (2014.10); *B41F 1/16* (2013.01); *B41F 7/025* (2013.01); *B41F 31/008* (2013.01);

(Continued)

(58) Field of Classification Search

None

See application file for complete search history.

(56) References Cited

U.S. PATENT DOCUMENTS

| | | | |
|---|---|---|---|
| 2,048,780 A | | 7/1936 | Clifford |
| 5,855,989 A | | 1/1999 | Mantegazza |

(Continued)

FOREIGN PATENT DOCUMENTS

| | | | |
|---|---|---|---|
| EP | 1053887 A2 | | 11/2000 |
| JP | 2015096308 A | * | 5/2015 |

(Continued)

OTHER PUBLICATIONS

JP-2015112798-A English Translation (Year: 2015).*

(Continued)

*Primary Examiner* — Kyle R Grabowski

(74) *Attorney, Agent, or Firm* — Lavanya Besch; Robert W. Busby; Kelly G. Hyndman

(57) ABSTRACT

A substrate is printed with front side and back side markings in a first color ink. The front side when viewed with reflected light includes a first marking printed in a first saturation and a first symbol printed in the first saturation. The back side when viewed with reflected light includes: a second marking printed in a second saturation; a second symbol printed in the second saturation; a third marking printed in the first saturation; and a third symbol printed in the first saturation. The first marking, the second marking, and the third marking are printed to provide an interlocking pattern of low saturation color and high saturation color when viewed with (Continued)

transmitted light. The second symbol is visible, and the first symbol and the third symbol are visible and indistinguishable, when viewed with transmitted light.

20 Claims, 19 Drawing Sheets
(17 of 19 Drawing Sheet(s) Filed in Color)

Related U.S. Application Data continuation of application No. 17/962,053, filed on Oct. 7, 2022, now Pat. No. 11,850,878.

(60) Provisional application No. 63/287,754, filed on Dec. 9, 2021, provisional application No. 63/254,799, filed on Oct. 12, 2021.

(51) Int. Cl.

| | |
|---|---|
| ***B41F 7/02*** | (2006.01) |
| ***B41F 31/00*** | (2006.01) |
| ***B41F 33/00*** | (2006.01) |
| ***B41M 1/10*** | (2006.01) |
| ***B41M 1/14*** | (2006.01) |
| ***B41M 3/14*** | (2006.01) |
| ***B42D 25/342*** | (2014.01) |
| ***B42D 25/351*** | (2014.01) |
| ***B42D 25/378*** | (2014.01) |
| ***B42D 25/405*** | (2014.01) |
| *B42D 25/333* | (2014.01) |

(52) U.S. Cl.

CPC ........... *B41F 33/0036* (2013.01); *B41M 1/10* (2013.01); *B41M 1/14* (2013.01); *B41M 3/14* (2013.01); *B41M 3/148* (2013.01); *B42D 25/342* (2014.10); *B42D 25/351* (2014.10); *B42D 25/378* (2014.10); *B42D 25/405* (2014.10); *B41M 2205/34* (2013.01); *B41P 2227/10* (2013.01); *B42D 25/333* (2014.10)

(56) References Cited

U.S. PATENT DOCUMENTS

| | | | | |
|---|---|---|---|---|
| 6,089,614 | A * | 7/2000 | Howland | B42D 25/355 428/209 |
| 2009/0045618 | A1* | 2/2009 | Williams | B42D 25/29 283/85 |
| 2010/0089261 | A1 | 4/2010 | Schwitzky | |
| 2010/0164219 | A1* | 7/2010 | Jeacock | B42D 25/40 428/29 |
| 2011/0139024 | A1 | 6/2011 | Schiffmann | |
| 2015/0290927 | A1 | 10/2015 | Frantz et al. | |
| 2017/0259600 | A1 | 9/2017 | Aoyama et al. | |
| 2018/0229494 | A1 | 8/2018 | Booth | |
| 2019/0061409 | A1* | 2/2019 | Whiteman | B42D 25/378 |
| 2019/0100046 | A1 | 4/2019 | Zlotnick et al. | |
| 2019/0241005 | A1 | 8/2019 | Mercier | |
| 2020/0238744 | A1 | 7/2020 | Guillerey et al. | |

FOREIGN PATENT DOCUMENTS

| | | | | |
|---|---|---|---|---|
| JP | 2015112798 | A * | 6/2015 | |
| JP | 2015205417 | A * | 11/2015 | |
| JP | 2016203460 | A | 12/2016 | |
| WO | WO-2016012512 | A1 * | 1/2016 | B42D 25/20 |

OTHER PUBLICATIONS

Joel Zlotnick et al., "Security by Design: Colour & Split fountains—Interrupting Traditional Counterfeiting (Part 1)," https://platform.keesingtechnologies.com/security-by-design-colour-split-fountains/, Feb. 1, 2016.

Joel Zlotnick et al., "Security by Design: Monochrome Colour Gamut—Interrupting Traditional Counterfeiting (Part 2)," https://platform.keesingtechnologies.com/security-by-design-monochrome-colour-gamut/, Jun. 7, 2016.

Joel Zlotnick et al., "Security by Design: Security Design & Ink Opacity—Interrupting Traditional Counterfeiting (Part 3)," https://platform.keesingtechnologies.com/security-by-design-security-design-ink-opacity/, Jun. 7, 2017.

Joel Zlotnick et al., "Security by Design: Split Fountains Redux—Interrupting Traditional Counterfeiting (Part 4)," https://platform.keesingtechnologies.com/security-by-design-split-fountains-redux/, Oct. 1, 2017.

Joel Zlotnick et al., "Security by Design: False Split Fountains—Interrupting Traditional Counterfeiting (Part 5)," https://platform.keesingtechnologies.com/security-by-design-false-split-fountains/, Feb. 1, 2018.

Joel Zlotnick et al., "Security by Design: Split Fountain Position—Interrupting Traditional Counterfeiting (Part 6)," https://platform.keesingtechnologies.com/security-by-design-split-fountain-position/, Jun. 7, 2018.

Joel Zlotnick et al., "Security by Design: Split Fountain Width—Interrupting Traditional Counterfeiting (Part 7)," https://platform.keesingtechnologies.com/security-by-design-split-fountain-width/, Mar. 22, 2019.

Joel Zlotnick et al., "Security by Design: Three Inks in a Fountain—Interrupting Traditional Counterfeiting (Part 8)," https://platform.keesingtechnologies.com/security-by-design-three-inks-in-a-fountain/, Jan. 7, 2020.

Joel Zlotnick et al., "3D Printing, Counterfeiting and Risk," https://platform.keesingtechnologies.com/3d-printing-counterfeiting-and-risk/, Jun. 12, 2019.

Joel Zlotnick et al., "Optimising Microprinting: Font and Artwork," https://platform.keesingtechnologies.com/microprinting-1/, Oct. 8, 2020.

Joel Zlotnick et al., "Inks and Colour Gamut in Microprinting," https://platform.keesingtechnologies.com/microprinting-2/, Oct. 13, 2020.

Joel Zlotnick et al., "Microprinting Placement," https://platform.keesingtechnologies.com/microprinting-3/, Oct. 27, 2020.

Joel Zlotnick et al., "Optimizing Microprinting in Lamination Plate Features," https://platform.keesingtechnologies.com/optimizing-microprinting-in-lamination-plate-features/, Jan. 27, 2022.

Joel Zlotnick et al., "Simultaneous Offset: Strategies for Optimization (Part 1),"https://platform.keesingtechnologies.com/simultaneous-offset-strategies-for-optimization-part-1/, Nov. 23, 2021.

Joel Zlotnick et al., "Simultaneous Offset: Strategies for Optimization (Part 2), "https://platform.keesingtechnologies.com/simultaneous-offset-strategies-for-optimization-part-2/, Dec. 8, 2021.

Joel Zlotnick et al., "Simultaneous Offset: Strategies for Optimization (Part 3)," https://platform.keesingtechnologies.com/simultaneous-offset-strategies-for-optimization-part-3/, Dec. 15, 2021.

Joel Zlotnick et al., "Simultaneous Offset: Strategies for Optimization (Part 4), "https://platform.keesingtechnologies.com/simultaneous-offset-strategies-for-optimization-part-4/, Jan. 12, 2022.

Joel Zlotnick et al., "Simultaneous Offset: Strategies for Optimization (Part 5),"https://platform.keesingtechnologies.com/simultaneous-offset-strategies-for-optimization-part-5/, Jan. 19, 2022.

* cited by examiner

Front Transmitted Light Back

Front Transmitted Light Back

Front Transmitted Light Back

SUBSTRATE OF OFFSET PRINTING UTILIZING IMAGE MOVEMENT

CROSS-REFERENCE TO RELATED APPLICATIONS

The application is a divisional of U.S. patent application Ser. No. 17/963,746, entitled OFFSET PRINTING UTILIZING IMAGE MOVEMENT, filed on Oct. 11, 2022, which is a continuation of U.S. patent application Ser. No. 17/962,053 entitled OFFSET PRINTING OF SECURITY SYMBOLS ON A SUBSTRATE, filed on Oct. 7, 2022, which claims the benefit of priority from and is a non-provisional of U.S. Provisional Application No. 63/254,799 entitled "Optimizing Microprinting in Offset, Intaglio and Lamination Plate Features," filed on Oct. 12, 2021, and U.S. Provisional Application No. 63/287,754 entitled "Optimizing Microprinting in Offset, Intaglio and Lamination Plate Features," filed on Dec. 9, 2021, the entire disclosures of which are incorporated herein by reference.

STATEMENT OF GOVERNMENT INTEREST

The present invention was made by one or more employees of the United States Department of Homeland Security in the performance of their official duties. The U.S. Government has certain rights in this invention.

FIELD

The discussion below relates generally to security printing and, more specifically, to offset printing to deter counterfeiting.

BACKGROUND

In printing parlance, the term "registration" is used to describe the alignment of images applied in multiple printing steps. Good alignment of plate images applied in sequential printing steps is an important quality control need for all industrial and consumer printing workflows, but for non-security applications these capabilities are limited to registration of images on the same side of a substrate. The opposite is true in security printing. Many security offset presses feature front-to-back capabilities in which registered offset art is printed simultaneously on both sides of the sheet, to be later inspected as a transmitted light security feature. Counterfeiters can find it difficult to achieve front-to-back register with traditional or digital commercial printing equipment that is not designed specifically for security work, allowing counterfeits to be detected in transmitted light when images are not correctly aligned.

SUMMARY

Simultaneous offset printing, also referred to as see-through register or front-to-back register, is a security printing technique in which offset plate images are applied to both sides of a substrate at the same time. This produces a printed security feature (an "icon" for the purposes of this disclosure) in which artwork on the front and back of the sheet are aligned to produce a complete design or visual effect in transmitted light. Replicating this effect is challenging for counterfeiters who only have access to commercial printing equipment not designed to achieve front-to-back register. In most security documents, simultaneous offset features are implemented in a single discrete area of limited size (referred to as an "icon") that may or may not be joined to other document artwork.

Embodiments of the present invention are directed to apparatuses and methods for providing various strategies for optimizing simultaneous offset icons relevant to ergonomics, placement, security feature integration, and perceptual effects. Multiple icons with different visual effects, sizes, plate counts, feature integrations, and so forth might be added without incurring large increases in cost. Simultaneous offset, when prioritized differently, can be a highly flexible foundational technology capable of integrating multiple visual effects throughout security offset artwork. Examples include simultaneous offset strategies including color change and saturation change effects. Additional examples explore contrast and simultaneous offset, with a new look at monochromatic design and ideas for using specialty inks such as metallic, clear, and white inks. Examples of design create monochromatic contrast effects such as image disappearance, image change, and image movement. Some examples integrate or incorporate split fountains. Simultaneous offset is actually a suite of highly flexible security features, extensible to full-document designs with multiple visual effects, where the various strategies described herein are integrated and optimized together.

According to one aspect involving incomplete icon artwork, individual characters are complete and recognizable in reflected light, while transmitted light is required to read the text, forcing inspection of registration in the simultaneous offset feature. The intact characters ensure the presence of text is conveyed to users while the alternation of characters between front and back prevents legibility in reflected light.

An aspect is directed to a substrate printed with front side markings on a first side and back side markings on a second side. The front side comprises a first information section and a first security section. The first security section comprises a first symbol printed with a first ink color and a set of stripes printed with a second ink color, the back side including a second information section and a second security section. The second security section comprises a second symbol, the same configuration as the first symbol, printed with the second ink color and the set of stripes printed with the first ink color. The front side and the back side of the substrate have markings to deter counterfeiting. The symbols and the stripes both appear to be a third color when viewed through transmitted light.

Another aspect is directed to a substrate having a front side and a back side and being printed with front side markings on the front side and back side markings on the back side. The front side has the front side markings which, when viewed with reflected light, comprises: a first marking printed with a first ink color in a first saturation and a first symbol printed with the first ink color in the first saturation. The back side has the back side markings which, when viewed with reflected light, comprises: a second marking printed with the first ink color in a second saturation; a second symbol printed with the first ink color in the second saturation; a third marking printed with the first ink color in the first saturation; and a third symbol printed with the first ink color in the first saturation. The first marking, the second marking, and the third marking are printed to provide an interlocking pattern of low saturation first ink color and high saturation first ink color when viewed with transmitted light. The first symbol, the second symbol, and the third symbol are printed to provide, when viewed with transmitted light, the second symbol which is visible in the second saturation and the first symbol and the third symbol which are not distinguishably visible.

In some embodiments, when viewed with transmitted light, the first symbol fills a first symbol space with the first ink color in the first saturation, the third symbol fills a third symbol space with the first ink color in the first saturation, and the first symbol and the third symbol fill the first symbol space and the third symbol space which form a combined space in the first ink color in the first saturation in which the first symbol and the third symbol are not distinguishably visible.

In specific embodiments, the second symbol has a same pattern as the first symbol and is spaced from the first symbol by a distance when viewed with transmitted light. The second marking on the back side overlaps and may be the same in size and shape as the third marking on the back side. The second saturation may be higher than the first saturation. The second saturation may be same as the first saturation.

Another aspect is directed to a method of printing anti-counterfeit markings on a substrate having front side markings on a front side and back side markings on a back side. The method comprises: printing with an offset printing press configured to print with a first printing plate to print on the front side of the substrate a first printed substrate marking printed with a first ink color at a first saturation and a first printed substrate symbol printed with the first ink color at the first saturation; printing with the offset printing press configured to print with a second printing plate to print on the back side of the substrate a second printed substrate marking printed with the first ink color at a second saturation and a second printed substrate symbol printed with the first ink color at the second saturation; printing with the offset printing press configured to print with a third printing plate to print on the back side of the substrate a third printed substrate marking printed with the first ink color at the first saturation and a third printed substrate symbol printed with the first ink color at the first saturation. The first printed substrate marking, the second printed substrate marking, the third printed substrate marking, the first printed substrate symbol, the second printed substrate symbol, and the third printed substrate symbol are printed to provide a pattern of low saturation and high saturation printed substrate markings visible in the first ink color when the substrate is viewed with transmitted light. The second printed substrate symbol is in the first ink color in the second saturation when the substrate is viewed with transmitted light, The first printed substrate symbol and the third printed substrate symbol are not distinguishably visible when the substrate is viewed with transmitted light.

In some embodiment, when viewed with transmitted light, the first printed substrate symbol fills a first symbol space with the first ink color in the first saturation, the third printed substrate symbol fills a third symbol space with the first ink color in the first saturation, and the first printed substrate symbol and the third printed substrate symbol fill the first symbol space and the third symbol space which form a combined space in the first ink color in the first saturation in which the first printed substrate symbol and the third printed substrate symbol are not distinguishably visible.

In specific embodiments, the first printed substrate marking is formed by printing the front side of the substrate using a first printing plate marking on the first printing plate; the second printed substrate marking is formed by printing the back side of the substrate using a second printing plate marking on the second printing plate; the third printed substrate marking is formed by printing the back side of the substrate using a third printing plate marking on the third printing plate marking; the first printed substrate symbol is formed by printing the front side of the substrate using a first printing plate symbol on the first printing plate; the second printed substrate symbol is formed by printing the back side of the substrate using a second printing plate symbol on the second printing plate; and the third printed substrate symbol is formed by printing the back side of the substrate using a third printing plate symbol on the third printing plate.

In some embodiments, the first printing plate symbol of the first printing plate and the third printing plate symbol of the third printing plate, when the first printing plate and the third printing plate are aligned for printing on the front side and the back side of the substrate, respectively, cover an overlapping space in which the first printing plate symbol and the third printing plate symbol are not spatially distinguishable.

In specific embodiments, the second printing plate symbol has a same pattern as the first printing plate symbol and is spaced from the first printing plate symbol by a distance when the first printing plate and the third printing plate are aligned for printing on the front side and the back side of the substrate, respectively. The second printing plate marking overlaps and may be the same in size and shape as the third printing plate marking when the second printing plate and the third printing plate are aligned for printing on the back side of the substrate.

In some embodiments, the method further comprises printing with the offset printing press configured to print with the first printing plate on the front side of the substrate from a first ink well; and printing with the offset printing press configured to print with the second printing plate on the back side of the substrate from a second ink well having ink of a higher saturation than ink in the first ink well.

Another aspect is directed to a method of printing on two sides of a substrate using an offset printing press. The method comprises: positioning a substrate having a front side containing a front security section and a back side containing a back security section onto an offset press; printing with a first printing unit of the offset press a first printed substrate marking in a first ink color in a first saturation and a first printed substrate symbol in the first ink color in the first saturation; aligning the back side of the substrate with ink from a second printing unit of the offset press within a preset threshold to ink from the first printing unit; printing with the second printing unit a second printed substrate marking in the first ink color in a second saturation and a second printed substrate symbol in the first ink color in the second saturation; printing with a third printing unit of the offset press a third printed substrate marking in the first ink color in the first saturation and a third printed substrate symbol in the first ink color in the first saturation; and printing the first printed substrate marking, the second printed substrate marking, the third printed substrate marking, the first printed substrate symbol, the second printed substrate symbol, and the third printed substrate symbol to provide a pattern of low saturation and high saturation markings visible in the first ink color when the substrate is viewed with transmitted light. The second printed substrate symbol is visible in the first ink color in the second saturation when the substrate is viewed with transmitted light. The first printed substrate symbol and the third printed substrate symbol are not distinguishably visible when the substrate is viewed with transmitted light.

Another aspect is directed to a substrate offset printed with front side and back side markings. The front side when viewed with reflected light includes: a first set of stripes printed with a first gradient of two colors; a second set of stripes printed with a second gradient of two colors; a first symbol printed with a third gradient of two colors; a second symbol printed with a fourth gradient of two colors; a third symbol printed with a fifth gradient of two colors; and a fourth symbol printed with a sixth gradient of two colors. The back side when viewed with reflected light includes: a third set of stripes printed with the fourth gradient; a fourth set of stripes printed with the third gradient; a fifth symbol printed with the second gradient; a sixth symbol printed with the first gradient; a seventh symbol printed with the sixth gradient; and an eighth symbol printed with the fifth gradient.

Another aspect is directed to a substrate having a front side and a back side and being printed with front side markings on the front side and back side markings on the back side. The front side has front side markings and, when viewed with reflected light, comprises: a first marking printed with a first gradient of two colors, the first gradient flowing from a first color, to a second color, back to the first color; a first symbol printed with a third gradient of two colors, the third gradient flowing from a fourth color, to a fifth color, back to the fourth color; a second symbol printed with a fourth gradient flowing from the fifth color, to a sixth color, back to the fifth color. The back side has back side markings and, when viewed with reflected light, comprises: a third marking printed with the fourth gradient; a fifth symbol printed with the second gradient; and a sixth symbol printed with the first gradient.

Another aspect is directed to a method of printing anti-counterfeit markings on a substrate having front side markings on a front side and back side markings on a back side. The method comprises: printing the front side of the substrate with the front side of the substrate showing a front pattern of reflected symbols and marking when viewed with reflected light, the front pattern containing: a first printed substrate marking printed with a first reflected light gradient of two colors, the first reflected light gradient flowing from a first color, to a second color, back to the first color; a first printed substrate symbol printed with a third reflected light gradient of two colors, the third reflected light gradient flowing from a fourth color, to a fifth color, back to the fourth color; and a second printed substrate symbol printed with a fourth reflected light gradient flowing from the fifth color, to a sixth color, back to the fifth color; and printing the back side of the substrate with the back side of the substrate showing a back pattern of reflected symbols and markings when viewed with reflected light, the back pattern containing: a third printed substrate marking printed with the fourth reflected light gradient; a fourth printed substrate marking printed with the third reflected light gradient; and a sixth printed substrate symbol printed with the first reflected light gradient.

Yet another aspect is directed to a system having an offset printing press which comprises: a first print unit containing a first split fountain, a first printing plate, and a first ink well containing an inside section and outside sections, the first print unit configured to print a front side of a substrate in a first gradient at least one of a printing plate marking or a printing plate symbol; a second print unit containing a second split fountain, a second printing plate, and a second ink well containing an inside section and outside sections, the second print unit configured to print the front side of the substrate in a second gradient at least one of a printing plate marking or a printing plate symbol; and a third print unit containing a third split fountain, a third printing plate, and a third ink well containing an inside section and outside sections, the third print unit configured to print the front side of the substrate in a third gradient at least one of a printing plate marking or a printing plate symbol. The first ink well has a first ink of a first ink color on the outside sections and a second ink of a second ink color on the inside section. The second ink well has the second ink of a second ink color on the outside sections and a third ink of a third ink color on the inside section. The third ink well has the third ink of the third ink color on the outside sections and the first ink of the first ink color on the inside section. All the markings and symbols appear to be black in color when the substrate is viewed with transmitted light.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The attached drawings disclose the embodiments.

DETAILED DESCRIPTION

A number of examples or embodiments of the present invention are described and disclosed herein. The present invention provides many applicable inventive concepts that have been disclosed and can be embodied in a variety of ways. Rather, as will be appreciated by one of skill in the art, the teachings and disclosures herein can be combined or rearranged with other portions of this disclosure along with the knowledge of one of ordinary skill in the art.

Simultaneous Offset Printing

Figure 1:
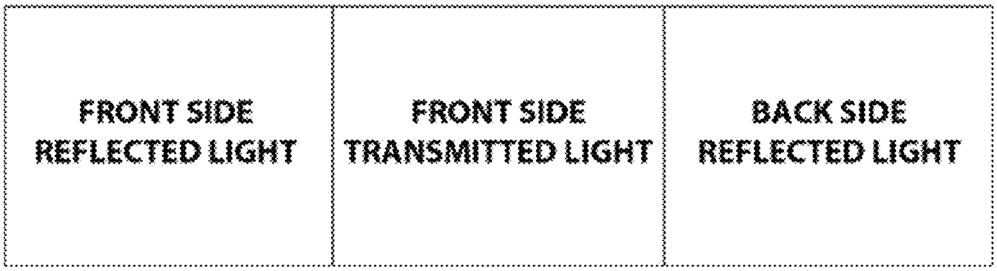
FIG. 1 shows a format for displaying figure graphics in triplicate to illustrate both the front and back images in reflected light as well as the complete feature artwork in transmitted light.

Simultaneous offset printing, also referred to as see-through register or front-to-back register, is a security printing technique in which offset plate images are applied to both sides of a substrate at the same time. This produces a printed security feature in which artwork on the front and back of the sheet are aligned to produce a complete design or visual effect in transmitted light. Replicating this effect is challenging for counterfeiters who only have access to commercial printing equipment not designed to achieve front-to-back register. In most security documents, simultaneous offset features are implemented in a single discrete area of limited size (referred to as an "icon") that may or may not be joined to other document artwork. Icons have many aspects, including hardware/material variables (e.g., plate count, ink colors, and ink saturation) and soft design variables (e.g., artwork, placement, and size). Figure graphics are displayed in triplicate to illustrate both the front and back images in reflected light as well as the complete feature artwork in transmitted light, following the format demonstrated in FIG. 1.

In a simplest example, a simple simultaneous offset icon only requires one plate image on the front and one plate image on the back. In the two-plate simultaneous offset design, the icon is not connected to other document artwork, which may make it easier for users to find but could also allow counterfeiters to attack it in isolation. This design only features one plate on each side and does not force traditional counterfeiters to register same-side multiplate artwork.

More complex simultaneous offset designs with multiple same-side plate images can require both same-side and opposite-side registration, with different consequences for traditional and digital counterfeiting workflows. Traditional offset counterfeiters must align multiple same-side plate impressions in the same way as genuine issuers, and more plate images means more opportunities for registration errors. In contrast, digital counterfeiters can simulate any number of registered conventional spot colors on one side of a substrate with a single CMYK printing step. Therefore, increasing the number of same-side colors in a genuine simultaneous offset icon does not necessarily also introduce same-side registration problems in digital counterfeiting workflows.

Icons can be connected or registered to external offset artwork. An advantage of this strategy is that certain methods of counterfeiter simulation are impeded when the simultaneous offset feature ceases to be a standalone graphic and becomes inseparable from another artwork. Depending on the design, connecting the icon to other offset artwork can force counterfeiters to register not just images within the icon itself, but the entire multiplate offset artwork on one or both sides of the substrate. The interior of the icon, the icon border (if it has one) and the exterior artwork might each be viewed as independent elements. One considers not just front-to-back registration requirements within the icon and its border, but also what other plate images must be correctly registered to the icon edges or border but are not directly involved in the icon itself. Of course, icons can also be integrated with external artwork on both sides.

One may suggest that multiplate simultaneous offset features are disadvantaged against digital counterfeiting workflows as compared to traditional counterfeiting workflows, since digital simulations of reflected light art permit any number of same-side spot colors to be simulated by CMYK in one printing step without risk of misregistration. While this is an oversimplification, one way to limit this "advantage" is to incorporate metallic specular reflection, or other special reflected light ink effects, into simultaneous offset features. If the simultaneous offset icon contains one or more ink effects that cannot be simulated by CMYK, counterfeiters incorporate a different non-CMYK printing process/step capable of applying the special ink and register that process to the CMYK artwork. Essentially, this changes the same-side digital counterfeiting workflow from one step to two steps and forces same-side registration work that is not necessary for CMYK simulation of reflected light icon images that only contain spot colors.

With regard to registration in simultaneous offset features, increasing the number of same-side spot color plates in an icon has different functionality in combating traditional and digital counterfeiting workflows, all offset artwork on both sides can register either within an icon or to the edges of an icon even if the icon art itself does not include all plates, and icons that incorporate inks with properties not amenable to simulation by CMYK (for example, metallics) can force digital counterfeiters to use multistep simulation workflows, which introduces registration problems. However, it is also important to consider the value simultaneous offset offers regarding perceptual effects such as image appearance, image disappearance, image movement, and color or contrast changes. Next, we explore how icons support these visual effects, facilitate ergonomic inspection, and integrate with other security features.

One potential problem with simultaneous offset features is that document users may not recognize them. Icon graphics can signal the presence of a simultaneous offset feature. In reflected light, unprinted areas may appear conspicuously incomplete. The missing elements can be non-text artwork.

Incomplete icon artwork can also include text, which is different because no familiarity with specific national imagery is needed. Text icons can be categorized as to how the text is divided between the front and back. Prior work advocated for division of parts of individual characters across multiple plates in microprinting designs, but this may not be the best strategy for simultaneous offset icons if the reflected light art would not necessarily be recognizable as incomplete text. For simultaneous offset, a potentially better approach would visually signal text is present in reflected light (i.e., complete characters) but only allowing the complete text string to be read in transmitted light. In one approach, the intact characters ensure the presence of text is conveyed to users while the alternation of characters between front and back prevents legibility in reflected light. This both helps draw attention to the icon and forces inspection in transmitted light.

Figure 1A:
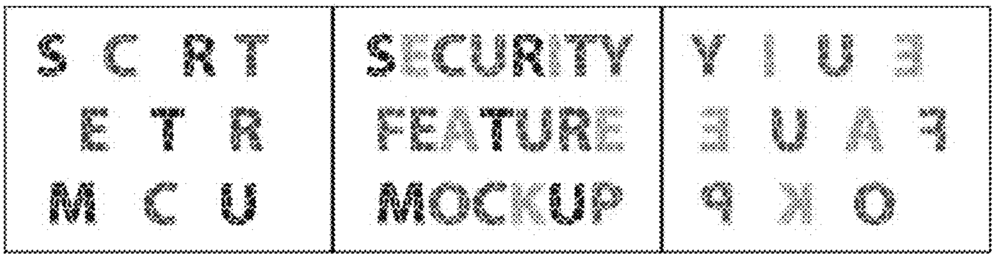
FIG. 1A illustrates an example of a four-plate simultaneous offset text icon.

FIG. 1A illustrates an example of a four-plate simultaneous offset text icon. Individual characters are complete and recognizable in reflected light, which signals to document users that legible text should be present and makes them question why it is not. Transmitted light is required to read the text, forcing inspection of registration in the simultaneous offset feature. A design like this, including complete characters but no complete character strings in reflected light, may be a good way to encourage inspection of text icons. The mockup in FIG. 1A illustrates a novel approach in which the intact characters ensure the presence of text is conveyed to users while the alternation of characters between front and back prevents legibility in reflected light.

Another ergonomic strategy is placing similar security features together so that they draw attention to one another and can be inspected at the same time. Simultaneous offset icons can be placed near other transmitted light security features such as watermarks, perforations, and security threads.

Simultaneous offset may be integrated with other features applied by offset printing, including some that are not normally inspected in transmitted light. It may involve constructing composite features that are harder to simulate than their individual components. This can be done by designing artwork that is technically unprintable without access to specific capabilities of security offset presses, including high resolution, split fountains, and compatibility with nonstandard inks. Counterfeiting cannot be stopped completely, but counterfeiting workflows can be made difficult and counterfeit quality can be suppressed.

Another aspect of ergonomics is the design of simultaneous offset to produce specific visual transitions when viewing conditions are changed from reflected light to transmitted light. It uses artwork to create four discrete visual/perceptual effects: image completion, image disappearance (or contrast reduction), contrast increase, and color change.

The artwork may be "complementary" if the front and back reflected light images show no overlap and is created by dividing a single complete image into front and back elements. The corresponding visual effect may be described as "image completion" if neither reflected light image is meaningful and the text is only legible in transmitted light. The icon is still a registration feature and counterfeits can be detected if the plates are misaligned, but it can also be described in terms of readable text appearing from unintelligible reflected light artwork, with consequences for user training. Complementary artwork can also make images disappear.

A single complete image may be partitioned between the front and back. The icon may have the same complete artwork on both sides. This produces two consequences. First, in reflected light neither side seems incomplete and the icon may not attract attention in the same way as other designs that appear unfinished. Second, instead of image completion or disappearance, in transmitted light the effect is of increasing saturation as the front and back layers overlap and opacity increases. Outside the icon the front and back art are different, so that in transmitted light the images compete, reducing clarity. For "image completion," a complete icon image may be partitioned between the front and back, both of which look incomplete because the artwork is not recognizable in reflected light. The complete icon image can only be seen in the transmitted light view.

Icons can be also designed with both complementary and identical art. Simultaneous offset can even be used to create color changing features. An icon may incorporate several strategies and effects in a single design.

Various strategies exist for optimizing simultaneous offset icons relevant to ergonomics, placement, security feature integration, and perceptual effects. Simultaneous offset features are typically included as a single, tiny, localized icon. However, because simultaneous offset is primarily a design feature, multiple icons with different visual effects, sizes, plate counts, feature integrations, and so forth might be added without incurring large increases in cost. This suggests that simultaneous offset may be an underutilized security feature which, if prioritized differently, could instead be a highly flexible foundational technology capable of integrating multiple visual effects throughout security offset artwork.

Figure 2A:
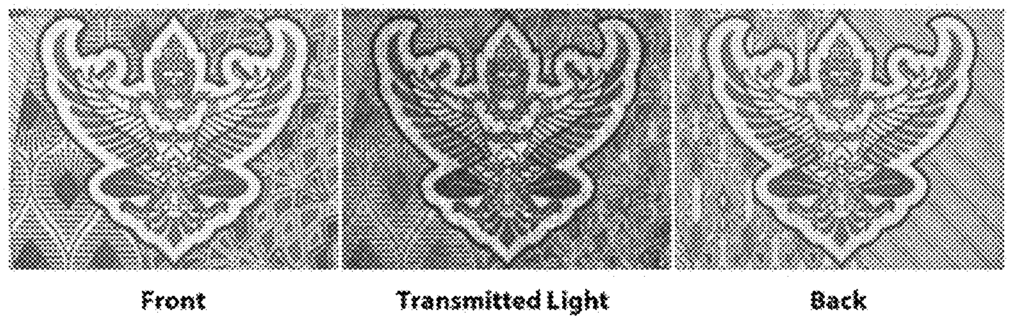
FIG. 2A illustrates an example of a saturation-changing simultaneous offset design in an issued banknote.

Simultaneous Offset Strategies Including Color Change and Saturation Change Effects FIG. 2A illustrates an example of a saturation-changing simultaneous offset design in an issued banknote. Both the artwork and ink colors are the same on the front (left) and back (right). In transmitted light (center) the front and back images are viewed simultaneously, darkening the icon. Saturation is increased in transmitted light, but this design does not produce a color (hue) change. Document users could be trained to look for a doubling of the icon image as evidence of counterfeiting, as that would be the result of misregistration.

Figure 2B:
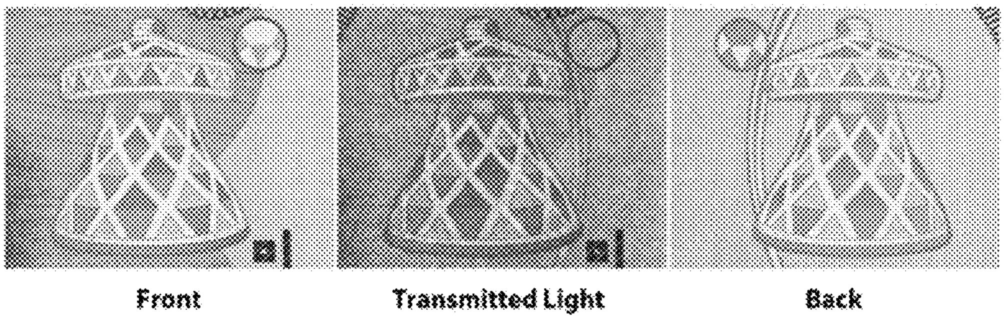
FIG. 2B illustrates an example of a color-changing simultaneous offset design in an issued banknote.

FIG. 2B illustrates an example of a color-changing simultaneous offset design in an issued banknote. The artwork is the same on both sides (except inside the little circle), but the ink colors are different. In reflected light (left and right images) the design includes red and green on the front and red and blue on the back, so that in transmitted light (center) the color scheme changes to brown/purple. In user training this could be described as a feature that changes color in transmitted light, in addition to users checking for image doubling.

Figure 3A:
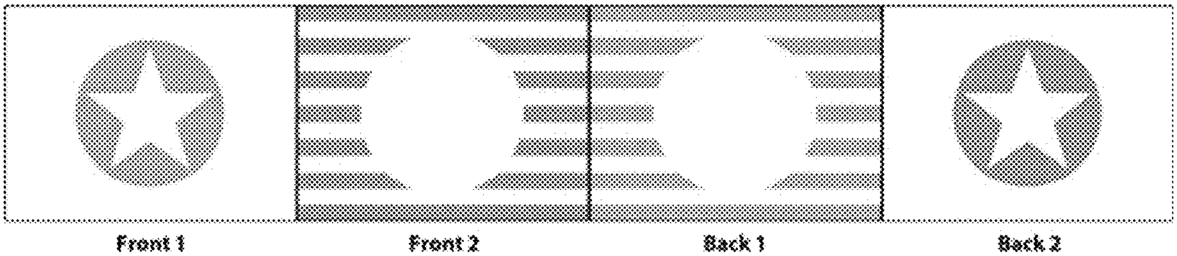
FIG. 3A illustrates an example of a simultaneous offset design with four plates and four ink colors, showing no overlap of plate artwork on either the front or the back of the substrate. Individual plate images are shown here.
Figure 3B:
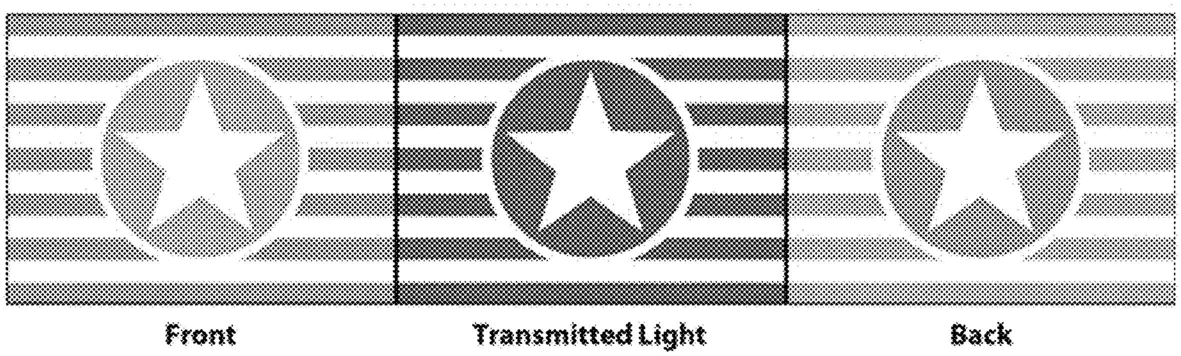
FIG. 3B shows the composite front, back and transmitted light images from the individual plates of FIG. 3A creating a transition to monochromatic in transmitted light.

FIG. 3A illustrates an example of a simultaneous offset design with four plates and four ink colors, showing no overlap of plate artwork on either the front or the back of the substrate. Individual plate images are shown here. FIG. 3B shows the composite front, back and transmitted light images from the individual plates of FIG. 3A. Both the front and back images contain two colors in reflected light, but the feature becomes monochromatic when the simultaneous offset feature is viewed in transmitted light because the two colors are in opposite placements within identical artwork on the front and back. Consider how deliberate arrangement of colors and artwork on the front and back creates this transition to monochromatic in transmitted light.

One aspect is directed to a substrate printed with front side markings on a first side and back side markings on a second side. The front side comprises a first information section and a first security section. The first security section comprises a first symbol printed with a first ink color and a set of stripes printed with a second ink color, the back side including a second information section and a second security section. The second security section comprises a second symbol, the same configuration as the first symbol, printed with the second ink color and the set of stripes printed with the first ink color. The front side and the back side of the substrate have markings to deter counterfeiting. The symbols and the stripes both appear to be a third color when viewed through transmitted light.

According to another aspect, a system for printing markings on a substrate comprises a print setter including non-transitory computer readable instructions stored on a tangible computer read storage medium, the instructions causing a microprocessor connected to the print setter to: receive a front side image having a first information section and a first security section; generate a first plate having a first symbol formed in the first plate based on the first security section of the image; generate a second plate having a first set of stripes formed in the second plate based on the first security section of the image; receive a back side image having a second information section and a second security section; generate a third plate having a second symbol formed in the third plate based on the second security section of the image; and generate a fourth plate having a second set of stripes formed in the fourth plate based on the second security section of the image.

In some embodiment, the system comprises an offset press which includes a substrate tray, a feeder, a substrate registration unit, a first print unit, a second printing unit, a third printing unit, and a fourth printing unit. The substrate tray is configured to hold multiple substrates. The feeder is configured to feed substrate into the offset press one by one. The substrate registration unit is configured to orient each substrate so that each substrate is positioned within a threshold before a substrate mover pulls the substrate into a printing unit, the substrate mover having grippers. The first printing unit includes the first plate, a first ink reservoir having the first symbol, and a first ink roller configured to apply the first symbol to each substrate. The second printing unit includes the second plate, a second ink reservoir having a first set of stripes, and a second ink roller configured to apply the first set of stripes to each substrate. The third printing unit includes the third plate, a third ink reservoir having the second symbol, and a third ink roller configured to apply the second symbol to each substrate. The fourth printing unit includes the fourth plate, a fourth ink reservoir having a second set of stripes, and a fourth ink roller configured to apply the second set of stripes to each substrate. The front side of the security section shows with reflected light, the first set of stripes in the second color and the first symbol in the first color. The back side of the security section of the substrate is positioned to receive the second set of stripes in the first color and the second symbol in the second color. The first and second symbol form a single transmitted light symbol in a fifth color when the substrate is viewed with transmitted light to deter counterfeiting. The first set of stripes and second set of stripes form one set of transmitted light stripes when the substrate is viewed with transmitted light to deter counterfeiting.

In some embodiments, the first color may be magenta, the second color may be cyan, and the third color may be blue. The substrate may be a banknote. In specific embodiments, the first information section and/or the second information section may comprise a country of origin. In one example, the information section provides an icon outline of an issuing country's border which would be a shape familiar to users of a banknote. The first information section and the second information section may each appear incomplete; however, in transmitted light this icon forms the complete border.

Another aspect is directed to a method for producing a substrate bearing anticounterfeit markings. The method comprises receiving a front side image having a first information section and a first security section with a print setter; generating a first plate including a first symbol formed in the first plate based on the first security section of the image; generating a second plate including a first set of stripes formed in the second plate based on the first security section of the image; receiving a back side image having a first information section and a first security section; generating a third plate having a second symbol formed in the third plate based on the first security section of the image; generating a fourth plate including a second set of stripes formed in the fourth plate based on the first security section of the image; printing on a front side of the substrate with an offset printing press; applying ink in a first color to the substrate in a first printing unit of the offset printing press; applying ink in a second color to the substrate in a second printing unit of the offset printing press; aligning the substrate to print on the back side of the substrate; applying ink in a second color to the substrate in a third printing unit of the offset printing press; applying ink in a first color to the substrate in a fourth printing unit of the offset printing press; capturing a visual media file with a camera connected to the offset printing press of the front side of the substrate with reflected light, the back side of the substrate with reflected light, the front side of the substrate with transmitted light, and the back side of the substrate with transmitted light; and determining with a microprocessor running computer executable code non-transitorily stored on tangible computer readable media that: the first symbol appears to be the first color when viewed from the front side with reflected light, the first set of stripes appear to be the second color when viewed from the front side with reflected light, the second symbol appears to be the second color when viewed from the back side with reflected light, the second set of stripes appear to be the second color when viewed from the back side with reflected light, the first symbol appears to be a third color when viewed from the front side with transmitted light, the first set of stripes appear to be the third color when viewed from the front side with transmitted light, the second symbol appears to be the third color when viewed from the back side with transmitted light, and the second set of stripes appear to be the third color when viewed from the back side with transmitted light.

In accordance with another aspect, a system comprises a set of at least eight printing plates for an offset printing press and an offset printing press. The set includes a first printing plate having a first information section and a first security section; a second printing plate having a second information section and a second security section; a third printing plate having a third information section and no security section; a fourth printing plate having a fourth information section and no security section; a fifth printing plate having a fifth information section and a fifth security section; a sixth printing plate having a sixth information section and a sixth security section; a seventh printing plate having a seventh information section and no security section; and an eighth printing plate having an eighth information section and no security section. The offset printing press is configured to receive the first plate, second plate, third plate, and fourth plate into a first printing unit, second printing unit, third printing unit, and fourth printing unit respectively. The offset printing press is configured to print a front side of a security section of a substrate. The offset printing press is configured to receive fifth plate, sixth plate, seventh plate, and eighth plate into a fifth printing unit, sixth printing unit, seventh printing unit, and eighth printing unit respectively. The offset printing press is configured to print a back side of a security section of a substrate. The front side of the security section is a first color when viewed with reflected light. The back side of the security section is a second color when viewed with reflected light. The front side of the security section is a third color when viewed with transmitted light.

In some embodiments, a substrate registration unit of the printing press is configured to ensure that ink from the first four print units aligns with ink from the second four printing units within a predetermined tolerance (e.g., within 10% or within 5% or within 1%).

Another aspect is directed to a method of printing anti-counterfeit markings on a substrate having front side markings on a front side and back side markings on a second side, the front side including a first information section and a first security section. The method comprises: printing with an offset printing press using a first plate in the first security section a first symbol with a first ink color; printing with the offset printing press using a second plate in the first security section a first set of stripes printed with a second ink color; printing with the offset printing press using a third plate in the second security section a second symbol in the first ink color; and printing with the offset printing press using a fourth plate in the second security section a second set of stripes in the first ink color. The front side of the substrate has markings to deter counterfeiting wherein when viewed with reflected light, the first set of stripes has a hue substantially similar to the second ink color. The first symbol has a hue substantially similar to the first ink color. The back side of the substrate has markings to deter counterfeiting wherein when viewed with reflected light, the second set of stripes has a hue substantially similar to the first ink color. The second symbol has a hue substantially similar to the second ink color. The front side and the back side of the substrate has markings to deter counterfeiting wherein when viewed with transmitted light, the first set of stripes and the second set of stripes have a hue in a third color and the first symbol and the second have a hue in the same third color.

Yet another aspect is directed to a method of printing on two sides of a substrate using an offset printing press. The method comprises: positioning substrate having a front side containing a front security section and a back side containing a back security section onto an offset press; printing with a first printing unit in the front security section a first symbol with a first printing plate in a first ink color; printing with a second printing unit in the front security section a first symbol from a second printing plate in a second ink color; aligning a back side of the substrate such that ink from the first printing unit and the second printing unit aligns with ink from a third printing unit and a fourth printing unit; printing with the third printing unit in the back security section a second symbol in the first ink color; printing with the fourth printing unit in the back security section a second set of stripes in the first ink color; printing the first set of stripes and the second set of stripes such that they form a single set of stripes in a third color when viewed with transmitted light to prevent counterfeiting of a document or printed product resulting from the printed substrate; and printing the first symbol and second symbol such that they form a single symbol in the third color when viewed with transmitted light.

Figure 4A:
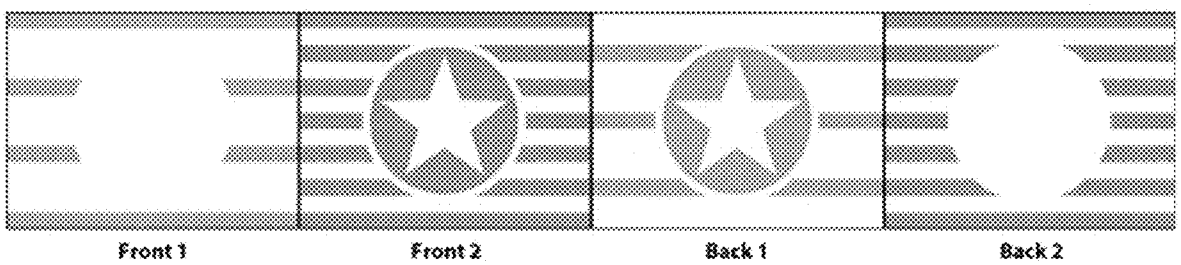
FIG. 4A illustrates an example of a simultaneous offset design with four plates and four ink colors showing overlap of plate artwork.
Figure 4B:
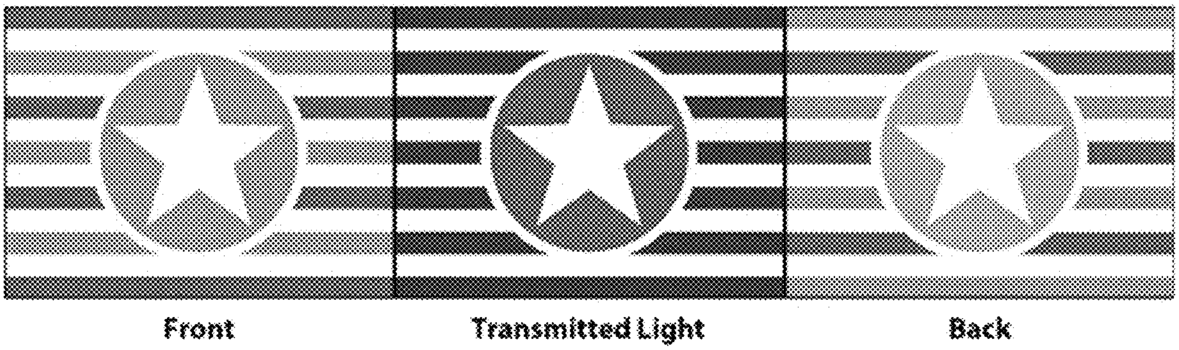
FIG. 4B shows the composite front, back and transmitted light images from the individual plates of FIG. 4A creating a two-color effect.

FIG. 4A illustrates an example of a simultaneous offset design with four plates and four ink colors showing overlap of plate artwork. Unlike FIGS. 3A and 3B, this example shows overlap of plate artwork (in some of the stripes) on the same side of the substrate. Individual plate images are shown here. FIG. 4B shows the composite front, back and transmitted light images from the individual plates of FIG. 4A. This design is different from that of FIG. 3B because it contains some same-side plate art overlap. Artwork from the cyan and magenta plates on either side intersects to create the appearance of blue in reflected light. In transmitted light, just as the front and back artwork in FIG. 3B produces a monochromatic effect, this artwork creates a two-color effect with darker stripes and a lighter star design.

An aspect is directed to a substrate printed with front side markings on a first side and back side markings on a second side. The front side of the substrate has markings to deter counterfeiting. When viewed with reflected light, the front side of the substrate includes a first set of stripes having alternating colors of a first set of stripes and a second set of stripes, the set of stripes including a first ink color and a second ink color, the second set of stripes including only the second ink color; and a first symbol including only the second ink color. The back side of the substrate has markings to deter counterfeiting. When viewed with reflected light, the back side of the substrate includes a second set of stripes having alternating colors of the first set of stripes and the second set of stripes, the first set of stripes including the second ink color, the second set of stripes including the first ink color and the second ink color; and a second symbol including a third ink color. The first set of stripes and second set of stripes form a single set of stripes in a fourth color when viewed with transmitted light. The first symbol and second symbol form a single symbol in the third color when viewed with transmitted light.

Another aspect is directed to a method of printing anti-counterfeit markings on a substrate having front side markings on a first side and back side markings on a second side, the front side including a first information section and a first security section, the back side including a second information section and a second security section. The method comprises: printing with an offset printing press using a first plate in the first security section a first set of stripes printed with a first ink color; printing with the offset printing press using a second plate in the first security section: a second set of stripes printed with a second ink color, the second set of stripes containing more stripes that the first set of stripes, the second set of stripes overlapping all of the first set of stripes, and a symbol printed with the second ink color; printing with the offset printing press using a third plate in the second security section: a third set of stripes printed with the first ink color and a second symbol, the same configuration as the first symbol, printed with the first ink color; and printing with the offset printing press using a fourth plate in the second security section a fourth set of stripes printed with the second ink color, the fourth set of stripes containing more stripes than the third set of stripes, all of the fourth set of stripes overlapping the third set of stripes. The front side of the substrate has markings to deter counterfeiting wherein when viewed with reflected light, the second set of stripes has alternating colors of a third color and the second color by virtue of the first set of strips and second set of stripes being printed in an overlapping fashion, and the first symbol reflects the second ink color. The back side of the substrate has markings to deter counterfeiting wherein when viewed with reflected light, the third set of stripes has alternating colors of a third color and the second color, but in an opposite sequence as compared to the front side, by virtue of the first set of stripes and second set of stripes being printed in an overlapping fashion, the second symbol has the first ink color. The first set of stripes, second set of stripes, third set of stripes, and fourth set of stripes form a single set of stripes in a fourth color when viewed with transmitted light. The first symbol and second symbol form a single symbol in the third color when viewed with transmitted light.

Another aspect is directed to a method of printing on two sides of a substrate using an offset printing press. The method comprises: positioning substrate having a front side containing a front security section and a back side containing a back security section onto an offset press; printing with a first printing unit in the front security section a first set of stripes with a first printing plate in a first ink color; printing with a second printing unit in the front security section a second set of stripes and a first symbol from a second printing plate in a second ink color; aligning a back side of the substrate such that ink from a third printing unit and a fourth printing unit are aligned within a preset threshold to ink from the first printing unit and the second printing unit; printing with the third printing unit in the back security section a third set of stripes and a second symbol in the first ink color; printing with a fourth printing unit in the back security section a fourth set of stripes in the second ink color; printing the first set of stripes, second set of stripes, third set of stripes, and fourth set of stripes such that they form a single set of stripes in a fourth color when viewed with transmitted light to prevent counterfeiting of a document or printed product resulting from the printed substrate; and printing the first symbol and the second symbol such that they form a single symbol in the third color when viewed with transmitted light. In some embodiments, the preset threshold may be within 10%, or within 5%, or within 1%.

Figure 5A:
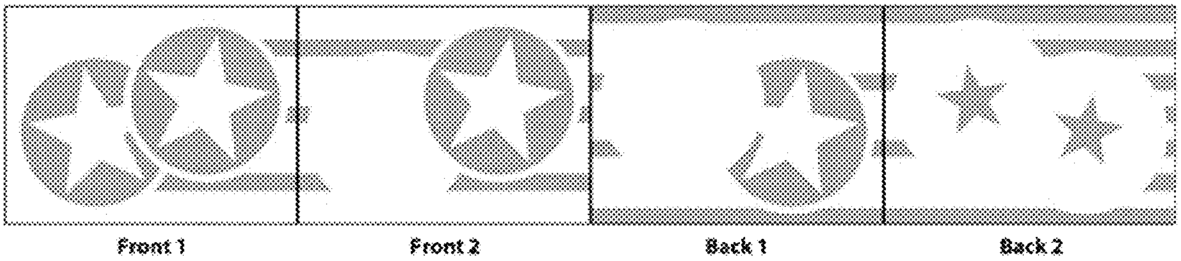
FIG. 5A illustrates an example of a simultaneous offset design with four plates and one ink color, with overlap of some plate artwork on both the front and back showing increased saturation.
Figure 5B:
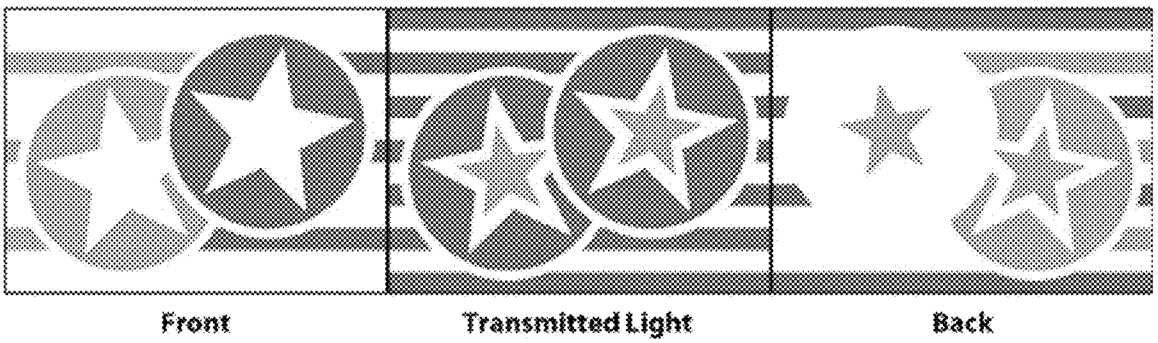
FIG. 5B shows the composite front, back and transmitted light images from the individual plates of FIG. 5A creating an “image appearance” effect.

FIG. 5A illustrates an example of a simultaneous offset design with four plates and one ink color, with overlap of some plate artwork on both the front and back showing increased saturation. This design is already monochromatic; as such, where plate images intersect the result is more an increase in saturation than a change in color. Individual plate images are shown here. FIG. 5B shows the composite front, back and transmitted light images from the individual plates of FIG. 5A. Where one ink color is applied from several different plates, overlap of artwork increases saturation instead of changing hue. In this example the transmitted light image shows just two discrete saturations, but a design with more complex art intersections could incorporate up to four discrete saturation levels. This art also shows an "image appearance" effect as the smaller stars become visible from the front only in transmitted light.

An aspect is directed to a substrate printed with front side markings on a first side and back side markings on a second side to deter counterfeiting. The front side has markings to deter counterfeiting. The front side when viewed with reflected light comprises: a first set of stripes printed with a part of the stripes printed with a first ink color at a first saturation and a second part of the stripes printed with the first ink color at a second saturation; a first symbol printed at the first saturation; and a second symbol printed with the first ink color at a second saturation. The back side has markings to deter counterfeiting. The back side when viewed with reflected light comprises: a second set of stripes printed with the first ink color at the first saturation; a third set of stripes printed with the first ink color at the second saturation; a third symbol having a same shape as the second symbol but smaller in area printed with the first ink color at the first saturation; a fourth symbol printed at the first saturation; and a fourth and fifth symbol having a same shape. The first set of stripes, second set of stripes, and third set of stripes form a single set of stripes in the first color and second saturation when viewed with transmitted light. The first symbol, fourth symbol, and fifth symbol form two concentric symbols with a larger of the two concentric symbols being formed from an absence of ink in a second saturation and a smaller of the two concentric symbols being from a presence of ink in a first saturation when viewed with transmitted light. The second symbol and third symbol form two concentric symbols with a larger of the two concentric symbols being formed from an absence of ink in a second saturation and a smaller of the two concentric symbols being from a presence of ink in a first saturation when viewed with transmitted light.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press using a first plate and a second plate to print on the front side of the substrate: a first set of stripes printed with a part of the stripes printed with a first ink color at a first ink saturation and a second part of the stripes printed with the first ink color at a second ink saturation, a first symbol printed at the first ink saturation, and a second symbol printed with the first ink color at a second ink saturation; and printing with an offset printing press using a third plate and a fourth plate to print on the back side of the substrate: a second set of stripes printed with the first ink color at the first ink saturation, a third set of stripes printed with the first ink color at the second ink saturation, a third symbol having a same shape as the second symbol but smaller in area printed with the first ink color at the first ink saturation, a fourth symbol printed at the first ink saturation, and a fifth symbol having a same shape as the fourth symbol. The first set of stripes, second set of stripes, and third set of stripes form a single set of stripes in the first color and second ink saturation when viewed with transmitted light to deter counterfeiting. The first symbol, fourth symbol, and fifth symbol form two concentric symbols having the second ink saturation of ink when viewed with transmitted light to deter counterfeiting. The second symbol and third symbol form two concentric symbols having the second ink saturation when viewed with transmitted light to deter counterfeiting.

Another aspect is directed to a method of printing on two sides of a substrate using an offset printing press. The method comprises: positioning substrate having a front side containing a front security section and a back side containing a back security section onto an offset press; printing at a first ink saturation with a first printing unit in the front security section: a first set of stripes with a first ink color, a first symbol, and a second symbol; printing at a first ink saturation with a second printing unit in the front security section: a second set of stripes with a first ink color and a third symbol formed by an absence of ink; aligning a back side of the substrate such that ink from a third printing unit and a fourth printing unit is within a preset threshold to ink from the first printing unit and the second printing unit; printing at the first ink saturation with a third printing unit: a third set of stripes in the first ink color and a fourth symbol in the first ink color; printing at the first ink saturation with a fourth printing unit in the back security section: a fourth set of stripes with a first ink color, a fifth symbol having a same shape as the second symbol but smaller in area, and a sixth symbol having a same shape as the second symbol but smaller in area; printing the first set of stripes and second set of stripes so that they form parallel stripes wherein a first part of the stripes has the first ink saturation and a second part of the stripes has a second ink saturation when the front side of the substrate is viewed with reflected light; printing the first symbol, the second symbol, the third symbol so that the front side of the substrate shows two symbols when viewed with reflected light, a first reflected light symbol having the first ink saturation and a second reflected light symbol having the second saturation intensity; printing the third set of stripes and fourth set of stripes so that they form parallel stripes wherein a first part of the stripes has the first ink saturation and a second part of the stripes has a second ink saturation when the back side of the substrate is viewed with reflected light; printing the fourth symbol, fifth symbol, and sixth symbol so that the back side of the substrate shows two symbols when viewed with reflected light: a first reflected light symbol smaller than the first symbol, and a second reflected light symbol containing an inner symbol and an absence of ink forming a concentric outer symbol having a same shape as the inner symbol; printing the first set of stripes, second set of stripes, third set of stripes, and fourth set of stripes such that they form a single set of stripes in the second ink saturation when viewed with transmitted light to deter counterfeiting; and printing the first symbol, second symbol, third symbol, fourth symbol, fifth symbol, and sixth symbol such that they form a pair of symbols having an outer section at the second intensity, a middle section devoid of ink, and an inner section having the first intensity. The pair of symbols have substantially similar shapes when viewed with transmitted light to deter counterfeiting. In some embodiments, the preset threshold may be within 10%, or within 5%, or within 1%.

Figure 6A:
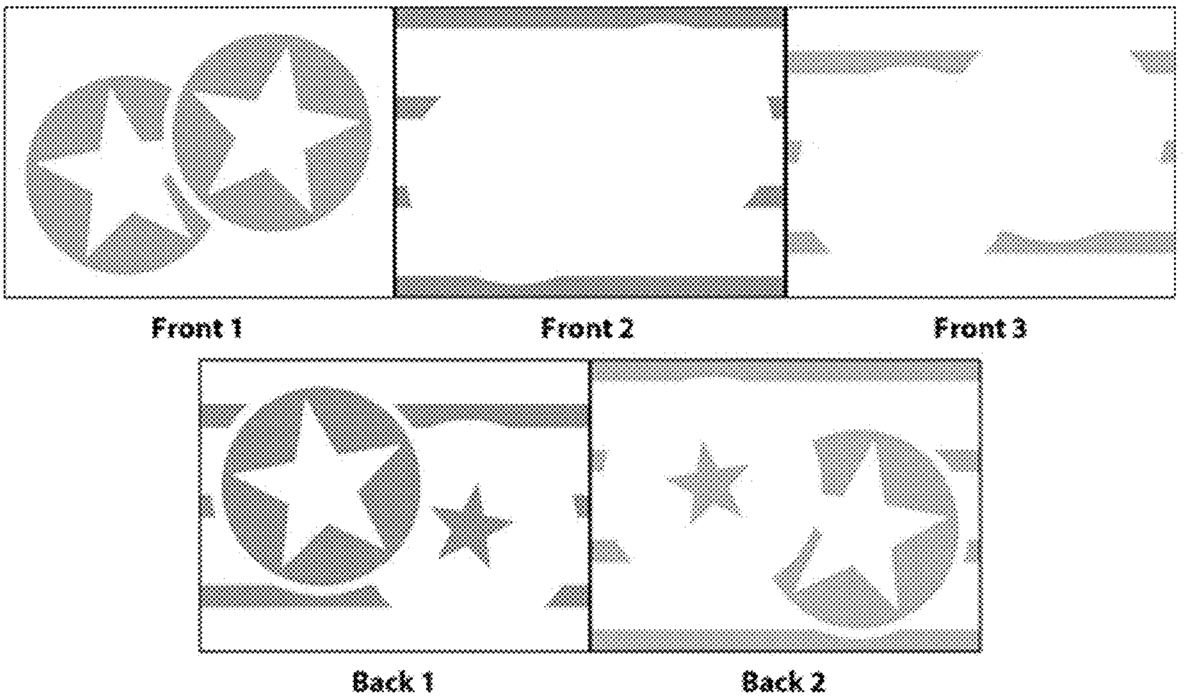
FIG. 6A illustrates an example of a simultaneous offset design with five plates and three ink colors, with no overlap of plate images on the same side of the substrate.
Figure 6B:
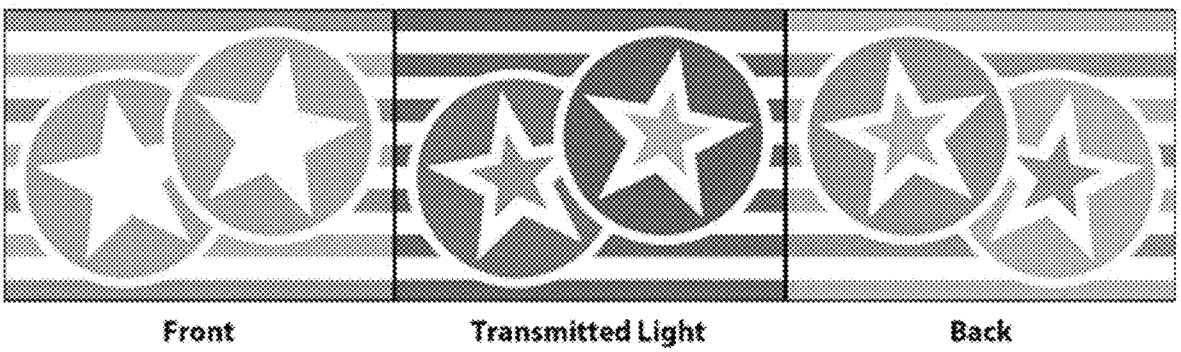
FIG. 6B shows the composite front, back and transmitted light images from the individual plates of FIG. 6A.

FIG. 6A illustrates an example of a simultaneous offset design with five plates and three ink colors, with no overlap of plate images on the same side of the substrate (as in FIG. 3A). This example illustrates how cyan, magenta, and yellow subtractive inks can produce the appearance of red, green, and blue additive colors in a simultaneous offset feature viewed in transmitted light. Individual plate images are shown here. FIG. 6B shows the composite front, back and transmitted light images from the individual plates of FIG. 6A. In reflected light, the front and back images contain no plate overlap and show only cyan, magenta, and yellow art. In transmitted light, intersection of cyan and magenta art produces blue, cyan, and yellow makes green and yellow plus magenta looks like red. As in FIG. 5B, the small center star "image appearance" effect only becomes visible when the icon is viewed from the front in transmitted light.

Figure 7A:
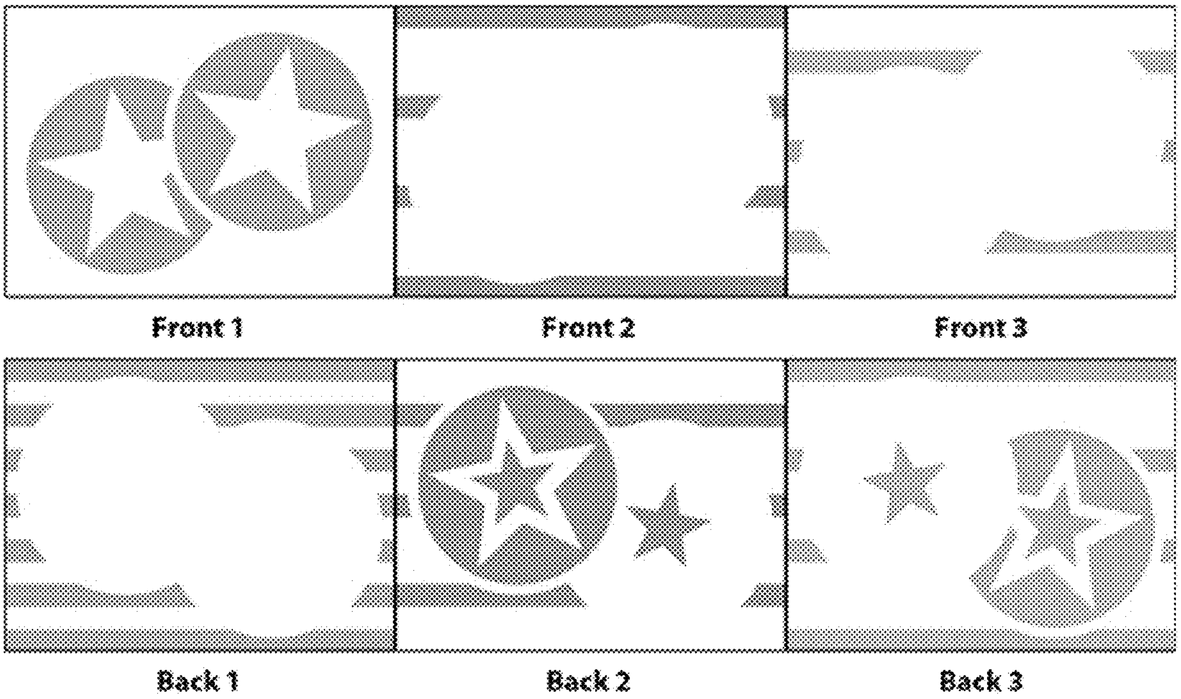
FIG. 7A illustrates an example of a simultaneous offset design with six plates and three ink colors, with some overlap of plate images on the same side of the substrate.
Figure 7B:
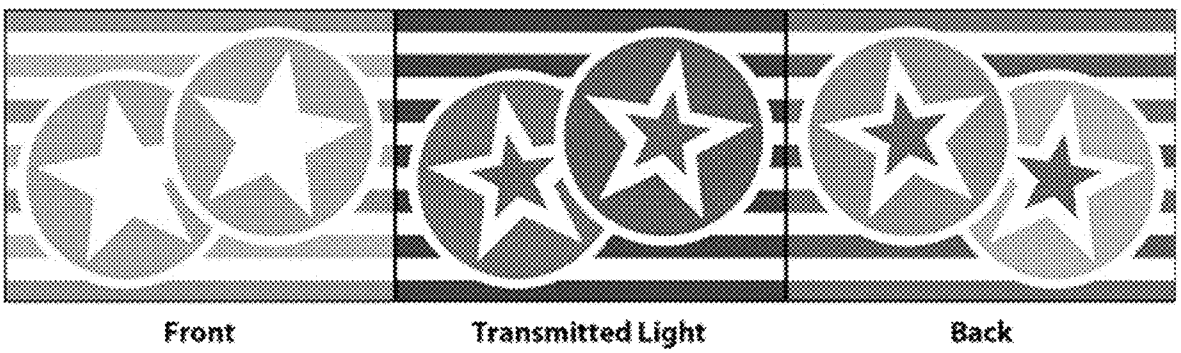
FIG. 7B shows the composite front, back and transmitted light images from the individual plates of FIG. 7A.

FIG. 7A illustrates an example of a simultaneous offset design with six plates and three ink colors, with some overlap of plate images on the same side of the substrate. This example is similar to that of FIGS. 6A and 6B, except that it incorporates same-side overlap of plate artwork to produce the appearance of additive colors on the back in reflected light and the appearance of black in transmitted light. Individual plate images are shown here. FIG. 7B shows the composite front, back and transmitted light images from the individual plates of FIG. 7A. Unlike FIG. 6B, the back design contains several areas of same-side plate art overlap, so that the back appears to contain not only magenta and yellow, but also red, green, and blue. In transmitted light, the intersection of identical artwork in all three subtractive colors—cyan, magenta, and yellow—turns the entire pattern of stripes black, since the stripes on either side incorporate complementary colors for this specific purpose.

An aspect is directed to a substrate printed with front side markings on a first side and back side markings on a second side to deter counterfeiting. The front side has markings to deter counterfeiting. The front side when viewed with reflected light comprises: a first set of stripes printed in a first color; a second set of stripes printed in a second color; and a first set of symbols printed in a third color. The back side has markings to deter counterfeiting. The back side when viewed with reflected light comprises: a third set of stripes printed in a fourth color; a fourth set of stripes printed in a fifth color; a third symbol printed in the first color; a fourth symbol printed in a sixth color; the fourth symbol printed inside the third symbol; a fifth symbol printed in the second color; and a sixth symbol printed in the sixth color; the sixth symbol printed inside the fifth symbol. The first set of stripes, second set of stripes, third set of stripes, and fourth set of stripes form a single set of stripes in a seventh color when viewed with transmitted light. The first symbol and fifth symbol appear to have the fourth color when viewed with transmitted light. The second symbol and fourth symbol appear to have the fifth color when viewed with transmitted light. The fourth symbol and sixth symbol appear to have the sixth color when view with transmitted light.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press using a first plate, second plate, and third plate to print on the front side of the substrate: a first set of stripes printed in a first color, a second set of stripes printed in a second color, and a first set of symbols printed in a third color; and printing with an offset printing press using a fourth plate, fifth plate, and sixth plate to print on the back side of the substrate: a third set of stripes printed in a fourth color, a fourth set of stripes printed in a fifth color, a third symbol printed in the first color, a fourth symbol printed in a sixth color, the fourth symbol printed inside the third symbol, a fifth symbol printed in the second color, and a sixth symbol printed in the sixth color, the sixth symbol printed inside the fifth symbol. The first set of stripes, second set of stripes, third set of stripes, and fourth set of stripes form a single set of stripes in a seventh color when viewed with transmitted light to deter counterfeiting. The first symbol and the third symbol form a transmitted light symbol having the fourth color when viewed with transmitted light to deter counterfeiting. The fourth and sixth symbol form a second transmitted light symbol having the sixth color when viewed with transmitted light to deter counterfeiting. The second symbol and the fifth symbol form a transmitted light symbol having the fifth color when viewed with transmitted light to deter counterfeiting.

Another aspect is directed to a method of printing on two sides of a substrate using an offset printing press. The method comprises: positioning substrate having a front side containing a front security section and a back side containing a back security section onto an offset press; printing with a first color ink with a first printing unit in the front security section: a first symbol and a second symbol; printing with a second color ink with a second printing unit in the front security section: a first set of stripes; printing with a third color ink with a third printing unit in the front security section: a second set of stripes; aligning a back side of the substrate such that ink from a fourth printing unit is within a preset threshold to ink from the first printing unit; printing with the first color ink with a fourth printing unit: a third set of stripes; printing with the second color ink with a fifth printing unit: a fourth set of stripes, a third symbol inside a fourth symbol, and a fifth symbol; the third and fifth symbol having a substantially same area; printing with the third color ink with a sixth printing unit: a fifth set of stripes, a sixth symbol, and an eighth symbol inside a seventh symbol; printing the first sets of stripes, the second sets of stripes, the first symbol, and the second symbol such that the front side of the substrate shows substantially parallel stripes in alternating colors with the first symbol and second symbol in the first color when the front of the substrate is viewed with reflected light; printing the back side of the substrate such that the third set of stripes, fourth set of stripes, and fifth set of stripes form a set of reflected light stripes in a fourth color and fifth color when viewed with reflected light; printing the back side of the substrate such that third symbol, sixth symbol, fourth symbol, and eighth symbol form a pair of reflected light symbols in a sixth color when the back side of the substrate is viewed with reflected light; printing the first set of stripes, second set of stripes, third set of stripes, and fourth set of stripes such that they form a single set of stripes in a seventh color when the substrate is viewed with transmitted light to deter counterfeiting; and printing the first symbol, second symbol, third symbol, fourth symbol, fifth symbol, sixth symbol, seventh symbol, and eight symbol such two inner transmitted light symbols and two outer transmitted light symbols are present on the substrate when the substrate is viewed with transmitted light to deter counterfeiting. In some embodiments, the preset threshold may be within 10%, or within 5%, or within 1%.

Figure 8A:
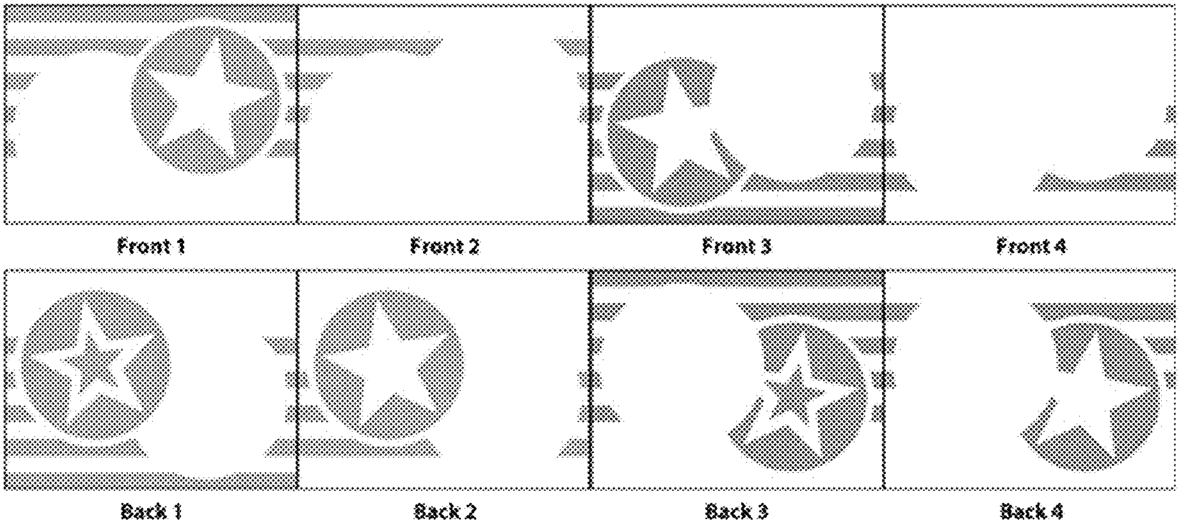
FIG. 8A illustrates an example of a simultaneous offset design with just two ink colors spread over eight plates, incorporating substantial same-side overlap of plate artwork on both the front and back.
Figure 8B:
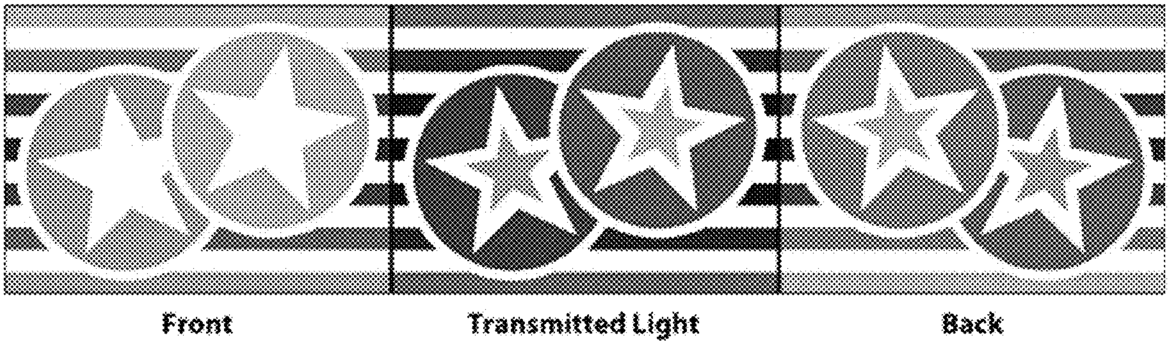
FIG. 8B shows the composite front, back and transmitted light images from the individual plates of FIG. 8A.

FIG. 8A illustrates an example of a simultaneous offset design with just two ink colors spread over eight plates, incorporating substantial same-side overlap of plate artwork on both the front and back. This example shows how many overlapping plate images can create a variety of color and saturation effects, even with (and especially with) a restricted gamut of ink colors. Individual plate images are shown here. FIG. 8B shows the composite front, back and transmitted light images from the individual plates of FIG. 8A. Depending on which ink colors are overlapped on either side in reflected light or between both sides in transmitted light, in some areas the effect is a change of saturation and in other areas a change of color. In this example, it is the large number of plates that allows for the wide gamut of both colors and saturations that can be seen in both the reflected and transmitted light images.

Figure 9A:
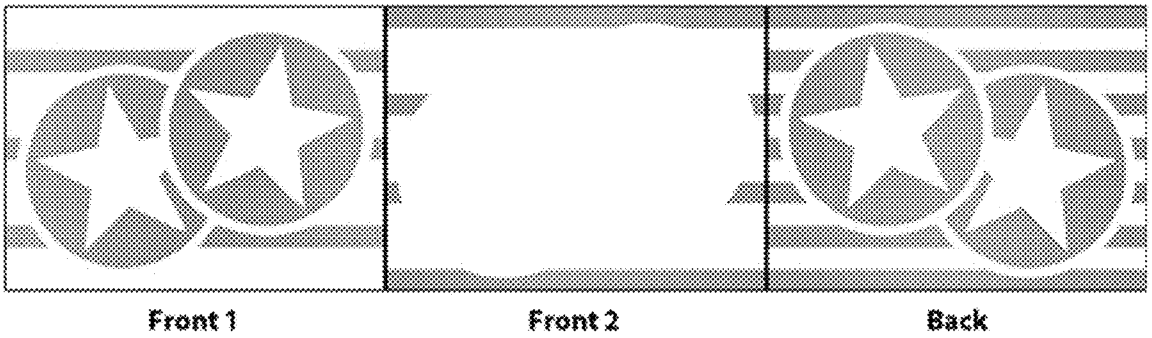
FIG. 9A illustrates an example of a simultaneous offset design with three plates and two ink colors incorporated into split fountains, with no overlap of plate artwork between the two front plates.
Figure 9B:
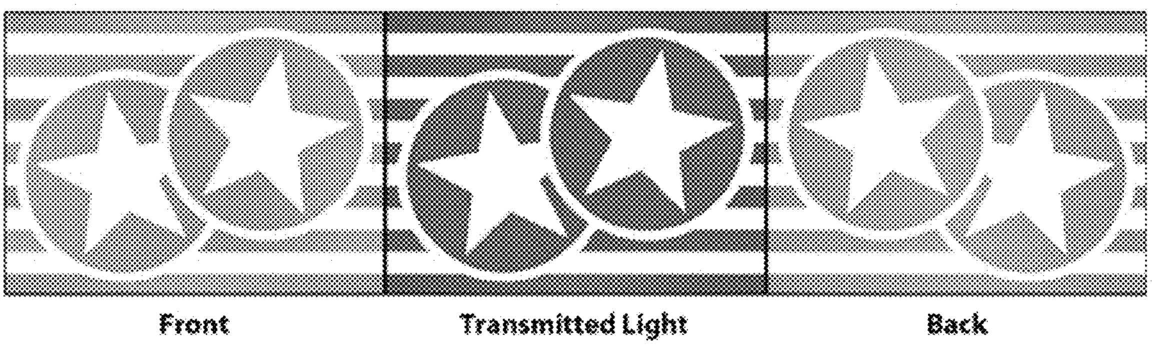
FIG. 9B shows the composite front, back and transmitted light images from the individual plates of FIG. 9A.

FIG. 9A illustrates an example of a simultaneous offset design with three plates and two ink colors incorporated into split fountains, with no overlap of plate artwork between the two front plates. The two front plates incorporate the same ink colors, but in opposite placements within the split fountains. Individual plate images are shown here. FIG. 9B shows the composite front, back and transmitted light images from the individual plates of FIG. 9A. In the top and bottom stripes, the color placement within the front and back split fountains is the same, causing the saturation of each color to increase in transmitted light without change to the hue. In contrast, the circles around the stars change from split fountains in reflected light to a simulated flat tone when viewed in transmitted light because the front and back splits feature opposing color placements in that artwork. The three plates in FIG. 9A are all split fountains. The two front plates each contain cyan and magenta inks, but in opposite placements at the edges and centers. This can also be seen in the composite reflected light front image shown in FIG. 9B, in which the split fountain colors seem to flow in opposite directions simultaneously. The transmitted light view in FIG. 9B shows two effects. First, the circles and some of the stripes simulate a blue flat tone because of the opposite color placement between the front and back in those areas. Essentially, this is a change from a split fountain transition to a solid color. Second, the saturation of the split fountain effect in the top and bottom stripes is enhanced because the direction of the split fountain transition is consistent between the front and back. Training materials could describe these as two different features because the visual effects are totally distinct from one another.

An aspect is directed to a substrate printed with front side markings on a first side and back side markings on a second side to deter counterfeiting. The front side has markings to deter counterfeiting. The front side when viewed with reflected light comprises: a first set of stripes printed with a first gradient of two colors, the first gradient flowing from a first color (C) to a second color (M); and a second set of stripes printed with a second gradient of two colors, the second gradient flowing from the second color (M) to the first color (C). The back side has markings to deter counterfeiting. The back side when viewed with reflected light comprises: a third set of stripes printed with the first gradient and a second set of symbols printed in the first gradient. The first set of stripes and third set of stripes show the same gradient as the first gradient but with higher saturation when the substrate is viewed with transmitted light. The second set of stripes and third set of stripes show a solid stripes when the substrate is viewed with transmitted light. The first symbol, second symbol, third symbol and fourth symbol form a pair of transmitted light symbols in the solid stripes when the substrate is viewed with transmitted light.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press and a split fountain configured to print with a first plate to print on the front side of the substrate: a first set of stripes printed with a first gradient of two colors, the first gradient flowing from a first color to a second color; printing with an offset printing press and a split fountain configured to print with a second plate to print on the front side of the substrate: a second set of stripes printed with a second gradient of two colors, the second gradient flowing from the second color to the first color, and a first set of symbols printed in the second gradient; and printing with an offset printing press and a split fountain using a third plate to print on the back side of the substrate: a third set of stripes printed with the first gradient and a second set of symbols printed in the first gradient. The first set of stripes and third set of stripes show the same gradient as the first gradient but with higher saturation when the substrate is viewed with transmitted light. The second set of stripes and third set of stripes form a solid set of stripes when the substrate is viewed with transmitted light. The first symbol, second symbol, third symbol and fourth symbol form a pair of transmitted light symbols in the solid stripes when the substrate is viewed with transmitted light.

Another aspect is directed to a method of printing on two sides of a substrate using an offset printing press. The method comprises: positioning a substrate having a front side containing a front security section and a back side containing a back security section onto an offset press; printing with a first printing unit having a split fountain: a first set of stripes in a first gradient having a first color gradually turning into a second color, a first symbol in the first gradient, and a second symbol in the first gradient; printing with a second printing unit having a split fountain: a second set of stripes in a second gradient having the second color gradually turning into the first color; aligning a back side of the substrate such that ink from a third printing unit is within a preset threshold to ink from the first printing unit; printing with the third printing unit having a split fountain: a third set of stripes in a second gradient, a third symbol in the second gradient, and a fourth symbol in the second gradient; printing the first sets of stripes, the second sets of stripes, the first symbol, and the second symbol such that the front side of the substrate reflecting substantially parallel stripes in alternating gradients, and the first symbol and second symbol reflecting the first gradient when the front of the substrate is viewed with reflected light; printing the back side of the substrate such that the third set of stripes, the third symbol, and the fourth symbol reflecting the second gradient when the back side of the substrate is viewed with reflected light; printing the first set of stripes, second set of stripes, and third set of stripes such that they form a single set of stripes having alternating gradients in a saturation greater than the first or second gradient when the substrate is viewed with transmitted light to deter counterfeiting; and printing the first symbol, second symbol, third symbol and fourth symbol such that they reflect a single color not having a gradient when the substrate is viewed with transmitted light to deter counterfeiting. In some embodiments, the preset threshold may be within 10%, or within 5%, or within 1%.

Figure 10A:
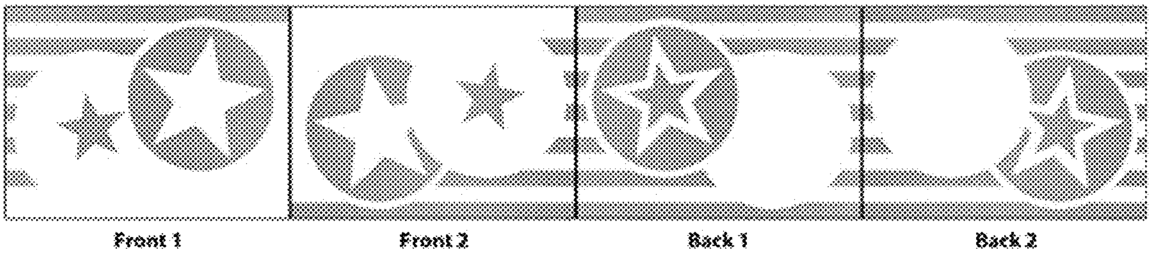
FIG. 10A illustrates an example of a simultaneous offset design with four plates and two ink colors incorporated into split fountains, with some overlap of plate artwork only on the back.
Figure 10B:
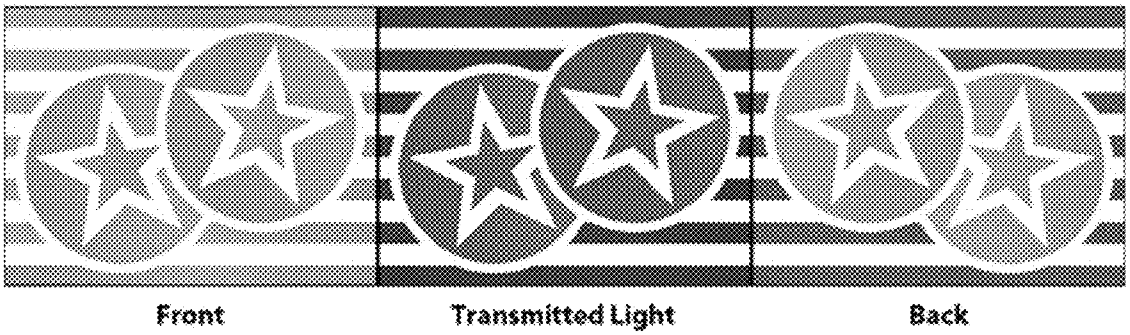
FIG. 10B shows the composite front, back and transmitted light images from the individual plates of FIG. 10A.

FIG. 10A illustrates an example of a simultaneous offset design with four plates and two ink colors incorporated into split fountains, with some overlap of plate artwork only on the back. Every plate contains the same two ink colors, but in opposite positions within the split fountains on each side. Individual plate images are shown here. FIG. 10B shows the composite front, back and transmitted light images from the individual plates of FIG. 10A. In contrast to FIG. 9B with its flat tone simulated in transmitted light, overlap of split fountains with opposite color placement simulates a flat tone on the back in reflected light. In transmitted light, the split on the front can still be seen but is darkened, the small stars change from split fountains to a flat tone, and the circles around the stars retain their split fountain appearance but with saturation increased. The mockup shown in FIGS. 10A and 10B is similar to the previous example but differs in two ways. First, FIG. 10A shows four plates instead of three. Second, the back image in FIG. 10B shows overlap of split fountains with opposite color placement, so that the back image shows a simulated blue flat tone that can be seen in reflected light. The transmitted light image in FIG. 10B contains three different effects: the stars change from a split fountain to a simulated flat tone, the saturation of the split fountains in the circles increases, and the split fountain in the stripes darkens where the front split fountain image combines with the simulated flat tone on the back. Again, these could all be regarded as distinct security features.

Figure 11A:
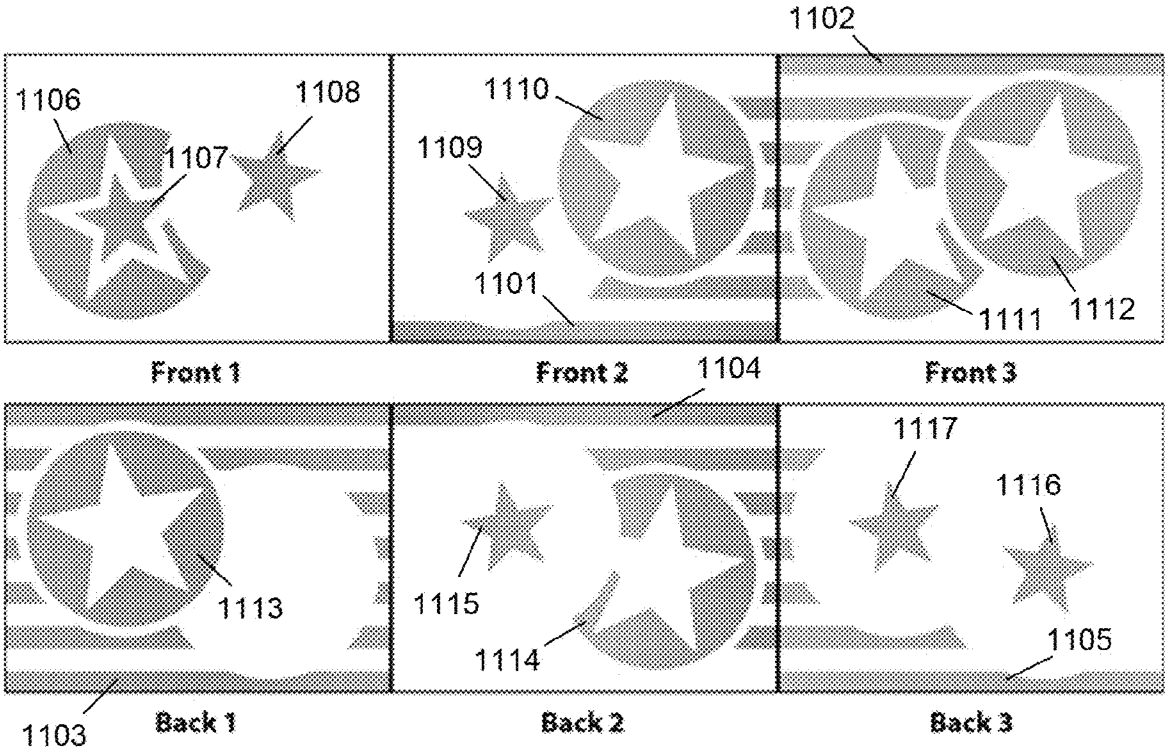
FIG. 11A illustrates an example of a simultaneous offset design with six plates and three ink colors incorporated into split fountains, with substantial overlap of plate artwork on both sides.
Figure 11B:
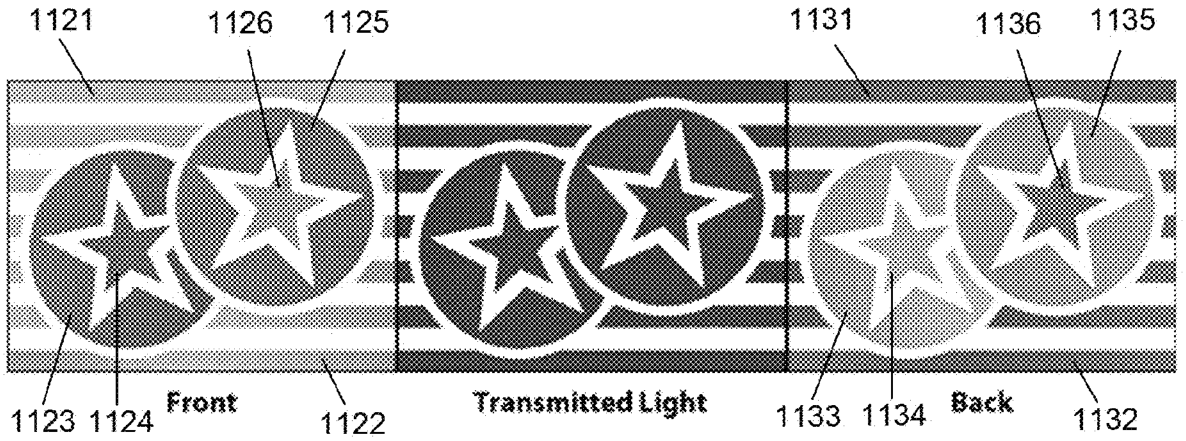
FIG. 11B shows the composite front, back and transmitted light images from the individual plates of FIG. 11A.

FIG. 11A illustrates an example of a simultaneous offset design with six plates and three ink colors incorporated into split fountains, with substantial overlap of plate artwork on both sides. The colors on all six plates have been deliberately placed and paired to produce a monochromatic black image when the simultaneous offset feature is viewed in transmitted light. Individual plate images are shown here. FIG. 11B shows the composite front, back and transmitted light images from the individual plates of FIG. 11A. Just as in FIG. 7B, overlap of identical front and back artwork where opposite sides feature complementary colors can produce a simulation of black when viewed in transmitted light. Simulation of black in transmitted light was done without split fountains in FIG. 7B, but this example shows how color placement within split fountains could be arranged to achieve a transmitted light image that appears to be entirely black. FIGS. 11A and 11B show an extension of the concept in FIGS. 7A and 7B, in which parts of the transmitted light image simulate the color black. In FIG. 11A each side contains three plates, and each plate contains two process colors. The artwork has been partitioned across plates and colors in such a way that every color in the composite front art shown in FIG. 11B is mirrored by its complementary color on the back. Accordingly, all colors are eliminated from the transmitted light image shown in FIG. 11B and the design appears entirely black.

An aspect is directed to a substrate printed with front side markings on a front side and back side markings on a back side to deter counterfeiting. The front side has front side markings to deter counterfeiting. The front side when viewed with reflected light comprises: a first set of stripes 1121 printed with a first gradient of two colors, the first gradient flowing from a first color (Y), to a second color (C), back to the first color (Y); a second set of stripes 1122 printed with a second gradient of two colors, the second gradient flowing from a third color (M), to the first color (Y), back to the third color (M); a first symbol 1123 printed with a third gradient of two colors, the third gradient flowing from a fourth color (C+Y=G), to a fifth color (C+M=B1), back to the fourth color (C+Y=G); a second symbol 1124 printed with a fourth gradient flowing from the fifth color (C+M=B1), to a sixth color (Y+M=R), back to the fifth color (C+M=B1); a third symbol 1125 printed with a fifth gradient of two colors, the fifth gradient flowing from the sixth color (Y+M=R), to the fourth color (C+Y=G), back to the sixth color (Y+M=R); and a fourth symbol 1126 printed with a sixth gradient of two colors, the sixth gradient flowing from the third color (C), to the second color (M), back to the third color (C). The back side has back side markings to deter counterfeiting. The back side when viewed with reflected light comprises: a third set of stripes 1131 printed with the fourth gradient; a fourth set of stripes 1132 printed with the third gradient; a fifth symbol 1133 printed with the second gradient; a sixth symbol 1134 printed with the first gradient; a seventh symbol 1135 printed with the sixth gradient; and an eighth symbol 1136 printed with the fifth gradient.

In specific embodiments, all the stripes and symbols appear to be black in color when the substrate is viewed with transmitted light. The second symbol 1124 is smaller than the first symbol 1123 and the fourth symbol 1126 is smaller than the third symbol 1125. The first set of stripes 1121 on the front side overlaps the third set of stripes 1131 on the back side. The second set of stripes 1122 on the front side overlaps the fourth set of stripes 1132 on the back side. The first symbol 1123 on the front side overlaps the fifth symbol 1133 on the back side. The second symbol 1124 on the front side overlaps the sixth symbol 1134 the back side. The third symbol 1125 on the front side overlaps the seventh symbol 1135 on the back side. The fourth symbol 1126 on the front side overlaps the eighth symbol 1136 on the back side.

In an embodiment, the front side when viewed with reflected light includes a first incomplete outline of an issuing country's border (e.g., continental U.S.A.). The back side when viewed with reflected light includes a second incomplete outline of the issuing country's border. The first incomplete outline and the second incomplete outline form a complete icon outline of the issuing country's border when the substrate is viewed with transmitted light.

Another aspect is directed to a method of printing anti-counterfeit markings on a substrate having front side markings on a front side and back side markings on a back side. The method comprises printing the front side of the substrate with the front side of the substrate showing a front pattern of reflected symbols and stripes when viewed with reflected light. The front pattern contains: a first set of printed substrate stripes 1121 printed with a first reflected light gradient of two colors, the first reflected light gradient flowing from a first color (Y), to a second color (C), back to the first color (Y); a second set of printed substrate stripes 1122 printed with a second reflected light gradient of two colors, the second reflected light gradient flowing from a third color (M), to the first color (Y), back to the third color (M); a first printed substrate symbol 1123 printed with a third reflected light gradient of two colors, the third reflected light gradient flowing from a fourth color (C+Y=G), to a fifth color (C+M=B1), back to the fourth color (C+Y=G); a second printed substrate symbol 1124 printed with a fourth reflected light gradient flowing from the fifth color (C+M=B1), to a sixth color (Y+M=R), back to the fifth color (C+M=B1); a third printed substrate symbol 1125 printed with a fifth reflected light gradient of two colors, the fifth reflected light gradient flowing from the sixth color (Y+M=R), to the fourth color (C+Y=G), back to the sixth color (Y+M=R); and a fourth printed substrate symbol 1126 printed with a sixth reflected light gradient of two colors, the sixth reflected light gradient flowing from the third color (C), to the second color (M), back to the third color (C). The method further comprises printing the back side of the substrate with the back side of the substrate showing a back pattern of reflected symbols and stripes when viewed with reflected light. The back pattern contains: a third set of printed substrate stripes 1131 printed with the fourth reflected light gradient; a fourth set of printed substrate stripes 1132 printed with the third reflected light gradient; a fifth printed substrate symbol 1133 printed with the second reflected light gradient; a sixth printed substrate symbol 1134 printed with the first reflected light gradient; a seventh printed substrate symbol 1135 printed with the sixth reflected light gradient; and an eighth printed substrate symbol 1136 printed with the fifth reflected light gradient.

In some embodiments, the method further comprises printing with an offset printing press including a first print unit containing a first split fountain, a first printing plate, and a first ink well containing an inside section and outside sections, the first print unit configured to print the front side of the substrate in a first gradient: a first printing plate symbol 1106, a second printing plate symbol 1107, and a third printing plate symbol 1108. It further comprises printing with the offset printing press including a second print unit containing a second split fountain, a second printing plate, and a second ink well containing an inside section and outside sections, the second print unit configured to print the front side of the substrate in a second gradient: a fourth printing plate symbol 1109, a fifth printing plate symbol 1110, and a first set of printing plate stripes 1101. It further comprises printing with the offset printing press including a third print unit containing a third split fountain, a third printing plate, and a third ink well containing an inside section and outside sections, the third print unit configured to print the front side of the substrate in a third gradient: a sixth printing plate symbol 1111, a seventh printing plate symbol 1112, and a second set of printing plate stripes 1102. It further comprises printing with an offset printing press including a fourth print unit containing a fourth split fountain, a fourth printing plate, and a fourth ink well containing an inside section and outside sections, the fourth print unit configured to print the back side of the substrate in the first gradient: an eighth printing plate symbol 1113 and a third set of printing plate stripes 1103. It further comprises printing with the offset printing press including a fifth print unit containing a fifth split fountain, a fifth printing plate, and a fifth ink well containing an inside section and outside sections, the fifth print unit configured to print the back side of the substrate in the second gradient: a ninth printing plate symbol 1114, a tenth printing plate symbol 1115, and a fourth set of printing plate stripes 1104. It further comprises printing with the offset printing press including a sixth print unit containing a sixth split fountain, a sixth printing plate, and a sixth ink well containing an inside section and outside sections, the sixth print unit configured to print the back side of the substrate in the third gradient: an eleventh printing plate symbol 1116, a twelfth printing plate symbol 1117, and a fifth set of printing plate stripes 1105.

In specific embodiments, the method further comprises setting up the offset press with: the first ink well having a first ink of a first ink color (C) on the outside sections and a second ink of a second ink color (M) on the inside section; the second ink well having the second ink of the second ink color (M) on the outside sections and a third ink of a third ink color (Y) on the inside section; and the third ink well having the third ink of the third ink color (Y) on the outside sections and the first ink of the first ink color (C) on the inside section. The method further comprises setting up the offset press with: the fourth ink well having the fourth ink of the fourth ink color (G) on the outside sections and the fifth ink of the fifth ink color (B1) on the inside section; the fifth ink well having the fifth ink of the fifth ink color (B1) on the outside sections and the sixth ink of the sixth ink color (R) on the inside section; and the sixth ink well having the sixth color ink (R) on the outside sections and the fourth color ink (G) on the inside section.

In specific embodiments, the first set of printed substrate stripes 1121 is formed by printing the front side of the substrate using the second set of printing plate stripes 1102; the second set of printed substrate stripes 1122 is formed by printing the front side of the substrate using the first set of printing plate stripes 1101; the third set of printed substrate stripes 1131 is formed by printing the back side of the substrate using the third set of printing plate stripes 1103 and the fourth set of printing plate stripes 1104; the fourth set of printed substrate stripes 1132 is formed by printing the back side of the substrate using the third set of printing plate stripes 1103 and the fifth set of printing plate stripes 1105; the first printed substrate symbol 1123 is formed by printing the front side of the substrate using the first printing plate symbol 1106 and the sixth printing plate symbol 1111; the second printed substrate symbol 1124 is formed by printing the front side of the substrate using the second printing plate symbol 1107 and the fourth printing plate symbol 1109; the third printed substrate symbol 1125 is formed by printing the front side of the substrate using the fifth printing plate symbol 1110 and the seventh printing plate symbol 1112; the fourth printed substrate symbol 1126 is formed by printing the front side of the substrate using the third printing plate symbol 1108; the fifth printed substrate symbol 1133 is formed by printing the back side of the substrate using the ninth printing plate symbol 1114; the sixth printed substrate symbol 1134 is formed by printing the back side of the substrate using the eleventh printing plate symbol 1116; the seventh printed substrate symbol 1135 is formed by printing the back side of the substrate using the eighth printing plate symbol 1113; and the eighth printed substrate symbol 1136 is formed by printing the back side of the substrate using the tenth printing plate symbol 1115 and the twelfth printing plate symbol 1117. The method may print the substrate to show all symbols and stripes in black color when viewed from the front side with transmitted light to deter counterfeiting.

In some embodiments, the first set of printed substrate stripes 1121 on the front side overlaps the third set of printed substrate stripes 1131 on the back side; the second set of printed substrate stripes 1122 on the front side overlaps the fourth set of printed substrate stripes 1132 on the back side; the first printed substrate symbol 1123 on the front side overlaps the fifth printed substrate symbol 1133 on the back side; the second printed substrate symbol 1124 on the front side overlaps the sixth printed substrate symbol 1134 the back side; the third printed substrate symbol 1125 on the front side overlaps the seventh printed substrate symbol 1135 on the back side; and the fourth printed substrate symbol 1126 on the front side overlaps the eighth printed substrate symbol 1136 on the back side.

Another aspect is directed to a system having an offset printing press which comprises: a first print unit containing a first split fountain, a first printing plate, and a first ink well containing an inside section and outside sections, the first print unit configured to print a front side of a substrate in a first gradient at least one of a set of printing plate stripes or a printing plate symbol; a second print unit containing a second split fountain, a second printing plate, and a second ink well containing an inside section and outside sections, the second print unit configured to print the front side of the substrate in a second gradient at least one of a set of printing plate stripes or a printing plate symbol; a third print unit containing a third split fountain, a third printing plate, and a third ink well containing an inside section and outside sections, the third print unit configured to print the front side of the substrate in a third gradient at least one of a set of printing plate stripes or a printing plate symbol; a fourth print unit containing a fourth split fountain, a fourth printing plate, and a fourth ink well containing an inside section and outside sections, the fourth print unit configured to print a back side of the substrate in a fourth gradient at least one of a set of printing plate stripes or a printing plate symbol; a fifth print unit containing a fifth split fountain, a fifth printing plate, and a fifth ink well containing an inside section and outside sections, the fifth print unit configured to print the back side of the substrate in a fifth gradient at least one of a set of printing plate stripes or a printing plate symbol; and a sixth print unit containing a sixth split fountain, a sixth printing plate, and a sixth ink well containing an inside section and outside sections, the sixth print unit configured to print the back side of the substrate in a sixth gradient at least one of a set of printing plate stripes or a printing plate symbol. The first ink well has a first color ink on the outside sections (C) and a second color ink (M) on the inside section. The second ink well has the second color ink on the outside sections (M) and a third color ink (Y) on the inside section. The third ink well has the third color ink on the outside sections (Y) and the first color ink (C) on the inside section. The fourth ink well has a fourth color ink on the outside sections (G) and a fifth color ink (B1) on the inside section. The fifth ink well has the fifth color ink on the outside sections (B1) and a sixth color ink (R) on the inside section. The sixth ink well has the sixth color ink (R) on the outside sections and the fourth color ink (G) on the inside section.

In embodiments, all the stripes and symbols appear to be black in color when the substrate is viewed with transmitted light.

In some embodiments, the first print unit is configured to print the front side of the substrate in a first gradient a first printing plate symbol 1106, a second printing plate symbol 1107, and a third printing plate symbol 1108. The second print unit is configured to print the front side of the substrate in a second gradient: a fourth printing plate symbol 1109, a fifth printing plate symbol 1110, and a first set of printing plate stripes 1101. The third print unit is configured to print the front side of the substrate in a third gradient: a sixth printing plate symbol 1111, a seventh printing plate symbol 1112, and a second set of printing plate stripes 1102. The fourth print unit is configured to print the back side of the substrate in the first gradient: an eighth printing plate symbol 1113 and a third set of printing plate stripes 1103. The fifth print unit is configured to print the back side of the substrate in the second gradient: a ninth printing plate symbol 1114, a tenth printing plate symbol 1115, and a fourth set of printing plate stripes 1104. The sixth print unit is configured to print the back side of the substrate in the third gradient: an eleventh printing plate symbol 1116, a twelfth printing plate symbol 1117, and a fifth set of printing plate stripes 1105.

In specific embodiments, the first set of printing plate stripes 1101 overlaps the third set of printing plate stripes 1103 and the fifth set of printing plate stripes 1105. The second set of printing plate stripes 1102 overlaps the third set of printing plate stripes 1103 and the fourth set of printing plate stripes 1105. The first printing plate symbol 1106 overlaps the sixth printing plate symbol 1111 and the ninth printing plate symbol 1114. The second printing plate symbol 1107 overlaps the fourth printing plate symbol 1109 and the eleventh printing plate symbol 1116. The third printing plate symbol 1108 overlaps the tenth printing plate symbol 1115 and the twelfth printing plate symbol 1117. The fifth printing plate symbol 1110 overlaps the seventh printing plate symbol 1112 and the eighth printing plate symbol 1113.

In other embodiment, fewer than six printing plates (e.g., two printing plates for the front side and two printing plates for the back side of the substrate) or more than six printing plates may be used. With the appropriate ink colors, the markings on the printing plates can be made to produce markings on the front side and the back side of the substrate which appear to be black in color when the substrate is viewed with transmitted light.

The designs in FIGS. 3A through 11B illustrate some color-changing simultaneous offset icons using simple non-security artwork intended just to illustrate concepts. Designers will surely identify creative ways to incorporate color changes and multiple visual effects (image completion, image disappearance, and contrast increase) into simultaneous offset artwork of greater complexity and security. FIGS. 9A through 11B present some novel combinations of split fountains and simultaneous offset with a focus on color effects. As before, these simple mockups are intended only to illustrate concepts. Designers will undoubtedly conceive of more elegant and secure artwork through which to combine these features. Further, the mockup designs in FIGS. 3A through 11B are based on cyan, magenta, and yellow (CMY) process color inks. Process colors are not usually associated with security printing but are used here to make the designs easy to understand. For real security work similar concepts could be applied with any desired spot colors. Additionally, color and saturation in real print depends on ink layer thickness, pigment content, viewing conditions, substrate characteristics, quality control, and other factors, but for simplicity in the mockups these real-world variations are not accounted for here.

Like many security features, simultaneous offset offers substantial design flexibility that is not often fully utilized in contemporary security documents. The mockups in FIGS. 3A through 11B have illustrated many simultaneous offset strategies relating to color and saturation changes, partitioning of art between plates, split fountains, and more. If each of these distinct color and image effects were regarded as a unique security feature and a new opportunity for user training, inventive designers might incorporate several simultaneous offset color transition effects within a single document or even within a single icon.

Contrast Effects in Strategies for Resisting Digital Counterfeiting

Novel simultaneous offset concepts are not limited to the color strategies, which do not fully address the gamut limitations of CMYK digital counterfeiting. The following will explore contrast and simultaneous offset, with a new look at monochromatic design and ideas for using specialty inks such as metallic, clear, and white inks.

Examples are used to illustrate a range of potential simultaneous offset designs and visual effects. These are simple graphics just for illustrating concepts but could be adapted for real security designs to include more complex artwork, additional plate images, more ink colors, and multiple visual effects. For simplicity, the mockups assume ideal ink behaviors and quality control considerations are not addressed, though these factors cannot be ignored in real printing environments. Each manufacturer will reach its own conclusions regarding which strategies (if any) are appropriate for its own workflows or the needs of a particular document.

The examples are used to examine how the front and back artwork coordinate for specific contrast effects, what visual effect is produced when the plate images are registered correctly, how the visual effect is derived from the plate art design, differences in how the inks behave in reflected vs. transmitted light, how the icon can be described in training materials, how users become suspicious if images are out of register in a counterfeit, and how combining simultaneous offset with specialty inks and split fountains force difficult simulation and registration problems on digital counterfeiters.

Contrast and Saturation

In the examples discussed above, a color-changing simultaneous offset icon requires the intersection of front and back artwork in transmitted light and always results in a darker image. However, the design approaches needed to create monochromatic contrast effects such as image disappearance, image change, and image movement are different.

Figure 12:
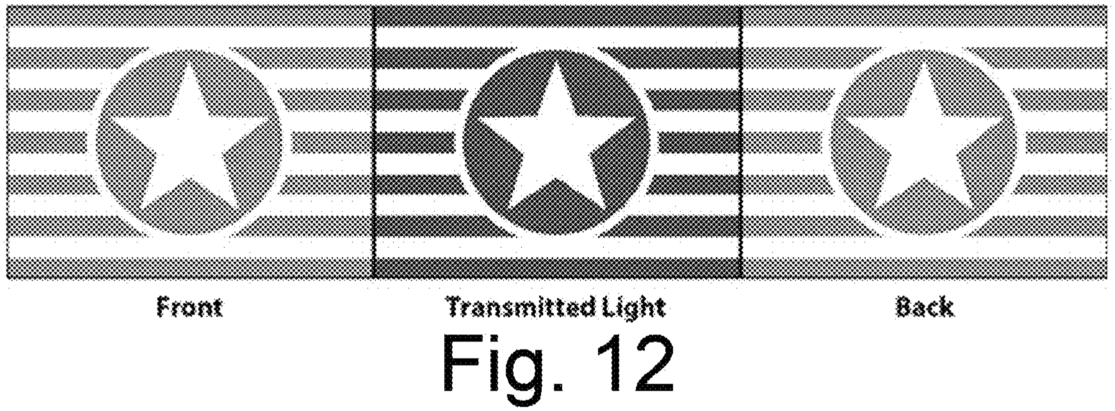
FIG. 12 illustrates an example of a two-plate icon simultaneous offset design with one plate on the front and one on the back, showing identical artwork on both sides.

FIG. 12 illustrates an example of a two-plate icon simultaneous offset design with one plate on the front and one on the back, showing identical artwork on both sides. In transmitted light both ink layers can be seen at the same time, resulting in higher contrast and saturation as both ink layers block light together. Misregistration in a counterfeit would result in doubling of the icon artwork when viewed in transmitted light. FIG. 2A shows this technique in an issued banknote, where the icon interior incorporates four plate images instead of two.

Figure 13:
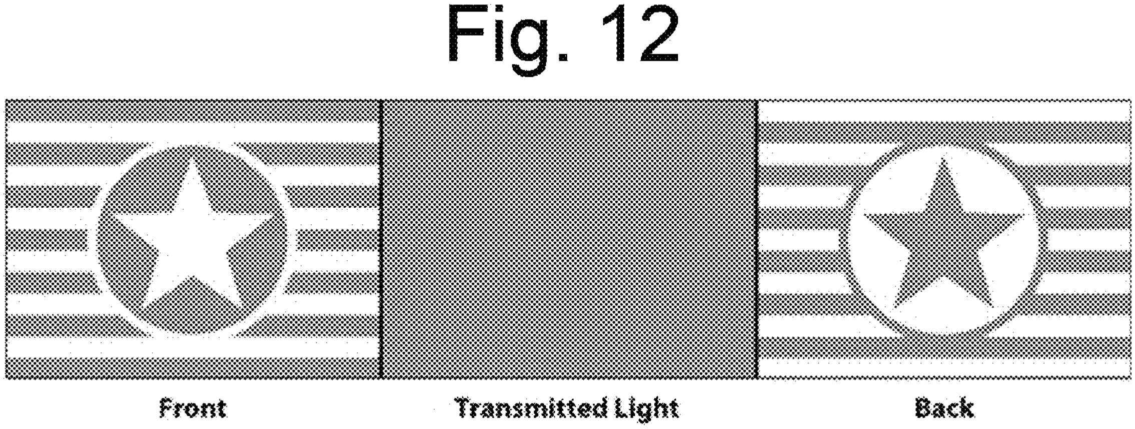
FIG. 13 illustrates an example of a simultaneous offset design with one plate on the front and one on the back, with the front and back artwork configured as negative images of one another.

FIG. 13 illustrates an example of a simultaneous offset design with one plate on the front and one on the back, with the front and back artwork configured as negative images of one another. The mockup has a positive/negative artwork which employs the opposite of the strategy used in FIG. 12 and FIG. 2A. In reflected light each side shows a star, circle, and pattern of stripes, but in transmitted light, each image completes the other without overlap such that the artwork vanishes. In transmitted light the view is of a flat tone. This visual effect could be described either as a reduction in contrast or as an "image disappearance" feature where the reflected light images vanish in transmitted light. If out of register in a counterfeit, both the front and back images would remain visible in transmitted light. This could be described as an image disappearance feature.

An aspect is directed to a substrate printed with front side markings on a first side and back side markings on a second side to deter counterfeiting. The front side has markings to deter counterfeiting. The front side when viewed with reflected light comprises: a first set of stripes printed with a first ink color and a first symbol printed with the first ink color. The back side has markings to deter counterfeiting. The back side when viewed with reflected light comprises a second set of stripes printed with the first ink color and a second symbol printed with the first ink color. The first set of stripes, second set of stripes, first symbol, and second symbol are printed such that: a single rectangle is visible when the substrate is viewed with transmitted light; the first set of stripes, second set of stripes, first symbol, and second symbol are not visible when the substrate is viewed with transmitted light; and the first set of stripes, second set of stripes, first symbol, and second symbol are visible when the substrate is viewed with reflected light.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press configured to print with a first plate to print on the front side of the substrate: a first set of stripes printed with an ink color and a first symbol printed with the ink color; printing with an offset printing press configured to print with a second plate to print on the back side of the substrate: a second set of stripes printed with an ink color and a second symbol printed with the ink color; and printing the first set of stripes, second set of stripes, first symbol, and second symbol such that: a single rectangle is visible when the substrate is viewed with transmitted light; the first set of stripes, second set of stripes, first symbol, and second symbol are not visible when the substrate is viewed with transmitted light; and the first set of stripes, second set of stripes, first symbol, and second symbol are visible when the substrate is viewed with reflected light.

Another aspect is directed to a method of printing on two sides of a substrate using an offset printing press. The method comprises: positioning a substrate having a front side containing a front security section and a back side containing a back security section onto an offset press; printing with a first printing unit: a first set of stripes in a first ink color and a first symbol in the first ink color; aligning a back side of the substrate such that ink from a second printing unit is within a preset threshold to ink from the first printing unit; printing with the second printing unit: a second set of stripes in a first ink color and a second symbol in the first ink color; and printing the first set of stripes, second set of stripes, first symbol, and second symbol are printed such that: a single rectangle is visible when the substrate is viewed with transmitted light to deter counterfeiting; the first set of stripes, second set of stripes, first symbol, and second symbol not visible when the substrate is viewed with transmitted light; and the first set of stripes, second set of stripes, first symbol, and second symbol are visible when the substrate is viewed with reflected light. In some embodiments, the preset threshold may be within 10%, or within 5%, or within 1%.

Figure 14:
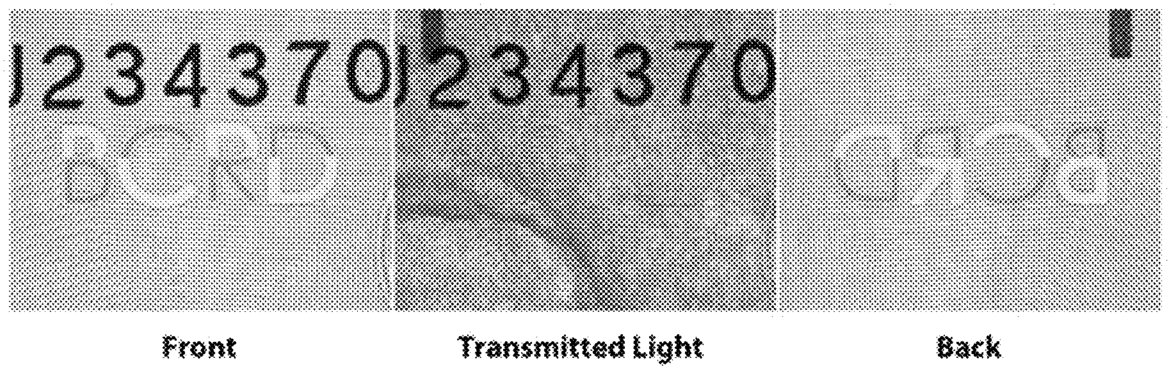
FIG. 14 illustrates an example of a contrast-reducing simultaneous offset design in an issued banknote that includes positive/negative images inside the icon, but artwork density is also balanced outside the icon to keep the color intensity even throughout the transmitted light image.

FIG. 14 illustrates an example of a contrast-reducing simultaneous offset design in an issued banknote that includes positive/negative images inside the icon, but artwork density is also balanced outside the icon to keep the color intensity even throughout the transmitted light image. The front and back of the icon art are negative images of one another, so that viewing in transmitted light causes the images on one side to fill in the voids on the other and the text vanishes. The ink coverage is also balanced outside the icon such that the icon itself also disappears. This visual effect could be described as a contrast reduction or as an "image disappearance" feature.

An aspect is directed to a substrate printed with front side markings on a first side and back side markings on a second side to deter counterfeiting. The front side has markings to deter counterfeiting. The front side when viewed with reflected light comprises: a first set of stripes printed with a first ink color and a first symbol printed with the first ink color in a first saturation. The back side has markings to deter counterfeiting. The back side when viewed with reflected light comprises: a second set of stripes printed with the first ink color and a second symbol printed with the first ink color in a second saturation. The first set of stripes and second set of stripes are printed such that: the first set of stripes and second stripes blend into a single rectangle when the substrate is viewed with transmitted light; the first set of stripes is visible with discrete spacing between stripes when the substrate is viewed with reflected light; and the second set of stripes is visible with discrete spacing between stripes when the substrate is viewed with reflected light. The first symbol and second symbol are printed such that: a single symbol is visible when the substrate is viewed with transmitted light, the single symbol reflecting light in the first color and having a third saturation, the third saturation being greater than the first saturation and second saturation.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press configured to print with a first plate to print on the front side of the substrate: a first set of stripes printed with an ink color and a first symbol printed with the ink color at a first saturation; printing with an offset printing press configured to print with a second plate to print on the back side of the substrate: a second set of stripes printed with an ink color and a second symbol printed with the ink color at a second saturation; printing the first set of stripes, second set of stripes, first symbol, and second symbol such that: the first set of stripes and second stripes blend into a single rectangle when the substrate is viewed with transmitted light; the first set of stripes is visible with discrete spacing between stripes when the substrate is viewed with reflected light from the front side; and the second set of stripes is visible with discrete spacing between stripes when the substrate is viewed with reflected light from the back side; and printing the first symbol and second symbol such that: a single symbol is visible when the substrate is viewed with transmitted light, the single symbol reflecting light in the first color and having a third saturation, the third saturation being greater than the first saturation and second saturation.

Another aspect is directed to a method of printing on two sides of a substrate using an offset printing press. The method comprises: positioning a substrate having a front side containing a front security section and a back side containing a back security section onto an offset press; printing with a first printing unit: a first set of stripes in a first ink color and a first symbol in the first ink color in a first saturation; aligning a back side of the substrate such that ink from a second printing unit is within a preset threshold to ink from the first printing unit; printing with the second printing unit: a second set of stripes in a first ink color and a second symbol in the first ink color; and printing the first set of stripes, second set of stripes, first symbol, and second symbol are printed such that: a single rectangle is visible when the substrate is viewed with transmitted light to deter counterfeiting; the first set of stripes, second set of stripes, first symbol, and second symbol are not visible when the substrate is viewed with transmitted light; and the first set of stripes, second set of stripes, first symbol, and second symbol are visible when the substrate is viewed with reflected light. In some embodiments, the preset threshold may be within 10%, or within 5%, or within 1%.

Figure 15:
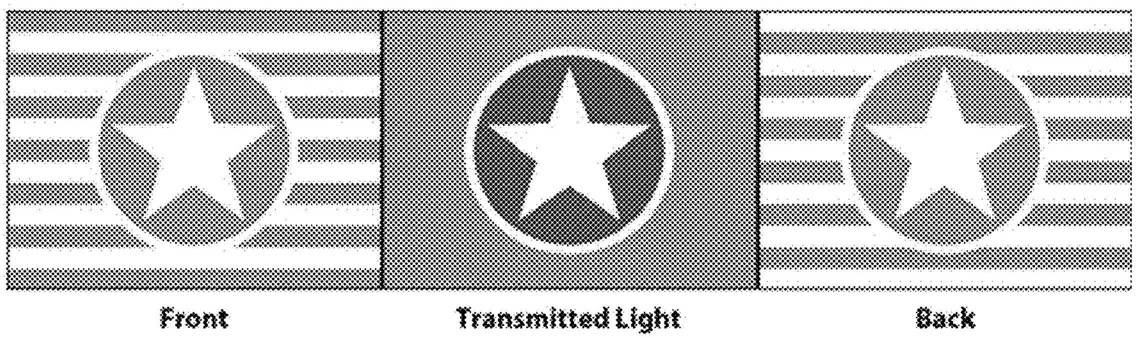
FIG. 15 illustrates an example of a simultaneous offset design incorporating elements of both the contrast-increasing designs shown in FIGS. 12 and 2A and the contrast-reducing designs shown in FIGS. 13 and 14.

FIG. 15 illustrates an example of a simultaneous offset design incorporating elements of both the contrast-increasing designs shown in FIGS. 12 and 2A and the contrast-reducing designs shown in FIGS. 13 and 14. In transmitted light, the saturation of the circle increases because the circle art is the same on both sides, but the stripe pattern disappears because the stripes on the back are a negative image of the stripes on the front. This illustrates how artwork choices can facilitate the inclusion of multiple contrast effects within a single simultaneous offset design.

Image Change and Movement

Figure 16A:
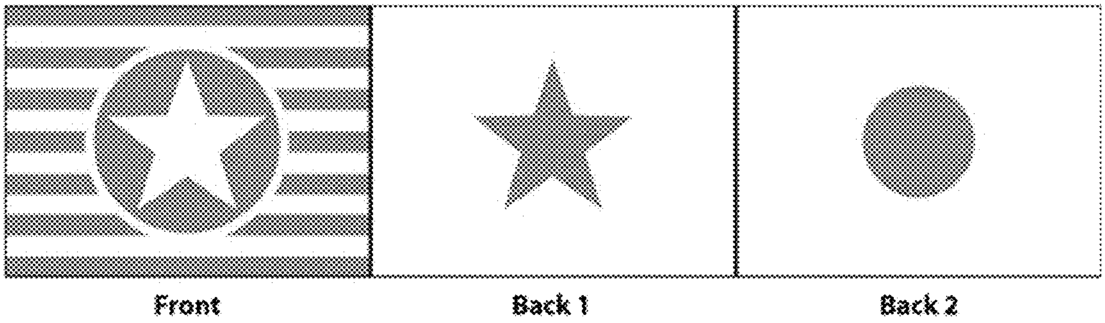
FIG. 16A illustrates an example of a simultaneous offset design including one front and two back plate images, all composed of the same ink color.

FIG. 16A illustrates an example of a simultaneous offset design including one front and two back plate images, all composed of the same ink color. Viewed in transmitted light from the front, the first back plate image is designed to fill in the star-shaped void in the front plate image, reducing its contrast and causing the star shape to disappear. The second back plate introduces a circle shape to the transmitted light image.

Figure 16B:
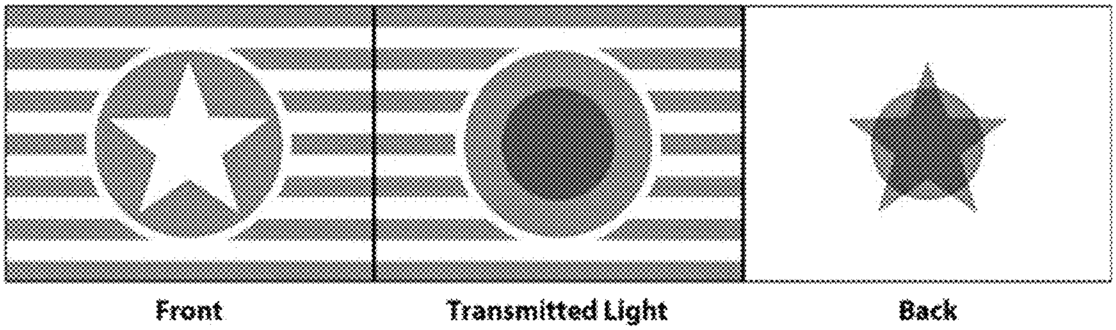
FIG. 16B shows the composite front, back, and transmitted light images from the individual plates of FIG. 16A creating an "image change" effect.

FIG. 16B shows the composite front, back, and transmitted light images from the individual plates of FIG. 16A. In reflected light, the front image contains a star design void. In transmitted light, the two back plate images simultaneously make the star disappear and introduce the circle in its place. This visual effect could be described as an "image change" feature, or also as a simultaneous increase and reduction in contrast in different areas.

The mockups in FIGS. 12, 13, and 15 include only one front plate and one back plate, but FIG. 16A (individual plate images) and 16B (composite images) show how a second back plate facilitates an image change effect. In transmitted light, the first back plate fills in the star (contrast reduction) and the second back plate add the circle (image appearance). User training could describe a change from a reflected light star to a transmitted light circle. In this example, the back artwork is fully subordinated to the front artwork, so that this strategy might be better for documents in which back artwork is often omitted anyway (e.g., birth records) but not where the back artwork is usually a separate design (e.g., banknotes).

Figure 17A:
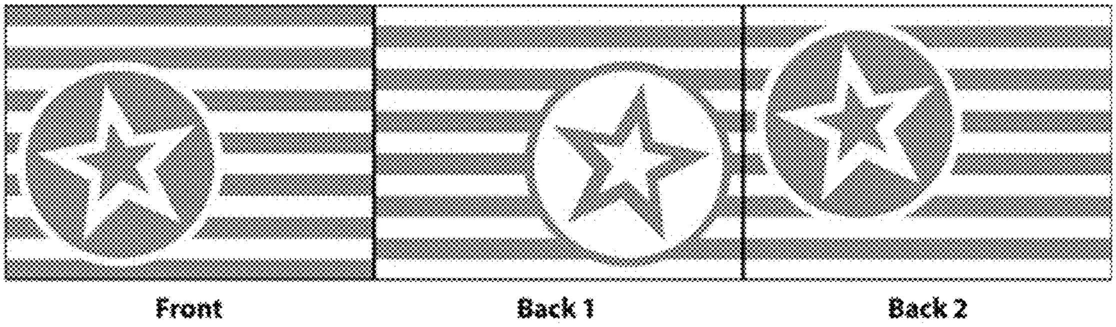
FIG. 17A illustrates an example of a simultaneous offset design including one front and two back plate images, all composed of the same ink color.

FIG. 17A illustrates an example of a simultaneous offset design including one front and two back plate images, all composed of the same ink color. The first back plate image is designed exactly as a negative of the front and its purpose is to eliminate the reflected light front image from the transmitted light view. The second back plate reintroduces the star design, but in a different position.

Figure 17B:
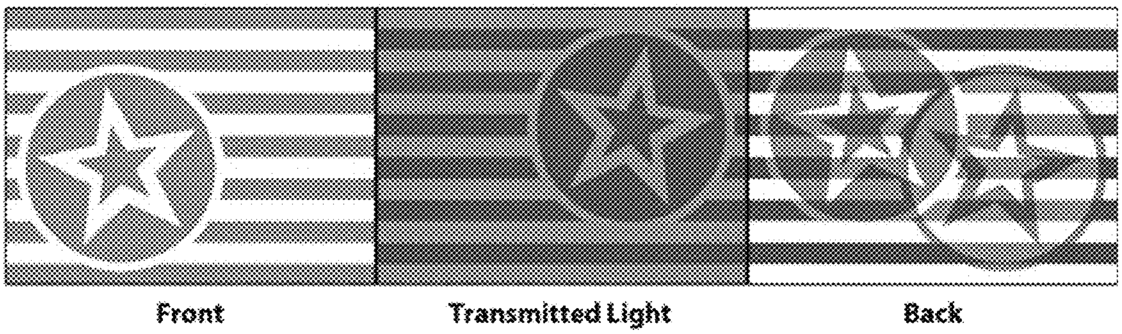
FIG. 17B shows the composite front, back, and transmitted light images from the individual plates of FIG. 17A creating an "image movement" effect.

FIG. 17B shows the composite front, back, and transmitted light images from the individual plates of FIG. 17A. In transmitted light, the two back plate images simultaneously remove the star and circle design from the lower left area and cause it to move to the upper right. This visual effect could be described as an "image movement" feature, or equally as a simultaneous increase and reduction of contrast in different parts of the design.

The image change in FIGS. 16A and 16B was in the center of the icon, but a similar strategy also produces image movement. In FIGS. 17A and 17B, the first back plate eliminates the front plate image, and the second back plate adds a new image in a different location, creating a movement effect as the star relocates from the left (reflected light) to the right (transmitted light).

Figure 18A:
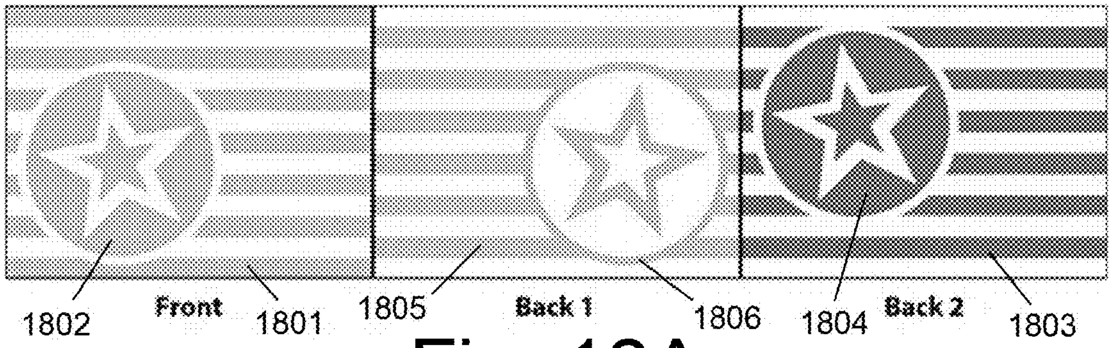
FIG. 18A illustrates an example of a simultaneous offset design of the same artwork shown in FIG. 17A, except that the front plate and the first back plate are printed in an ink of lower saturation than the ink from the second back plate.

FIG. 18A illustrates an example of a simultaneous offset design of the same artwork shown in FIG. 17A, except that the front plate and the first back plate are printed in an ink of lower saturation than the ink from the second back plate. The purpose of this is to improve contrast in the transmitted light image when all plates are viewed simultaneously.

Figure 18B:
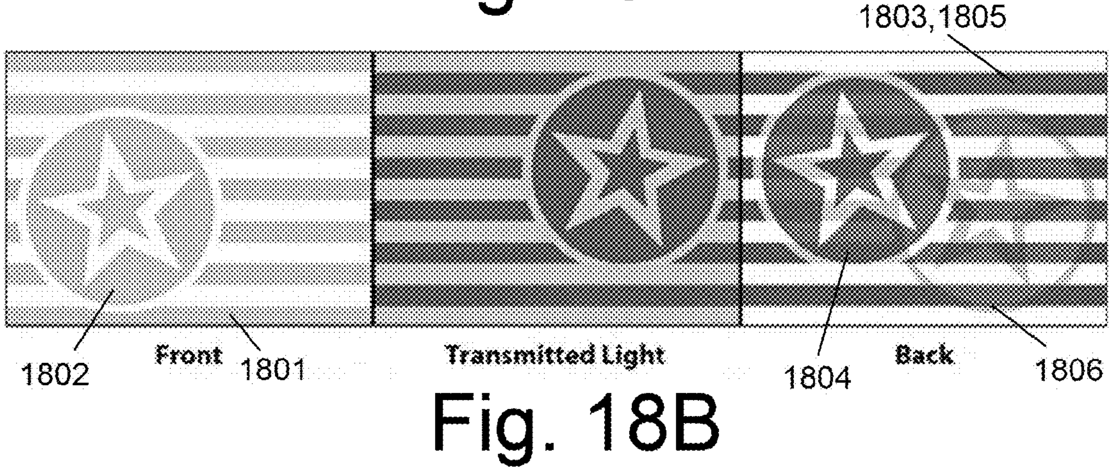
FIG. 18B shows the composite front, back, and transmitted light images from the individual plates of FIG. 18A creating an "image movement" effect.

FIG. 18B shows the composite front, back, and transmitted light images from the individual plates of FIG. 18A. FIGS. 18A and 18B have the same artwork as FIGS. 17A and 17B, but with different ink opacities. In FIG. 17A, the front and first back plate contain the same ink, but the second back plate contains an ink of higher opacity. Compared to FIG. 17B, contrast in the transmitted light image in FIG. 18B is improved because the two positive/negative image plates in FIG. 17A are lighter than the second back plate. The artwork and "image movement" effect is similar to that of FIG. 17B, except that contrast is lower in the front plate image in reflected light and higher in the transmitted light image.

An aspect is directed to a substrate printed with front side markings on a first side and back side markings on a second side to deter counterfeiting. The front side has markings to deter counterfeiting. The front side when viewed with reflected light comprises: a first set of stripes 1801 printed with a first ink color in a first saturation and a first symbol 1802 printed with the first ink color in the first saturation. The back side has markings to deter counterfeiting. The back side when viewed with reflected light comprises: a second set of stripes 1803 printed with the first ink color in a second saturation; a second symbol 1804 printed with the first ink color in the second saturation; a third set of stripes 1805 printed with the first ink color in the first saturation; and a third symbol 1806 printed with the first ink color in the first saturation. The first set of stripes 1801, second set of stripes 1803, and third set of stripes 1805 are printed such that: the first set of stripes 1801 and a combination of the overlapping second set of stripes 1803 and third set of stripes 1805 form an interlocking pattern of low saturation first ink color and high saturation first ink color when viewed with transmitted light; the first set of stripes 1801 is visible with discrete spacing between stripes when the substrate is viewed with reflected light; and each of the second set of stripes 1803 and third set of stripes 1805 is visible with discrete spacing between stripes when the substrate is viewed with reflected light. The first symbol 1802, second symbol 1804, and third symbol 1806 are printed such that the first symbol 1802 and the third symbol 1806 are indistinguishable when the substrate is viewed with transmitted light by filling the space of the first symbol 1802 and the third symbol 1806 with an indistinguishable first ink color in the first saturation. As a result, the second symbol 1804 is visible in the second saturation when viewed with transmitted light, but the first symbol and third symbols are not distinguishably visible.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press configured to print with a first plate to print on the front side of the substrate: a first set of stripes 1801 printed with a first ink color at a first saturation and a first symbol 1802 printed with the first ink color at the first saturation; printing with the offset printing press configured to print with a second plate to print on the back side of the substrate: a second set of stripes 1803 printed with the first ink color at a second saturation and a second symbol 1804 printed with the first ink color at the second saturation; printing with the offset printing press configured to print with a third plate to print on the back side of the substrate: a third set of stripes 1805 printed with the first ink color at the first saturation and a third symbol 1806 printed with the first ink color at the first saturation; and printing the first set of stripes 1801, second set of stripes 1803, third set of stripes 1805, first symbol 1802, second symbol 1804, and third symbol 1806 such that: a set of low saturation and high saturation stripes is visible in the first color when the substrate is viewed with transmitted light; the second symbol 1804 is visible in the first ink color in the second saturation when the substrate is viewed with transmitted light; and the first symbol 1802 and third symbol 1806 are not distinguishably visible when the substrate is viewed with transmitted light.

Another aspect is directed to a method of printing on two sides of a substrate using an offset printing press. The method comprises: positioning a substrate having a front side containing a front security section and a back side containing a back security section onto an offset press; printing with a first printing unit of the offset press: a first set of stripes 1801 in a first ink color in a first saturation and a first symbol 1802 in the first ink color in the first saturation; aligning a back side of the substrate such that ink from a second printing unit of the offset press is within a preset threshold to ink from the first printing unit; printing with the second printing unit: a second set of stripes 1803 in the first ink color in a second saturation and a second symbol 1804 in the first ink color in the second saturation; printing with a third printing unit of the offset press: a third set of stripes 1805 in the first ink color in the first saturation and a third symbol 1806 in the first ink color in the first saturation; and printing the first set of stripes 1801, second set of stripes 1803, third set of stripes 1805, first symbol 1802, second symbol 1804, and third symbol 1806 such that: a set of low saturation and high saturation stripes is visible in the first color when the substrate is viewed with transmitted light to deter counterfeiting; the second symbol 1804 is visible in the first ink color in the second saturation when the substrate is viewed with transmitted light; and the first symbol 1802 and third symbol 1806 are not distinguishably visible when the substrate is viewed with transmitted light. In some embodiments, the preset threshold may be within 10%, or within 5%, or within 1%.

Resisting CYMK Simulation

Designing security documents to resist CMYK (cyan, magenta, yellow, and black) digital counterfeiting is a broad topic that will only be explored here as it relates to simultaneous offset. As discussed above, the good same-side registration capabilities of digital printing do not extend to front/back registration. The security of simultaneous offset features can be enhanced by integration with specialty inks (e.g., metallics) and split fountains, which together can force digital counterfeiters to abandon purely CMYK workflows. The color mockups illustrate many distinctive visual effects but are limited to conventional spot colors that can generally be simulated by CMYK. Specialty inks and split fountains can solve the problem left unanswered, which is design of simultaneous offset features incorporating characteristics that cannot be simulated effectively by CMYK.

Figure 19:
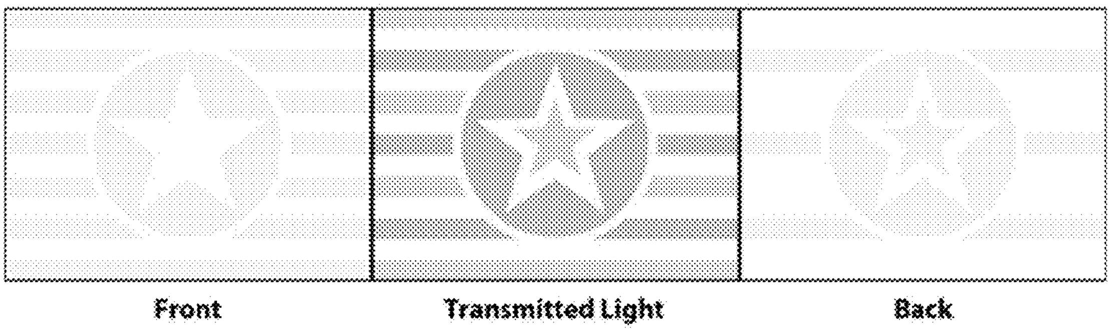
FIG. 19 illustrates an example of a white ink simultaneous offset design with one front plate and one back plate producing a two-tone transmitted light image.

FIG. 19 illustrates an example of a white ink simultaneous offset design with one front plate and one back plate. The white ink shows low contrast with the white substrate surface, so that the artwork is difficult to see in reflected light. In transmitted light, this white ink blocks light and produces a darker image than the reflected light images on the front and back. The design of the front and back art produces a two-tone transmitted light image that is lighter or darker based on whether art is on both sides, or only one side.

In reflected light the contrast between the print and substrate is low, so that the white ink artwork is nearly invisible and cannot be copied or scanned like spot color artwork. Suppose this white ink is relatively opaque, so that contrast is higher in transmitted light than in reflected light and two discrete densities are visible depending on whether one or two layers of ink are overlapped (or more, if additional plates were added). Such a white-only strategy could be used to add a simultaneous offset feature that does not compete with reflected light artwork (intaglio, for example) or features. Further, the fuzziness of a watermark image and clarity of a white ink simultaneous offset feature could make a distinctive paired feature if placed in proximity or even integrated in a joint design, particularly for highlight watermarks where the thinner paper improves contrast and visibility for an overlapping simultaneous offset feature.

Figure 20:
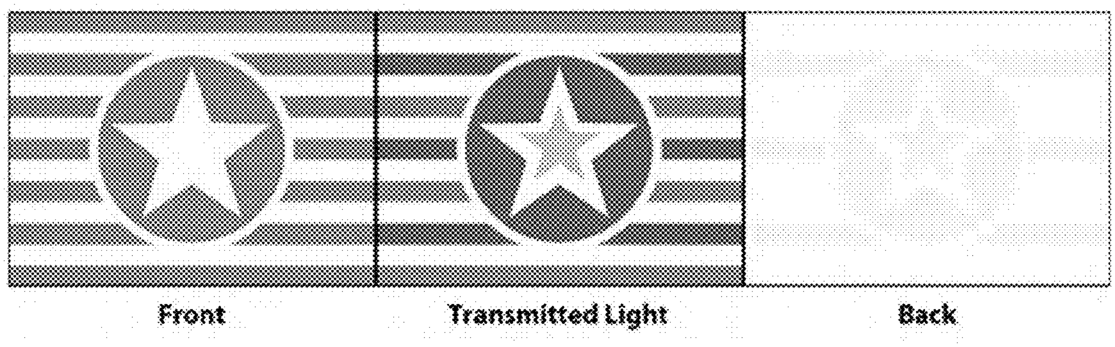
FIG. 20 illustrates an example of a simultaneous offset design with a spot color ink on the front and white ink on the back.

FIG. 20 illustrates an example of a simultaneous offset design with a spot color ink on the front and white ink on the back. In reflected light the front image can be seen, but the back image shows low contrast with the substrate. The design of the back plate artwork affects the transmitted light image in two different ways as the white ink blocks light. First, it makes a star appear in the center where no front plate image is present. Second, it darkens the circle and some of the stripes that are part of the front image.

Expanding on the white ink example, FIG. 20 shows a spot color front and white back, so that the front art is visible in reflected light, but the back art is not. In transmitted light the white back blocks light but does not contribute color, so that this is different from prior examples where the transmitted light image showed increased saturation (e.g., FIG. 12) because both sides contribute color. Further, the white ink could be on the front and the spot color on the back, or both inks could be on one side of the substrate, and the transmitted light effect would be similar.

White ink is just one possible example. In concept, any ink that is not easily simulated by CMYK could improve the security of a simultaneous offset feature, if it is (or can be made) compatible with offset printing technology. These might include metallic, iridescent, color shifting, fluorescent, pastel, spot gloss or others.

Figure 21:
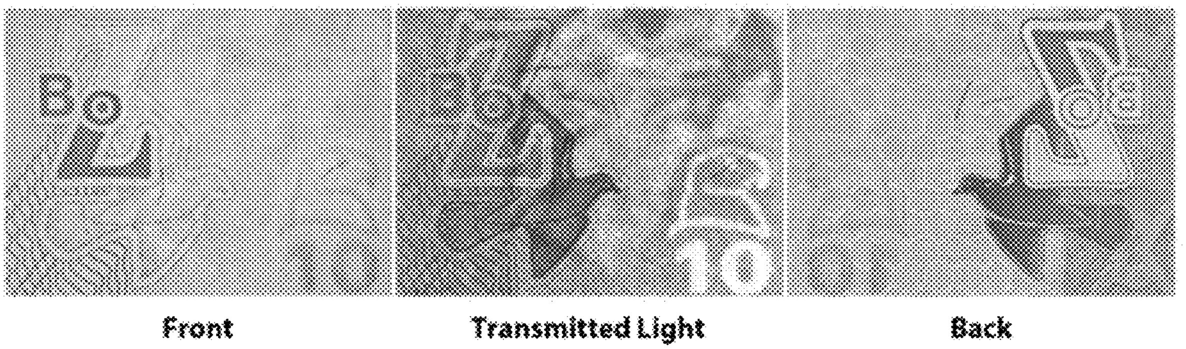
FIG. 21 illustrates an example of integrating metallic ink into a simultaneous offset design in an issued banknote.

FIG. 21 illustrates an example of integrating metallic ink into a simultaneous offset design in an issued banknote. The contour of the bird on the front is a silver metallic ink. Metallic ink (a consumable) is compatible with simultaneous offset (a hardware printing technology) and their integration into one design is more difficult to counterfeit than either of the two features independently. Additionally, metallic inks with high opacity can make simultaneous offset features easier to inspect.

FIG. 21 shows metallic ink integrated into a simultaneous offset icon. In counterfeiting FIG. 21, the front and back spot color art could be simulated by CMYK, but a second printing step would be required to simulate the metallic specular reflectance. This adds registration and quality control problems to counterfeiting workflows, increases simulation difficulty, and provides more opportunities for error. In addition to specular reflection, the metallic ink in FIG. 21 also contributes high opacity that makes the simultaneous offset feature easier to examine.

Figure 22:
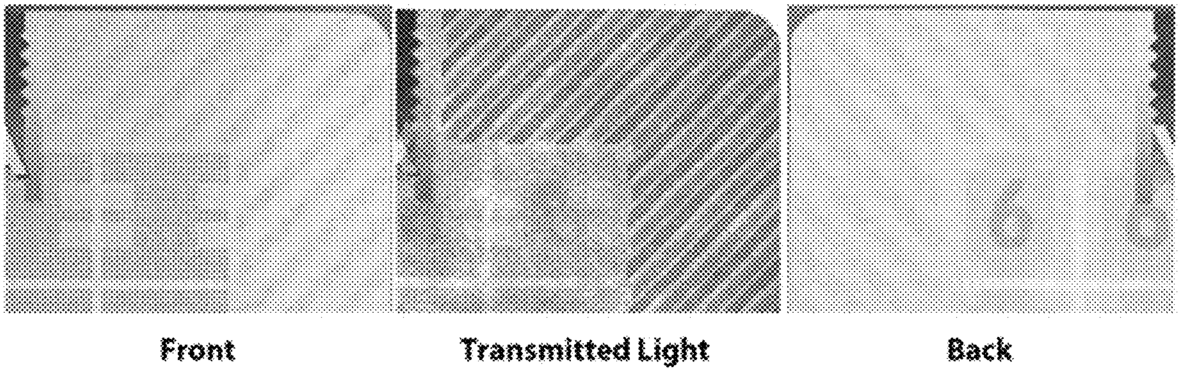
FIG. 22 illustrates an example of using iridescent ink on opposite sides of a passport page.

FIG. 22 illustrates an example of using iridescent ink on opposite sides of a passport page. In reflected light the iridescent ink is reflective at certain angles, but at other angles is almost invisible and shows low contrast with the paper substrate color. In transmitted light both ink patterns can be seen easily. The contrast of this ink with the surrounding substrate and offset artwork depends greatly on exactly how it is viewed.

Figure 23:
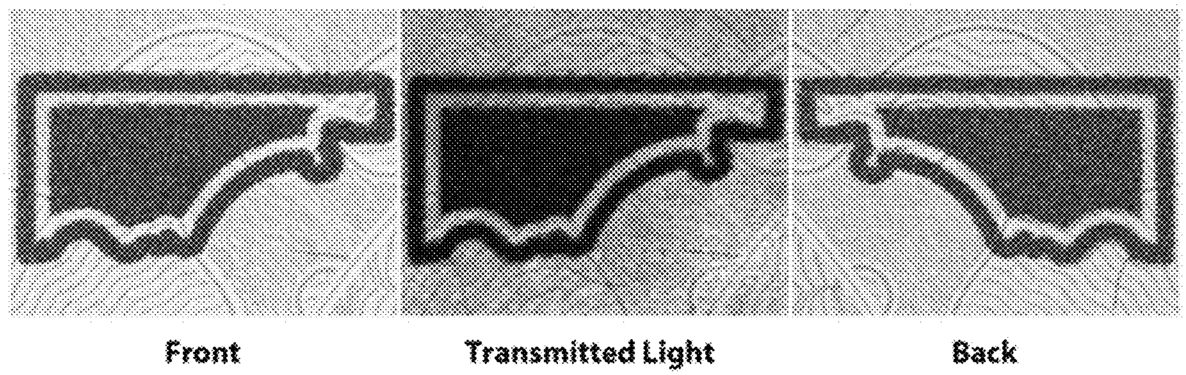
FIG. 23 illustrates an example of using color shifting ink on both sides of a passport page, in good register.

FIG. 23 illustrates an example of using color shifting ink on both sides of a passport page, in good register. Color shifting ink is typically applied by screen or intaglio, but if adapted for offset delivery it might play additional roles in resisting digital counterfeiting.

Unlike metallic ink, iridescent and color shifting inks are typically applied by screen (or intaglio), which does not offer the same high registration capabilities or artwork fidelity as simultaneous offset. Nonetheless, the examples in FIGS. 22 and 23 show these ink types applied on opposite sides of a sheet. If these inks could be adapted for offset delivery, it might provide opportunities for more integration with simultaneous offset and split fountain printing, as is possible now with metallic inks.

Integrating Split Fountains

Figure 24:
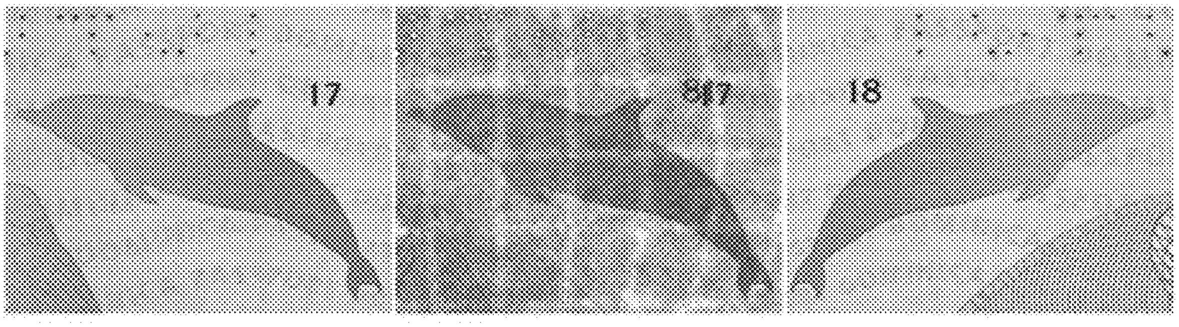
FIG. 24 illustrates an example of a contrast-increasing simultaneous offset design incorporating split fountain printing in an issued passport.

FIG. 24 illustrates an example of a contrast-increasing simultaneous offset design incorporating split fountain printing in an issued passport. The dolphin artwork is mostly the same on both sides, with green at the tail and red at the nose. In transmitted light, saturation within the dolphin is increased and the split fountain remains visible, though fine line detail is lost. Just as in FIG. 2A, the artwork outside the dolphin is not the same on the front as on the back, so that it becomes blurry.

Figure 25:
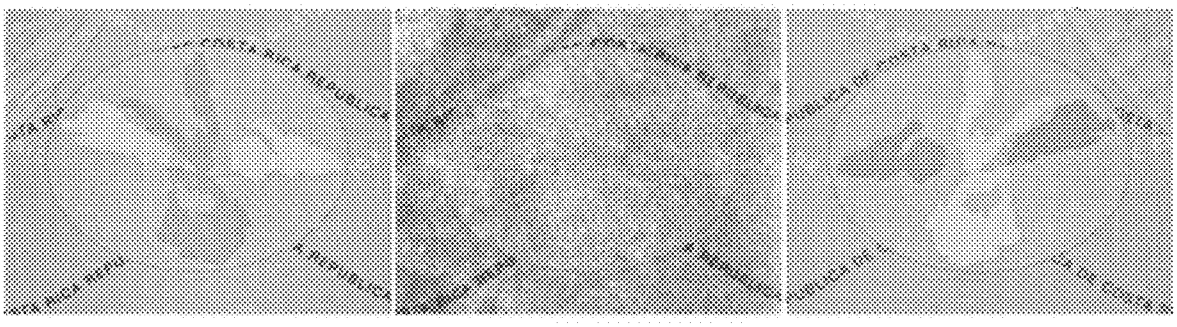
FIG. 25 illustrates an example of a contrast-reducing simultaneous offset design incorporating split fountain printing in an issued passport.

FIG. 25 illustrates an example of a contrast-reducing simultaneous offset design incorporating split fountain printing in an issued passport. Just as in FIG. 2A, the front and back are designed as negative images of one another such that the artwork vanishes when viewed in transmitted light. As in FIG. 24, split fountain printing is integrated into both sides of the design. The transition direction is consistent between the front and back, so that saturation is increased in transmitted light.

Simultaneous offset and split fountains are products of different press hardware and can be integrated together. As in FIG. 2A, the split fountain artwork in FIG. 24 is the same on the front and back, increasing saturation in transmitted light. As in FIG. 14, the front and back artwork in FIG. 25 are positive/negative images, so that contrast decreases in transmitted light and the design vanishes.

Considering split fountains in the context of contemporary digital counterfeiting, simulating a spot-to-spot split fountain color transition is a technical hurdle for traditional (offset) counterfeiters without split fountain hardware. However, because CMYK can simulate most spot colors and digital devices have excellent same-side CMYK color registration, simulation of a spot-to-spot color continuum is not nearly as hard for digital counterfeiters as for traditional counterfeiters. FIGS. 19 through 21 discussed how specialty inks that cannot be simulated by CMYK can add security when combined with the registration features of simultaneous offset. Taking the case further, incorporating specialty inks with both split fountain printing and simultaneous offset can increase simulation difficulty even more (see FIGS. 26 through 30).

Figure 26:
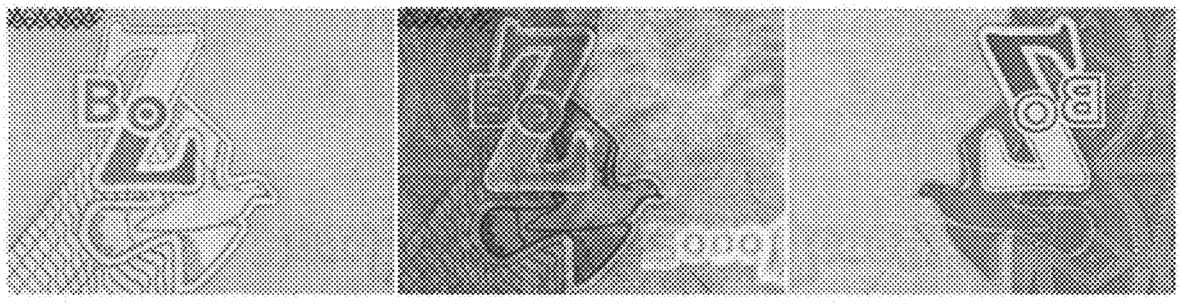
FIG. 26 illustrates an example of a metallic ink, split fountain printing and simultaneous offset integrated in a single icon in an issued banknote.

FIG. 26 illustrates an example of a metallic ink, split fountain printing and simultaneous offset integrated in a single icon in an issued banknote. The contour of the bird on the front is a split fountain between silver metallic ink and spot brown ink. Just as in FIG. 21, the integration of all three of these offset-compatible elements produces a composite greater than the sum of its parts because it forces multi-step counterfeiting workflows and multiple registration and simulation problems, increasing costs and suppressing quality.

FIG. 26 shows a metallic-to-brown spot split fountain integrated into a simultaneous offset icon. Simulation of this design without access to a security offset press would be a complicated multistep process prone to multiple registration errors and resulting in a product of limited quality. The metallic ink specular reflection and good front-to-back register in the simultaneous offset icon discourage purely CMYK digital counterfeiting workflows. The split fountain prevents the metallic ink from being treated as an isolated artwork element since counterfeiters not only simulate a gradually fading metallic effect but also register the metallic to the other art.

Figure 27:
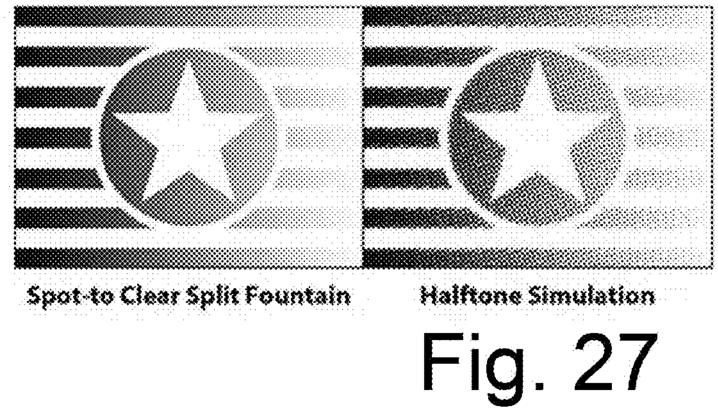
FIG. 27 illustrates an example of an alternative spot-to-clear (or white) split fountain design.

Before considering split fountain simultaneous offset integrations with other types of special inks, FIG. 27 illustrates an example of an alternative spot-to-clear (or white) split fountain design. On the left is a mockup of an offset split fountain transition between a spot color ink and a clear (or white) ink, creating a fade across the design. On the right is a mockup of a process color simulation of the image on the left. Identifying the colored dots in the simulation is easier in areas of low color saturation where fewer dots are present, and more difficult where the halftone dots overlap in areas of high saturation. This is highly relevant to detection of digital counterfeits with magnification.

This implementation does not produce the conventional hue change between two spot colors, but instead a gradual analog fade from higher to lower saturation, with two potential benefits. First, digital scanning and CMYK simulation of lower-saturation colors may result in poor counterfeit color quality. Second, simulation of the gradual fade by CMYK forces increasingly wider halftone dot spacing as saturation decreases, preventing individual halftone dots from being concealed. Where saturation is high, the halftone dots overlap one another and are hard to spot but where saturation is low the printer uses fewer dots and spaces them further apart. The strategy in FIG. 27 creates an offset image that is not easily simulated by CMYK and can be more easily detected both with and without magnification.

Figure 28:
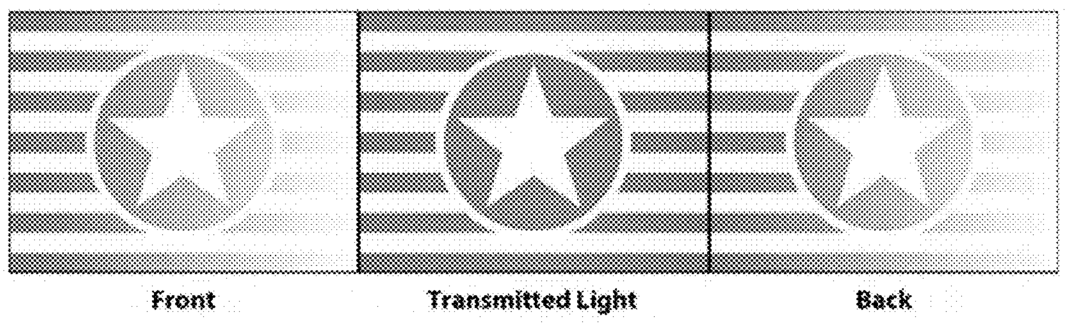
FIG. 28 illustrates an example of a simultaneous offset feature incorporating spot-to-clear split fountains on both sides.

FIG. 28 illustrates an example of a simultaneous offset feature incorporating spot-to-clear split fountains on both sides. The transitions proceed in opposite directions, so that where one side is lighter the opposite side is darker. In transmitted light, the splits complement one another to produce the appearance of a flat tone and the split transitions disappear. In some ways, this implementation is similar to prior examples that showcased opposing front/back artwork, such as those in FIGS. 4 and 15.

Applying this concept to simultaneous offset design, each side of the icon in FIG. 28 contains the same spot-to-clear split fountain artwork described in FIG. 27 and resists digital counterfeiting in the same way. In transmitted light, the split fountain transitions flow in opposite directions, essentially completing one another, and the simultaneous offset icon artwork looks like a flat tone. This format capitalizes on both the characteristics of the split fountain in reflected light (FIG. 27) and the front/back register characteristics of simultaneous offset.

An aspect is directed to a substrate printed with front side markings on a first side and back side markings on a second side to deter counterfeiting. The front side has markings to deter counterfeiting. The front side when viewed with reflected light comprises: a first set of stripes printed with a first gradient of two colors, the first gradient flowing from white ink to clear ink; and a first symbol printed with the first gradient of two colors. The back side has markings to deter counterfeiting. The back side when viewed with reflected light comprises: a second set of stripes printed with a second gradient; the first gradient flowing from clear ink to white ink; and a second symbol printed in the second gradient. There is no gradient visible for the stripes or symbol when the substrate is viewed with transmitted light. The first set of stripes and the first symbol have a lower contrast in reflected light as compared to a combination of the first set of stripes, second stripes, first symbol, and second symbol when viewed the substrate is view with transmitted light.

Another aspect is directed to a method of printing anti-counterfeit markings on a substrate having front side markings on a front side and back side markings on a back side, the front side including a first information section and a first security section, the back side including a second information section and a second security section. The method comprises printing with an offset printing press and a split fountain configured to print with a first plate to print on the front side of the substrate: a first set of stripes printed with a first gradient of two colors, the first gradient flowing from white ink to clear ink, and a first symbol printed with the first gradient of two colors; and printing with an offset printing press and a split fountain configured to print with a second plate to print on the front side of the substrate: a second set of stripes printed with a second gradient, the first gradient flowing from clear ink to white ink, and a second symbol printed in the second gradient. There is no gradient visible for the stripes or symbol when the substrate is viewed with transmitted light. The first set of stripes and the first symbol have a lower contrast in reflected light as compared to a combination of the first set of stripes, second stripes, first symbol, and second symbol when viewed transmitted light.

Figure 29:
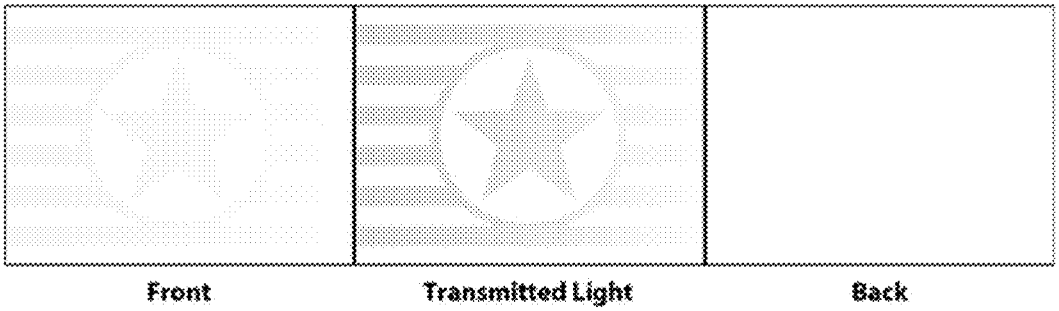
FIG. 29 illustrates an example of a white-to-clear split on the front only.
Figure 30:
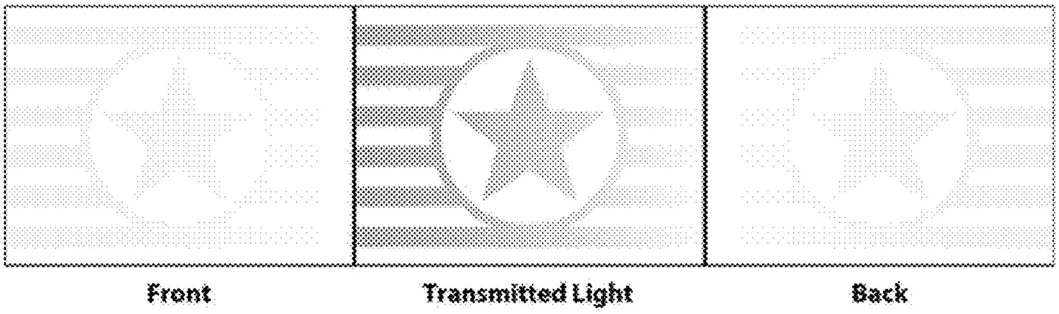
FIG. 30 illustrates an example of white-to-clear split fountains on both the front and back are incorporated into a simultaneous offset feature, with each side similar to the split described in FIG. 28.

The template in FIG. 28 could be adapted in many ways, such as the substitution of white ink and a reversal of the split direction as shown in FIGS. 29 and 30 or alternating the stripes between a spot-to-white transition and a spot-to-clear transition that would appear similar in reflected light but create a different effect in transmitted light.

FIG. 29 illustrates an example of a white-to-clear split on the front only. This is not a simultaneous offset feature because there is no corresponding image on the back. It is presented to illustrate how both white and clear inks might show low contrast with the substrate in reflected light, but in transmitted light the white ink could block light while the clear ink remains transparent. The split fountain creates a subtle fade effect that would only be visible in transmitted light.

An aspect is directed to a method of printing on two sides of a substrate using an offset printing press. The method comprises: positioning a substrate having a front side containing a front security section and a back side containing a back security section onto an offset press; printing with a first printing unit having a split fountain: a first set of stripes printed with a first gradient of two colors, the first gradient flowing from white ink to clear ink, and a first symbol printed with the first gradient of two colors; aligning a back side of the substrate such that ink from a second printing unit is within a preset threshold to ink from the first printing unit; printing with the second printing unit having a split fountain: a second set of stripes printed with a second gradient, the first gradient flowing from clear ink to white ink, and a second symbol printed in the second gradient; printing the first sets of stripes, the second sets of stripes, the first symbol, and the second symbol such that there is no gradient on the front side of the substrate when the substrate is viewed with transmitted light to deter counterfeiting; printing the first sets of stripes and the first symbol such that the gradient flows from white to clear when the front side of substrate is viewed with reflected light; and printing the second sets of stripes and the second symbol such that the gradient flows from white to clear when the back side of substrate is viewed with reflected light. In some embodiments, the preset threshold may be within 10%, or within 5%, or within 1%.

FIG. 30 illustrates an example of white-to-clear split fountains on both the front and back are incorporated into a simultaneous offset feature, with each side similar to the split described in FIG. 28. The split fountains are configured in the same direction, so that in transmitted light the split fountain effect becomes more pronounced instead of disappearing as in FIG. 28. This might improve visibility of the simultaneous offset feature if the ability of the white ink to block light is modest.

FIGS. 27 through 30 show only a few limited examples involving spot, clear, and white inks. One can imagine substituting metallic, iridescent, color shifting, fluorescent, opaque pastel, spot, or clear gloss inks. Some examples might include metallic-to-clear, metallic-to-gloss spot, or even matte-to-gloss of the same color. The quantity of combinations and opportunity for design flexibility created by integrating simultaneous offset, split fountains, and specialty inks is truly enormous. This potential sets the stage for discussion of simultaneous offset as a flexible but frequently underutilized security feature capable of much more than is currently asked of it.

This section has discussed simultaneous offset concepts relating to contrast, special inks, and resisting digital simulation. Simultaneous offset is an extraordinarily flexible security feature. Yet in contemporary security documents, simultaneous offset is usually a single tiny icon featuring few visual effects and limited integration with other security features. Once a manufacturer has the required press capabilities in place, simultaneous offset requires few consumables and could be leveraged as a scalable design feature to play a much greater role in security artwork than is currently done. Accordingly, the next section will regard simultaneous offset as the single defining technology responsible for securing the entirety of a document's offset background artwork, and boundaries will be tested to see how far this technology can be pushed.

Registration Strategy

This section discusses simultaneous offset as actually a suite of highly flexible security features, extensible to full-document designs with multiple visual effects, where the strategies described above are integrated and optimized together.

Figure 31:
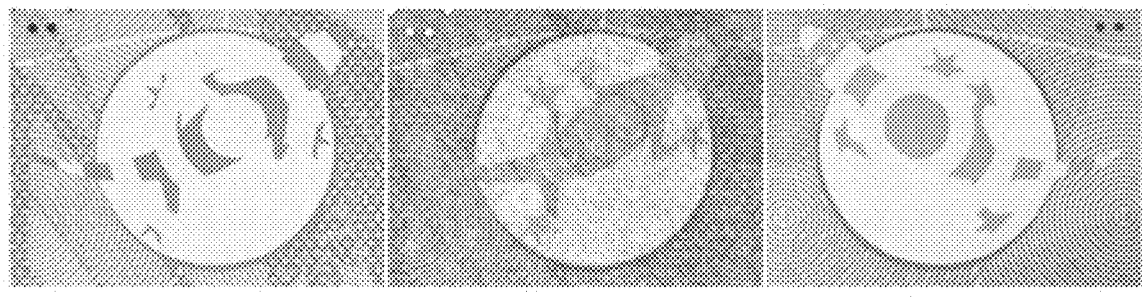
FIG. 31 illustrates an "image completion" simultaneous offset icon.

The above describes the four discrete visual effects: image completion, image disappearance (or contrast reduction) in FIG. 25, contrast increase in FIG. 2A and color change (plus image completion) in FIG. 2B. As an example of image completion, FIG. 31 illustrates an "image completion" simultaneous offset icon. The complete icon image is partitioned between the front and back, both of which look incomplete because the artwork is not recognizable in reflected light. The complete icon image can only be seen in the transmitted light view in the center. The open regions of unprinted substrate on each side may help document users recognize that this area contains a simultaneous offset icon.

The above further considers how partitioning of the artwork between the front and back, and how ink colors are placed, controls the visual effect displayed by each icon in transmitted light. Note that FIG. 2A shows only one discrete visual effect and FIG. 2B shows just two, but complex simultaneous offset designs could include multiple iterations of all four (with different and variable artwork) and encompass the entire edge-to-edge offset spread instead of one tiny icon.

Edge-to-Edge Design

Figure 32:
FIG. 32 illustrates an example of a simultaneous offset design that extends from the top to the bottom edges of a banknote.

FIG. 32 illustrates an example of a simultaneous offset design that extends from the top to the bottom edges of a banknote. These images show the right edge, but the left edge features the same design. This simultaneous offset design is large compared to most security documents, but it still only occupies a small area of the complete offset artwork. This concept could be extrapolated to extend the icon not only from top to bottom, but also from left to right to encompass more of the offset design.

In contemporary security documents simultaneous offset features are almost exclusively small, localized icons featuring a single visual effect of limited complexity. For example, the simultaneous offset feature in the banknote in FIG. 32 is among the largest in comparison to most modern security documents, but still occupies only a minor part of the design in the vertical strip at the left and right edges of the note.

A few reasons for limited contemporary use of simultaneous offset in documents may be that issuers have not considered the flexibility simultaneous offset offers, or maybe they view it as a relatively unimportant "checkbox" feature to be included but not optimized, or maybe some issuers see simultaneous offset icons as just one of many features that compete for limited document space and therefore are size-constrained. But once a manufacturer possesses the required press hardware capabilities, simultaneous offset becomes a powerful low-cost design platform that does not require additional manufacturing processes, expensive consumables, or supply chain logistics to scale up the size and complexity of simultaneous offset artwork.

Imagine designing multiplate, nonrepeating offset security artwork where the main priority is incorporating multiple front-to-back register effects that span the entire document edge-to-edge, to the point where offset artwork that does not contribute to the simultaneous offset design is minimized, or even excluded completely. In this model, the front and back offset designs are not independent but work together everywhere; alternately, one could think of the back offset artwork as subordinated to both the front art and the needs of the simultaneous offset visual effects. Conventional offset artwork practices such as guilloche, microprinting, fine line patterns, security halftones, and others remain important and necessary but are used primarily (or even exclusively) in ways that also support the simultaneous offset design. The entire offset design strategy revolves around simultaneous offset, and offset art that does not contribute to multiple simultaneous offset visual effects, drawing user attention, or improving inspection ergonomics, is at most a minor component of the design.

Figure 33A:
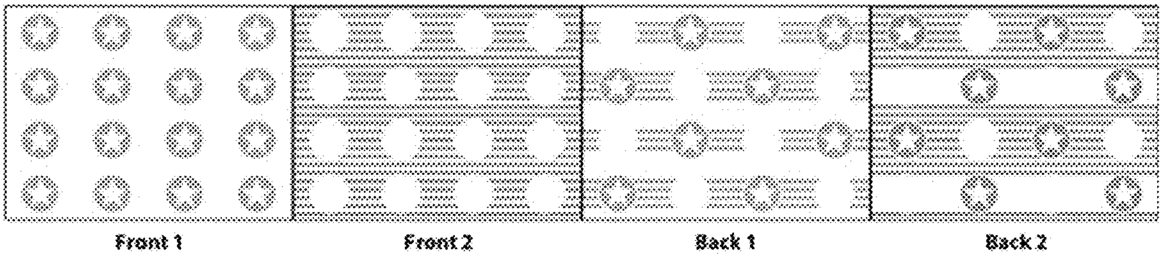
FIG. 33A illustrates an example of individual plate images in a four-plate, full-document simultaneous offset design.
Figure 33B:
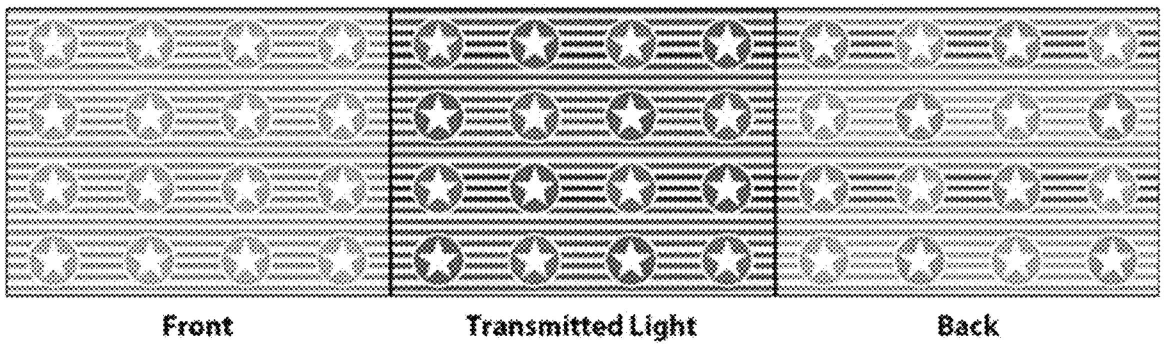
FIG. 33B shows the composite front and back reflected light images and transmitted light images based on the individual plates of FIG. 33A, which create several color and saturation effects in an edge-to-edge, full-document simultaneous offset design.

An example of a full-document simultaneous offset design focused on color and saturation effects is shown in FIGS. 33A and 33B, though the design is too simple and is only intended for demonstration. FIG. 33A illustrates an example of individual plate images in a four-plate, full-document simultaneous offset design. These images extend edge-to-edge in both directions and are the dominant feature throughout the entire offset artwork. FIG. 33B shows the composite front and back reflected light images and transmitted light images based on the individual plates of FIG. 33A, which create several color and saturation effects in an edge-to-edge, full-document simultaneous offset design. This mockup is simple, and a better approach would incorporate image completion, image disappearance, contrast increase, and color change effects all together in a panorama of complex nonrepeating artwork.

An aspect is directed to a substrate printed with front side markings on a first side and back side markings on a second side to deter counterfeiting. The front side has markings to deter counterfeiting. The front side when viewed with reflected light comprises: a first set of stripes printed with a first ink color (M) in a first saturation and a first set of first symbols printed with a second ink color (C) in a first saturation. The back side has markings to deter counterfeiting. The back side when viewed with reflected light comprises: a second set of stripes printed with the first ink color in a first saturation; a third set of stripes printed in a third ink color (M+C) in a second saturation; a fourth set of stripes printed in the second ink color (C) in a first saturation; a second set of second symbols printed with the first ink color (M) in the first saturation; and a third set of third symbols printed with the second ink color (C) in the first saturation. The third ink color is combination of the first ink color and the second ink color. The substrate reflects a pattern to protect against counterfeiting when the substrate is viewed with transparent light. The pattern comprises: a fifth set of stripes in the first ink color (M) having a second saturation; the second saturation darker than the first saturation; a sixth set of stripes in a fourth ink color (M+M+C) having a third saturation; the fourth ink color including the first and second ink color in an uneven ratio; a seventh set of stripes in a fifth ink color (M+C+C) in the third saturation, the fifth ink color comprising the first and second ink color in an uneven ratio; a fourth symbol in the second ink color in a fourth saturation; and a fifth symbol in the third color (M+C) in the fourth saturation.

Another aspect is directed to a method of printing anti-counterfeit markings on a substrate having front side markings on a front side and back side markings on a back side, the front side including a first information section and a first security section, the back side including a second information section and a second security section. The method comprises: printing with an offset printing press configured to print with a first plate to print on the front side of the substrate: a first symbol printed with a first ink color (C) in a first saturation; printing with an offset printing press configured to print with a second plate to print on the front side of the substrate: a first set of stripes printed with a second ink color (M) in a first saturation; printing with an offset printing press configured to print with a third plate to print on the back side of the substrate: a second set of stripes in the first ink color (C) in a first saturation and a second symbol in the first ink color (C) in the first saturation; and printing with an offset printing press configured to print with a fourth plate to print on the back side of the substrate: a third set of stripes in the second ink color (M) in a first saturation and a third symbol in the second ink color (M) in the first saturation. The substrate reflects a pattern to protect against counterfeiting when the substrate is viewed with transparent light. The pattern comprises: a fourth symbol in the second ink color in a fourth saturation; a fifth symbol in a third color (M+C) in the fourth saturation; a fourth set of stripes in the first ink color (M) having a second saturation; the second saturation darker than the first saturation; a fifth set of stripes in a fourth ink color (M+M+C) having a third saturation; the fourth ink color including the first and second ink color in an uneven ratio; and a sixth set of stripes in a fifth ink color (M+C+C) in the third saturation, the fifth ink color including the first and second ink color in an uneven ratio.

Another aspect is directed to a method of printing on two sides of a substrate using an offset printing press. The method comprises: positioning a substrate having a front side containing a front security section and a back side containing a back security section onto an offset press; printing with a first printing unit: a first symbol printed with a first ink color (C) in a first saturation; printing with a second printing unit: a first set of stripes printed with a second ink color (M) in a first saturation; aligning a back side of the substrate such that ink from a third printing unit is within a preset threshold to ink from the first printing unit; printing with the third printing unit: a second set of stripes in the first ink color (C) in a first saturation and a second symbol in the first ink color (C) in the first saturation; printing with a fourth printing unit: a third set of stripes in the second ink color (M) in a first saturation and a third symbol in the second ink color (M) in the first saturation; printing the first sets of stripes, the second sets of stripes, and the third set of stripes such that they form a first pattern on the substrate for preventing counterfeiting when the substrate is viewed in transmitted light, the first pattern including: a fourth set of stripes in the second ink color (M) in a second saturation, a fifth set of stripes in a third color (M+M+C) in a third saturation, and a sixth set of stripes in a fourth color (C+Y=G) in the third saturation; and printing the first symbol, second symbol, and third symbol such that they form a second pattern on the substrate for preventing counterfeiting when the substrate is viewed in transmitted light, the second pattern including: a fourth symbol in the second ink color in a fourth saturation and a fifth symbol in a fifth color (C+M=B1) in the fourth saturation. The first pattern and the second pattern cannot be seen with reflected light. In some embodiments, the preset threshold may be within 10%, or within 5%, or within 1%.

Imagine this mockup to be a full-size birth record, where the simultaneous offset feature dominates the offset design, fills the entire page, and contains different color change icons throughout. An actual security design could contain combinations of visual effects besides color changes, additional plate images, nonrepeating line artwork that cannot be counterfeited using step-and-repeat processes, integration with other transmitted light, and offset features, and many other characteristics.

Figure 34:
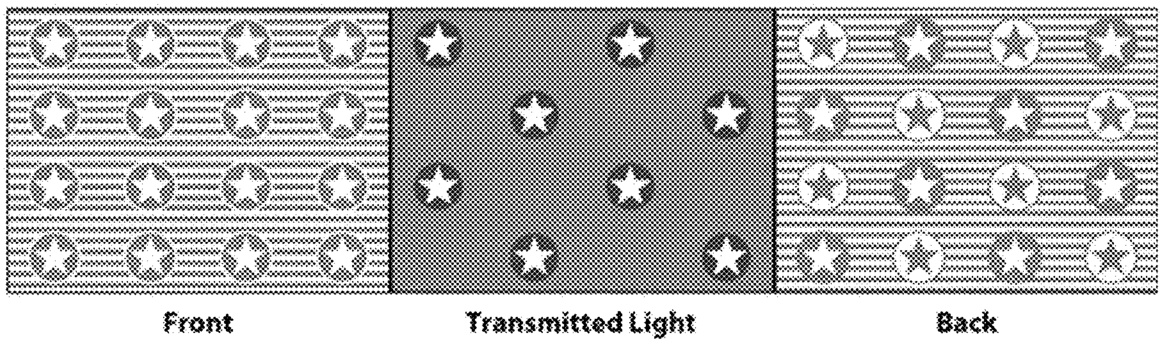
FIG. 34 illustrates an example of a simultaneous offset design featuring both image disappearance and contrast increase icons that cause some parts of the design to vanish and others to darken in transmitted light.

FIG. 34 illustrates an example of a simultaneous offset design featuring both image disappearance and contrast increase icons that cause some parts of the design to vanish and others to darken in transmitted light. It also shows an edge-to-edge, full-document mockup emphasizing contrast effects. In reflected light, the stars and stripes pattern repeats, but in transmitted light, parts of the design vanish (image disappearance) while other areas become darker (contrast increase). Just as with FIGS. 33A and 33B, this design is far too simple for real security work and only shows a basic concept. A better approach would entail more complex nonrepeating artwork, multiple diverse visual effects in nonrepeating art, and so forth, including placing image disappearance effects over watermarks or other transmitted light features to make them easier to inspect without competition from the offset print.

An aspect is directed to a substrate printed with front side markings on a first side and back side markings on a second side to deter counterfeiting. The front side has markings to deter counterfeiting. The front side when viewed with reflected light comprises: a first set of stripes printed with a first ink color (C) in a first saturation and a first set of first symbols printed with the first ink color (C) in a first saturation. The back side has markings to deter counterfeiting. The back side when viewed with reflected light comprises: a second set of stripes printed with the first ink color; a second set of second symbols printed with the first ink color in the first saturation; and a third set of third symbols printed with the first color in the first saturation. The first set of stripes and the second set of stripes are spaced such that the stripes are spaced in alternating pattern so as to form a solid pattern when viewed with transmitted light. The solid pattern shows no stripes when viewed with transmitted light. Some of the first symbols and the third symbols are printed in an aligned offset registration such that the first symbol and third symbol form a fourth symbol having a second saturation when the substrate is viewed with transmitted light, the second saturation darker than the first saturation. Some of the first symbols and the second symbols are printed in aligned offset registration such the first symbol and second match color and saturation of the solid pattern, thereby appearing to disappear when the substrate is viewed with transmitted light.

Another aspect is directed to a method of printing anti-counterfeit markings on a substrate having front side markings on a front side and back side markings on a back side, the front side including a first information section and a first security section, back side including a second information section and a second security section. The method comprises: printing with an offset printing press configured to print with a first plate to print on the front side of the substrate: a first set of first symbols printed with a first ink color (C) in a first saturation and a first set of stripes printed with the first ink color in a first saturation; and printing with an offset printing press configured to print with a second plate to print on the back side of the substrate: a second set of stripes printed with the first ink color in the first saturation, a second set of second symbols printed with the first ink color in the first saturation, and a third set of third symbols printed with the first ink color in the first saturation. The first set of stripes and the second set of stripes are spaced such that the stripes are spaced in alternating pattern so as to form a solid pattern when viewed with transmitted light. The solid pattern shows no stripes when viewed with transmitted light. Some of the first symbols and the third symbols are printed in an aligned offset registration such that the first symbols and third symbols form a fourth set of fourth symbols having a second saturation when the substrate is viewed with transmitted light, the second saturation darker than the first saturation. Some of the first symbols and the second symbols are printed in aligned offset registration such the first symbols and second symbols match color and saturation of the solid pattern, thereby appearing to disappear when the substrate is viewed with transmitted light.

Another aspect is directed to a method of printing on two sides of a substrate using an offset printing press. The method comprises: positioning a substrate having a front side containing a front security section and a back side containing a back security section onto an offset press; printing with a first printing unit: a first set of first symbols printed with a first ink color (C) in a first saturation and a first set of stripes printed with the first ink color in a first saturation; aligning a back side of the substrate such that ink from a second printing unit is within a preset threshold to ink from the first printing unit; printing with the second printing unit: a second set of stripes printed with the first ink color in the first saturation, a second set of second symbols printed with the first ink color in the first saturation, and a third set of third symbols printed with the first ink color in the first saturation; printing the first sets of stripes, the second sets of stripes, and the third set of stripes such that they form a solid pattern on the substrate for preventing counterfeiting when the substrate is viewed in transmitted light, the solid pattern not showing any of the stripes composing the pattern; printing some of the first symbols and third symbols in an aligned offset registration such that the first symbols and third symbols form a fourth set of fourth symbols having a second saturation when the substrate is viewed with transmitted light, the second saturation darker than the first saturation; printing some of the first symbols and third symbols in an aligned offset registration such that the first symbols and third symbols form a fourth set of fourth symbols having a second saturation when the substrate is viewed with transmitted light, the second saturation darker than the first saturation; and printing some of the first symbols and the second symbols in an aligned offset registration such the first symbols and second symbols match color and saturation of the solid pattern, thereby appearing to disappear when the substrate is viewed with transmitted light. In some embodiments, the preset threshold may be within 10%, or within 5%, or within 1%.

The edge-to-edge, full-document simultaneous offset models shown in FIGS. 33A to 34 can offer several potential advantages. First, if the entire offset artwork on both sides is engaged with the simultaneous offset feature, then simultaneous offset visual effects would be easy to locate because users could find a part of the design anywhere and everywhere, instead of in only one specific location. Second, a design in which 100% of the graphics contribute to a simultaneous offset feature would be clean and easy to interpret in transmitted light because there are no areas where the front and back offset art compete, unlike most contemporary security documents that consist mainly of uncorrelated front and back offset artwork. For examples, one may review FIGS. 2A, 2B, 25, and 31, but instead of examining the simultaneous offset icon itself, examine the mismatched front and back artwork surrounding the icon. Outside the icon the art becomes blurry, does not contribute to transmitted light inspection, and may even confuse document users that have to search around and through it for transmitted light features. Third, multiple iterations of each of the four visual effects identified above could be integrated in many locations with different artwork and different plate combinations throughout the design, with each instance treated as a distinct and unique security feature. One may revisit FIGS. 2B, 33A, 33B, and 34 for examples of simultaneous offset designs that contain multiple visual effects. Fourth, document real estate can be conserved. It is unnecessary to identify a specific area to fit in a simultaneous offset icon, since various simultaneous offset effects can be found everywhere.

Security Feature Integrations

Figure 35:
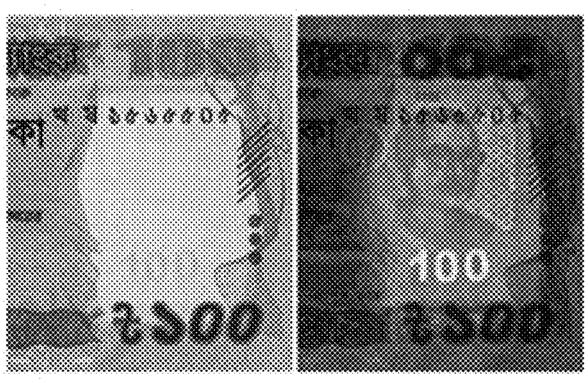
FIG. 35 illustrates an example of an ergonomic design for a watermark feature that advertises itself before transmitted light inspection.

FIG. 35 illustrates an example of an ergonomic design for a watermark feature that advertises itself before transmitted light inspection. In reflected light, the left image shows an open area of unprinted paper that signals that a security feature is present, making the watermark easier to locate. When viewed in transmitted light in the right image, the absence of overprinting also makes the watermark details easier to inspect.

The previous section introduced the concept of designing the entire front and back offset artwork around the priorities of a complex, multi-effect, edge-to-edge, full-document simultaneous offset design. This idea can be extended beyond offset artwork to other transmitted light features such as watermarks, security threads, perforations, and others. For example, reflected light offset artwork is often designed to alert document users to the location of a transmitted light security feature and make it easier to inspect. Some examples include gaps in printed artwork that signal the location of a watermark as in FIG. 35, or an image completion simultaneous offset feature such as the one shown in FIG. 31 where the unprinted space makes the design look half-finished and helps draw user attention.

Figure 36:
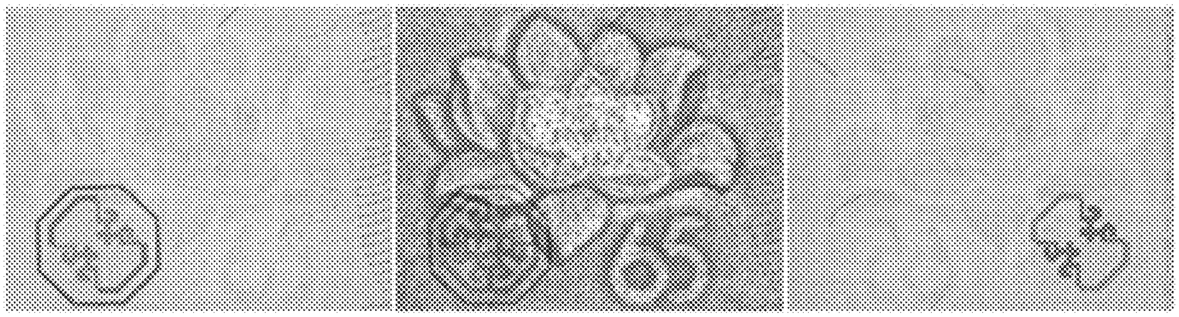
FIG. 36 illustrates an example of an intersection of a simultaneous offset icon with a watermark.

Expanding further on these reflected light design concepts and simultaneous offset, some issuers already print simultaneous offset features over watermarks so that both features draw attention to each other and can be inspected together. FIG. 36 illustrates an example of an intersection of a simultaneous offset icon with a watermark. Since both are transmitted light features, they can be inspected in tandem and help advertise one another.

Figure 37:
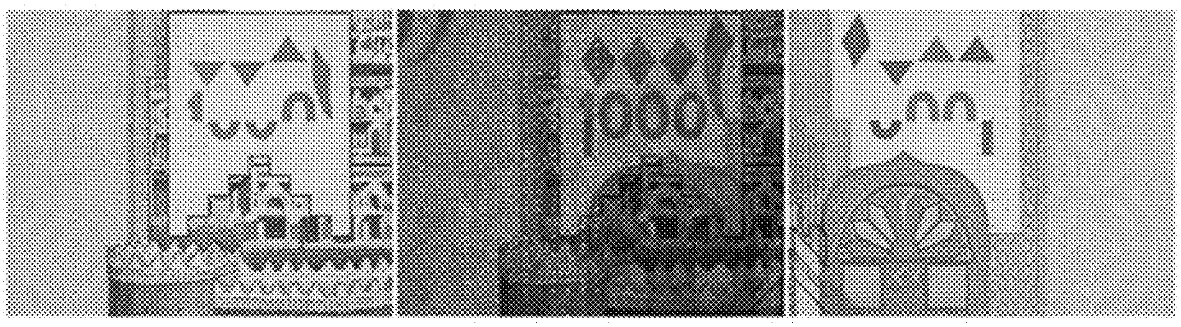
FIG. 37 illustrates an intersection of an image completion simultaneous offset icon with a perforation.

As another example, FIG. 37 illustrates an intersection of an image completion simultaneous offset icon with a perforation. Since both are transmitted light features, they can be inspected in tandem and help advertise one another.

Figure 38:
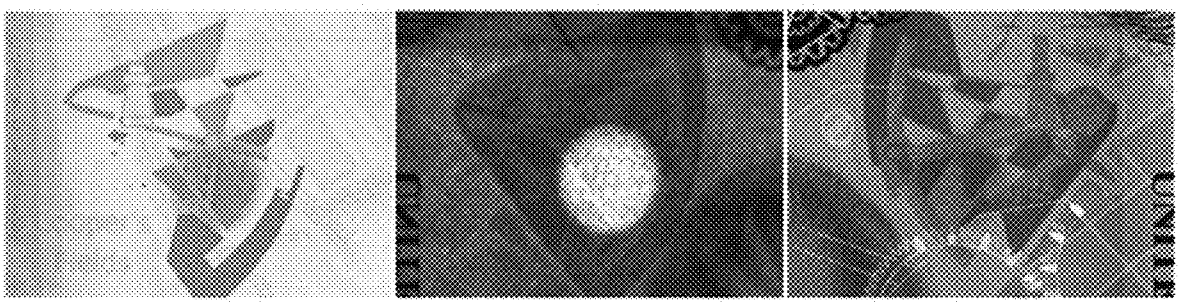
FIG. 38 illustrates an example of an intersection of a simultaneous offset icon with a highlight watermark.

FIGS. 36 and 37 show image completion in simultaneous offset icons, but other visual effects or combinations of visual effects could also be used. Consider how contrast-reducing (image disappearance) effects such as the one in FIG. 25 could be intersected with transmitted light features. Simultaneous offset images that vanish in transmitted light allow for easier inspection of a watermark, security thread, and/or perforation in the same area without the competing offset art. Also, consider the reverse, where a highlight watermark could be placed in areas containing simultaneous offset to reduce substrate opacity, improve contrast, and make the simultaneous offset feature easier to check. For example, FIG. 38 illustrates an example of an intersection of a simultaneous offset icon with a highlight watermark. In transmitted light, simultaneous offset icons may be easier to inspect in areas of thinner paper where the contrast is improved. Although this specific watermark is primarily an anti-alteration feature for a passport data page, different highlight watermark configurations could be explored for the purpose of showcasing a simultaneous offset feature. The highlight watermark shown in the passport data page in FIG. 38 is really intended for tamper resistance, but it also improves visibility of the simultaneous offset icon where they intersect.

Beyond harmonizing with other transmitted light features, reflected light simultaneous offset artwork should also be optimized to resist both digital and traditional counterfeiting by forcing counterfeiters to deal with problems unrelated to front-to-back register, including resolution, gamut limitations, multi-process same-side registration, halftone simulation limitations, etc.

Intaglio

The above offset strategy proposes that a complex, multi-effect simultaneous offset feature be the focus of the entire offset art, such that transmitted light inspection shows a giant edge-to-edge simultaneous offset design where no mismatched front and back art compete, and other transmitted light security features are accentuated rather than obfuscated. The entire document and all of its components, not just a tiny part of the offset artwork, is designed to be accessible and utilitarian when viewed in transmitted light. Intaglio is not typically associated with front-to-back register printing technology or intended for transmitted light inspection, but some compatible thinking can be applied.

First, intaglio art should complement the simultaneous offset feature (and other transmitted light features) and not obscure it to the point of preventing inspection. If the simultaneous offset design does extend edge-to-edge some overlap between the offset and intaglio would be normal, but even that could be avoided if desired. Intaglio over a modest amount of the document surface paired with simultaneous offset that covers the entire document may be an appropriate compromise. Further, although one-sided intaglio is typical for many document types (birth records, visas, etc.), some banknotes have intaglio on both sides. Among issued banknotes with two-sided intaglio the front and back are almost always uncorrelated, so that the front and back intaglio designs often overlap in transmitted light and the details of both become obscured. One goal of the simultaneous offset strategies proposed here is that the entire document be designed for easy transmitted light inspection, so that one-sided intaglio may be a good choice since there is no back intaglio image to compete. If two-sided intaglio is used, the front and back designs can be arranged not to intersect in transmitted light to prevent visual confusion.

Setting aside considerations specific to its compatibility with simultaneous offset, intaglio artwork can itself be designed with transmitted light inspection in mind. Some methods are varying plate engraving depth to control color saturation, including areas of dry embossing that are easier to see in transmitted light than in reflected light, or emphasizing multi-depth microprinting. (As a side note, microprinting can easily be added to any reflected light offset image, but in transmitted light microprinting on the back may not be legible due to loss of detail.) These intaglio-specific topics deserve their own separate analysis and are noted here only for completeness.

Compromises and Limitations

The strategies described in this disclosure present novel security benefits but also raise many questions, including how the importance of two-sided artwork is perceived by issuers. Some document types (e.g., birth records) typically contain little artwork on the reverse, so that introducing back-side art to support a simultaneous offset feature inspected from the front may not be controversial. On the other hand, in banknotes the back is often viewed as important real estate to convey national branding imagery that supplements, but is uncorrelated to, the front art. In banknotes, issuers may be reluctant to see the back design become an extension of the front art and simultaneous offset feature because then it cannot also be a vehicle for additional standalone imagery. A similar analysis for passport visa pages, plastic cards, and other document types might also be undertaken.

Other considerations include design practices and quality control. Implementing the techniques described in this disclosure requires adapting to new constraints and unconventional approaches to security design, since the entire offset artwork on both sides is treated as a single unit. Similarly, manufacturers maintain good registration and predictable ink behavior for both same-side and opposite-side multiplate offset work, as quality control consistency is particularly critical for simultaneous offset features. If a simultaneous offset feature is not printed consistently in a genuine document the user population will learn to ignore it and it will provide no security value, which would be especially problematic in a document where simultaneous offset was used extensively. Designers, manufacturers, and issuers determine for themselves which, if any, of the concepts presented in this disclosure are appropriate for their own documents, capabilities, and workflows.

In contrast to the limited use it now sees in contemporary security printing, this disclosure has described how simultaneous offset can be transformed into a core technology for complex edge-to-edge, full document offset security designs. Earlier parts of this disclosure evaluated simultaneous offset features from many different viewpoints, including plate count, resistance to digital/traditional counterfeiting workflows, ergonomic design, placement near other transmitted light features, integration with other offset-compatible features, discrete visual effects, and color/contrast effects. But these variables do not exist in isolation. A thoughtfully optimized full-document simultaneous offset panorama could incorporate all of them together in ways that may turn the entire document landscape into a large and complex transmitted light feature, while at the same time presenting technical barriers that make both traditional and digital counterfeiting costly, labor-intensive, and complicated. Again, it is up to each issuer to determine the best way to employ this underutilized technology.

Offset Printing Equipment

Offset printing equipment is known in the art. Examples include U.S. Pat. Nos. 7,770,517, 6,823,792, and 5,590,598, the entire disclosures of which are incorporated herein by reference.

Figure 39:
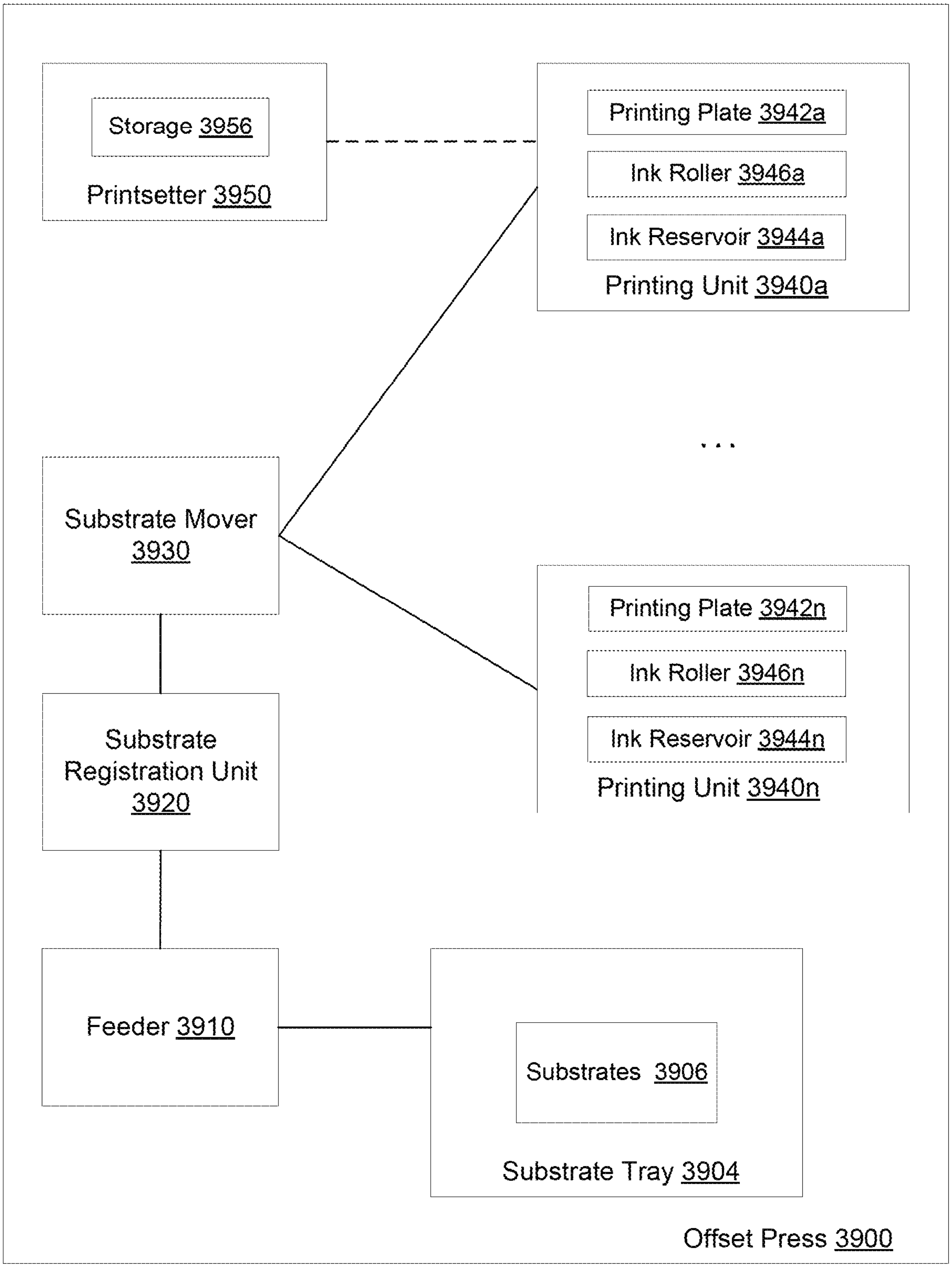
FIG. 39 illustrates an example of an offset printing system.

FIG. 39 illustrates an example of an offset printing system. The system includes an offset press 3900 which includes a substrate tray 3904 for substrates 3906, a feeder 3910, a substrate registration unit 3920, a substrate mover 3930, and a plurality of printing units 3940 (3940*a* to 3940*n*). The feeder 3910 is configured to feed the substrates 3906 into the offset press 3900 one by one. The substrate registration unit 3920 is configured to orient each substrate 3906 so that each substrate is positioned within a threshold before the substrate mover 3930 pulls the substrate into a printing unit 3940. The substrate mover 3930 may include grippers. Each printing unit 3940*a-n* includes a plate 3942*a-n*, an ink reservoir 3944*a-n*, and an ink roller 3946*a-n* configured to apply symbol or information to each substrate 3906. The system 3900 may further include a print setter 3950 having non-transitory computer readable instructions stored on a tangible computer read storage medium 3956. Details on the structures and functions of the offset press 3900 and its elements can be found, for instance, in U.S. Pat. Nos. 7,770,517, 6,823,792, and 5,590,598.

Figure 40:
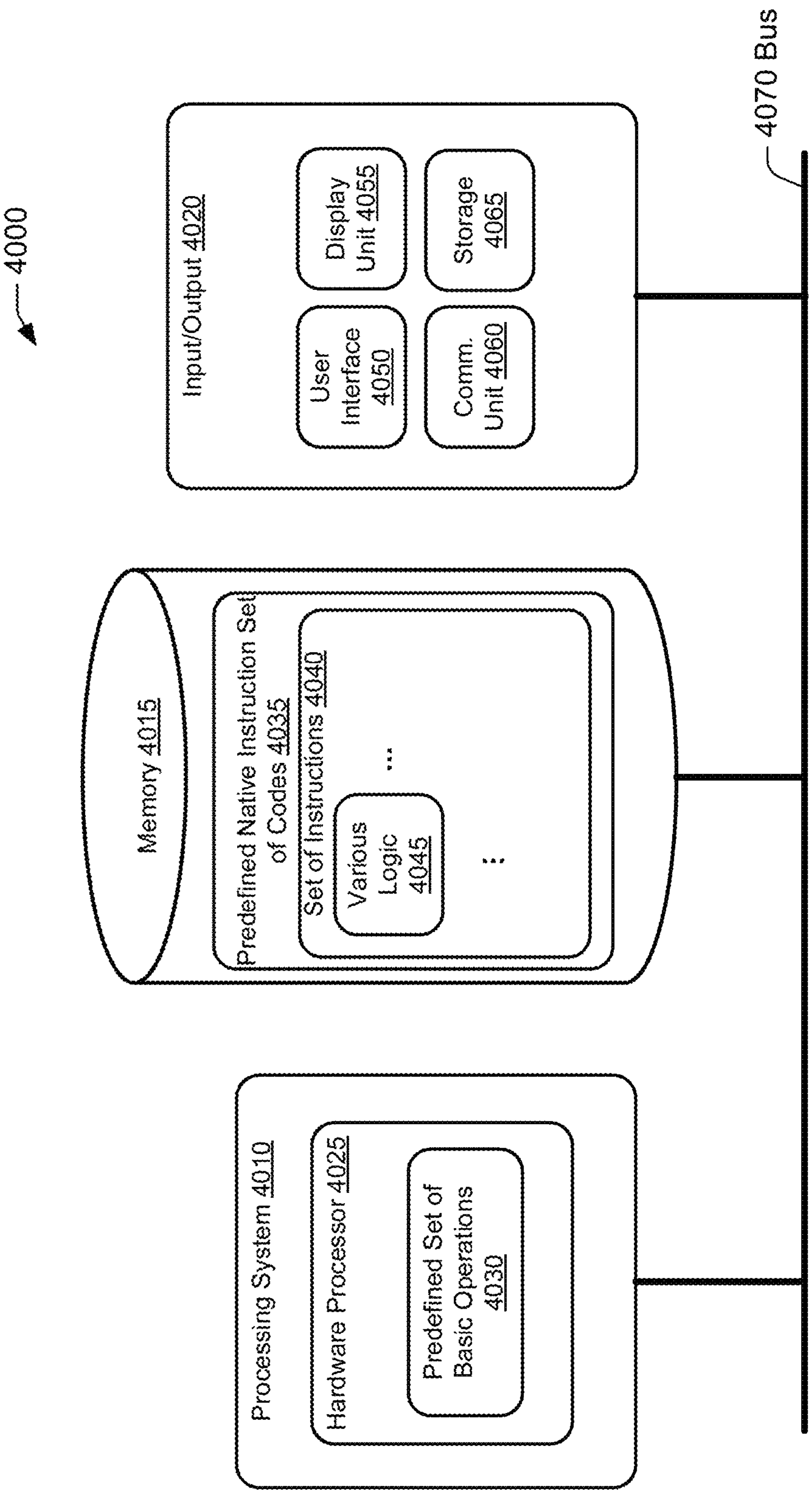
FIG. 40 illustrates an example of a computing system including logic.

FIG. 40 illustrates an example of a computing system 4000, or apparatus, including logic according to an embodiment. The computer system 4000 includes a processing system 4010 having a hardware processor 4025 configured to perform a predefined set of basic operations 4030 by loading corresponding ones of a predefined native instruction set of codes 4035 as stored in the memory 4015.

Here, the term computer system includes a processing system such as processing system 4010 and a memory such as memory 4015 accessible to the processing system.

The processing system includes at least one hardware processor, and in other examples includes multiple processors and/or multiple processor cores. In one embodiment, a computer system is a standalone device. The processing system in yet another example includes processors from different devices working together. In embodiments, a computer system includes multiple processing systems that communicate cooperatively over a computer network.

The following discussion explains how the logic, that implements the foregoing operations, transforms the hardware processor of computer system 4000 into a specially-programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction.

The collection of instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

A sequence of codes that a hardware processor is to execute, in the implementation of a given task, is referred to herein as logic. Logic is made up, therefore, not of software but of a sequence of codes or instructions, selected from the predefined native instruction set of codes of the hardware processor, and stored in the memory.

Returning to FIG. 40, the memory 4015 is accessible to the processing system 4010 via the bus 4070. The processing system controls also the input/output unit 4020 via the bus 4070. The input/output unit 4020 includes a user interface controller 4050, a display unit controller 4055, a communications unit controller 4060, and storage controller 4065.

The memory 4015 includes the predefined native instruction set of codes 4035, which constitute a set of instructions 4040 selectable for execution by the hardware processor 4025. In an embodiment, the set of instructions 4040 include logic 4045 representing the print setter 3950 as illustrated in FIG. 39. The instructions in this paragraph do not imply any order of operation or use but are used only for discrimination of one sequence of instructions from another. Such logic 4045 is set forth above in greater detail with respect to the method steps for the various embodiments of offset printing.

The various logic 4045 is stored in the memory 4015 and comprises instructions 4040 selected from the predefined native instruction set of codes 4035 of the hardware processor 4025, adapted to operate with the processing system 4010 to implement the process or processes of the corresponding logic 4045.

The inventive concepts taught by way of the examples discussed above are amenable to modification, rearrangement, and embodiment in several ways. For example, this invention may be applicable in other environments involving other markings different from the stripes, symbols, and the like in the anti-counterfeiting examples as presented above. Different colors from those described above may be used. The number of printing plates used to form the markings can vary (increase or decrease) from the above examples. The configuration of each of the printing plates can be modified to achieve similar or different functional results or effects. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A substrate having a front side and a back side and being printed with front side markings on the front side and back side markings on the back side, the front side having the front side markings which, when viewed with reflected light, comprises:

a first marking printed with a first ink color in a first saturation; and a first symbol printed with the first ink color in the first saturation;

the back side having the back side markings which, when viewed with reflected light, comprises:

a second marking printed with a second ink color in a second saturation, the first ink color and the second ink color having a same hue, the first saturation being different from the second saturation;

a second symbol printed with the second ink color in the second saturation;

a third marking printed with the first ink color in the first saturation; and a third symbol printed with the first ink color in the first saturation;

the first marking, the second marking, and the third marking being printed to provide an interlocking pattern of low saturation first ink color and high saturation first ink color when viewed with transmitted light; and the first symbol, the second symbol, and the third symbol being printed to provide, when viewed with transmitted light, the second symbol which is visible in the second ink color in the second saturation and the first symbol and the third symbol which are visible and visually complementary to produce a composite image wherein the first symbol and the third symbol are visually indistinguishable.

2. The substrate of claim 1, wherein, when viewed with transmitted light, the first symbol fills a first symbol space with the first ink color in the first saturation, the third symbol fills a third symbol space with the first ink color in the first saturation, and the first symbol and the third symbol fill the first symbol space and the third symbol space which form a combined space in the first ink color in the first saturation in which the first symbol and the third symbol are visible and visually complementary to produce the composite image wherein the first symbol and the third symbol are visually indistinguishable, as a transmitted light security feature.

3. The substrate of claim 1, wherein the second symbol has a same pattern as the first symbol and is spaced from the first symbol by a distance when viewed with transmitted light, as a transmitted light security feature.

4. The substrate of claim 1, wherein the second marking on the back side overlaps the third marking on the back side, as a printed security feature.

5. The substrate of claim 1, wherein the second saturation is higher than the first saturation.

6. The substrate of claim 1, wherein, when viewed with transmitted light, the first symbol and the third symbol are complementary to have the same saturation to produce the composite image wherein the first symbol and the third symbol are visually indistinguishable, as a transmitted light security feature.

7. The substrate of claim 1, wherein the first symbol, the second symbol, and the third symbol are printed security features.

8. The substrate of claim 1, wherein the first marking, the second marking, and the third marking are printed security features.

9. A substrate having a front side and a back side and being printed with front side markings on the front side and back side markings on the back side, the front side having the front side markings which, when viewed with reflected light, comprises:

a first marking printed with a first ink color in a first saturation; and a first symbol printed with the first ink color in the first saturation;

the back side having the back side markings which, when viewed with reflected light, comprises:

a second marking printed with a second ink color in a second saturation, the first ink color and the second ink color having a same hue, the first saturation being different from the second saturation;

a second symbol printed with the second ink color in the second saturation;

a third marking printed with the first ink color in the first saturation; and a third symbol printed with the first ink color in the first saturation;

the first marking, the second marking, and the third marking being printed to provide an interlocking pattern of low saturation first ink color and high saturation first ink color when viewed with transmitted light; and the first symbol, the second symbol, and the third symbol being printed to provide, when viewed with transmitted light, the second symbol which is visible in the second ink color in the second saturation, and the first symbol and the third symbol which are visible and spatially complementary to produce a composite image wherein the first symbol and the third symbol are visually indistinguishable.

10. The substrate of claim 9, wherein, when viewed with transmitted light, the first symbol fills a first symbol space with the first ink color in the first saturation, the third symbol fills a third symbol space with the first ink color in the first saturation, and the first symbol and the third symbol fill the first symbol space and the third symbol space which form a combined space in the first ink color in the first saturation in which the first symbol and the third symbol are visible and spatially complementary to produce the composite image wherein the first symbol and the third symbol are visually indistinguishable, as a transmitted light security feature.

11. The substrate of claim 9, wherein the second symbol has a same pattern as the first symbol and is spaced from the first symbol by a distance when viewed with transmitted light, as a transmitted light security feature.

12. The substrate of claim 9, wherein the second marking on the back side overlaps the third marking on the back side, as a printed security feature.

13. The substrate of claim 9, wherein the second saturation is higher than the first saturation.

14. The substrate of claim 9, wherein, when viewed with transmitted light, the first symbol and the third symbol are spatially complementary to have the same saturation to produce the composite image wherein the first symbol and the third symbol are visually indistinguishable, as a transmitted light security feature.

15. A substrate having a front side and a back side and being printed with front side markings on the front side and back side markings on the back side, the front side having the front side markings which, when viewed with reflected light, comprises:

a first marking printed with a first ink color in a first saturation; and a first symbol printed with the first ink color in the first saturation;

the back side having the back side markings which, when viewed with reflected light, comprises:

a second marking printed with a second ink color in a second saturation, the first ink color and the second ink color having a same hue, the first saturation being different from the second saturation;

a second symbol printed with the second ink color in the second saturation;

a third marking printed with the first ink color in the first saturation; and a third symbol printed with the first ink color in the first saturation;

the first marking, the second marking, and the third marking being printed to provide an interlocking pattern of low saturation first ink color and high saturation first ink color when viewed with transmitted light; and the first symbol, the second symbol, and the third symbol being printed to provide, when viewed with transmitted light, the second symbol which is visible in the second ink color in the second saturation, and the first symbol and the third symbol which are spatially complementary to produce a composite image wherein the first symbol and the third symbol are visually indistinguishable.

16. The substrate of claim 15, wherein, when viewed with transmitted light, the first symbol fills a first symbol space with the first ink color in the first saturation, the third symbol fills a third symbol space with the first ink color in the first saturation, and the first symbol and the third symbol fill the first symbol space and the third symbol space which form a combined space in the first ink color in the first saturation in which the first symbol and the third symbol are spatially complementary to produce the composite image wherein the first symbol and the third symbol are visually indistinguishable, as a transmitted light security feature.

17. The substrate of claim 15, wherein the second symbol has a same pattern as the first symbol and is spaced from the first symbol by a distance when viewed with transmitted light, as a transmitted light security feature.

18. The substrate of claim 15, wherein the second marking on the back side overlaps the third marking on the back side, as a printed security feature.

19. The substrate of claim 15, wherein the second saturation is higher than the first saturation.

20. The substrate of claim 15, wherein, when viewed with transmitted light, the first symbol and the third symbol are spatially complementary to have the same saturation to produce the composite image wherein the first symbol and the third symbol are visually indistinguishable, as a transmitted light security feature.

* * * * *